(12) United States Patent
Yao

(10) Patent No.: US 11,743,374 B2
(45) Date of Patent: Aug. 29, 2023

(54) MESSAGE DISPLAY METHOD AND ELECTRONIC DEVICE

(71) Applicant: Huawei Technologies Co., Ltd., Shenzhen (CN)

(72) Inventor: Xin Yao, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/630,623

(22) PCT Filed: Jul. 24, 2020

(86) PCT No.: PCT/CN2020/104601
§ 371 (c)(1),
(2) Date: Jan. 27, 2022

(87) PCT Pub. No.: WO2021/023030
PCT Pub. Date: Feb. 11, 2021

(65) Prior Publication Data
US 2022/0321691 A1  Oct. 6, 2022

(30) Foreign Application Priority Data
Aug. 5, 2019 (CN) .......................... 201910718031.3

(51) Int. Cl.
*H04M 1/00* (2006.01)
*H04M 1/7243* (2021.01)
*H04M 1/72454* (2021.01)
*H04M 1/02* (2006.01)

(52) U.S. Cl.
CPC ....... *H04M 1/7243* (2021.01); *H04M 1/0214* (2013.01); *H04M 1/0268* (2013.01); *H04M 1/72454* (2021.01); *H04M 2250/22* (2013.01)

(58) Field of Classification Search
CPC .. H04M 1/72454; H04M 1/7243; H04M 1/02; H04M 1/0214; H04M 1/0268; H04M 2250/22
See application file for complete search history.

(56) References Cited

U.S. PATENT DOCUMENTS 10,042,391 B2  8/2018  Yun et al.
2015/0062181 A1  3/2015  Lee et al.
(Continued)

FOREIGN PATENT DOCUMENTS

CN  104427129 A  3/2015
CN  105554194 A  5/2016
(Continued)

*Primary Examiner* — Nhan T Le
(74) *Attorney, Agent, or Firm* — Conley Rose, P.C.

(57) ABSTRACT

A message display method and an electronic device related to the fields of human-computer interaction, foldable displays, and the like. The electronic device includes a foldable display. The foldable display includes a first region, a second region, and a third region. When the electronic device is in a folded form, the second region is bent. The message display method includes displaying a first interface of a first application in the first region; receiving a first message of a second application; displaying the first message in the first region; detecting a first flipping action; and displaying the first message in the second region.

20 Claims, 48 Drawing Sheets

(56) References Cited

U.S. PATENT DOCUMENTS

| | | | |
|---|---|---|---|
| 2016/0132074 A1* | 5/2016 | Kim | G06F 1/1652 |
| | | | 345/173 |
| 2016/0188197 A1 | 6/2016 | Ryu et al. | |
| 2019/0138200 A1 | 5/2019 | Zhang | |
| 2020/0249898 A1 | 8/2020 | Ko et al. | |

FOREIGN PATENT DOCUMENTS

| | | | |
|---|---|---|---|
| CN | 107809504 A | 3/2018 | |
| CN | 107831999 A | 3/2018 | |
| CN | 107995973 A | 5/2018 | |
| CN | 108243282 A | 7/2018 | |
| CN | 109840061 A | 6/2019 | |
| CN | 110602273 A | 12/2019 | |
| EP | 2950193 A1 | 12/2015 | |
| EP | 3989525 A1 | 4/2022 | |
| KR | 20180089229 A | 8/2018 | |

* cited by examiner

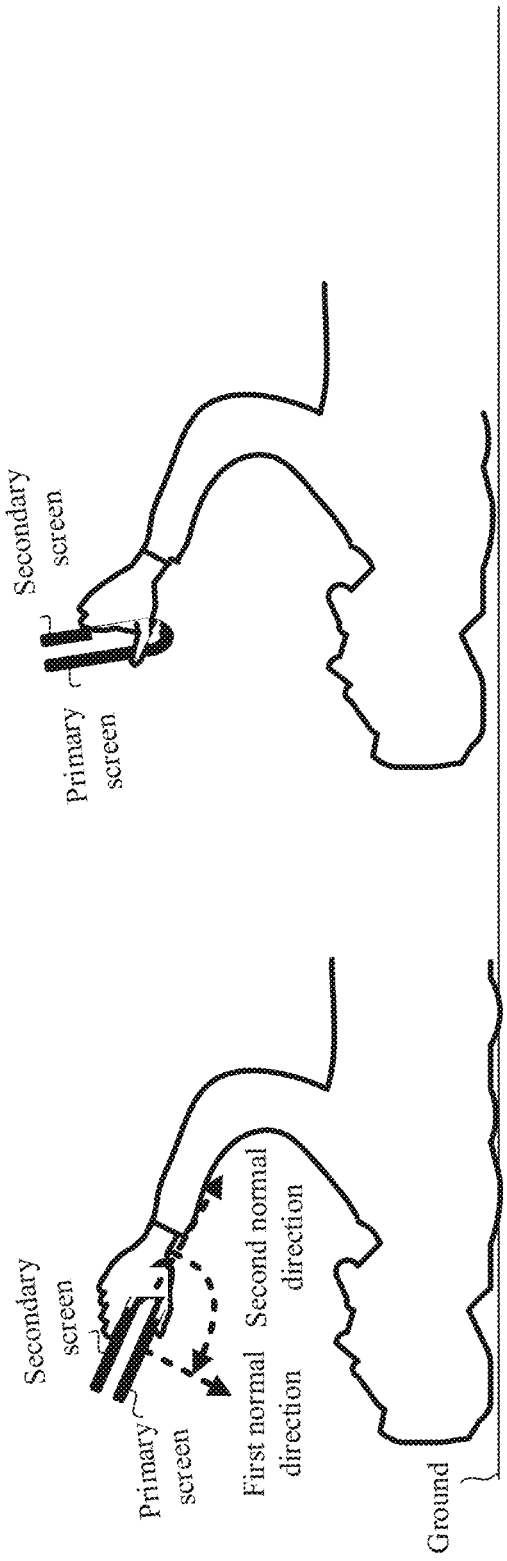
FIG. 15B(a)
FIG. 15B(b)
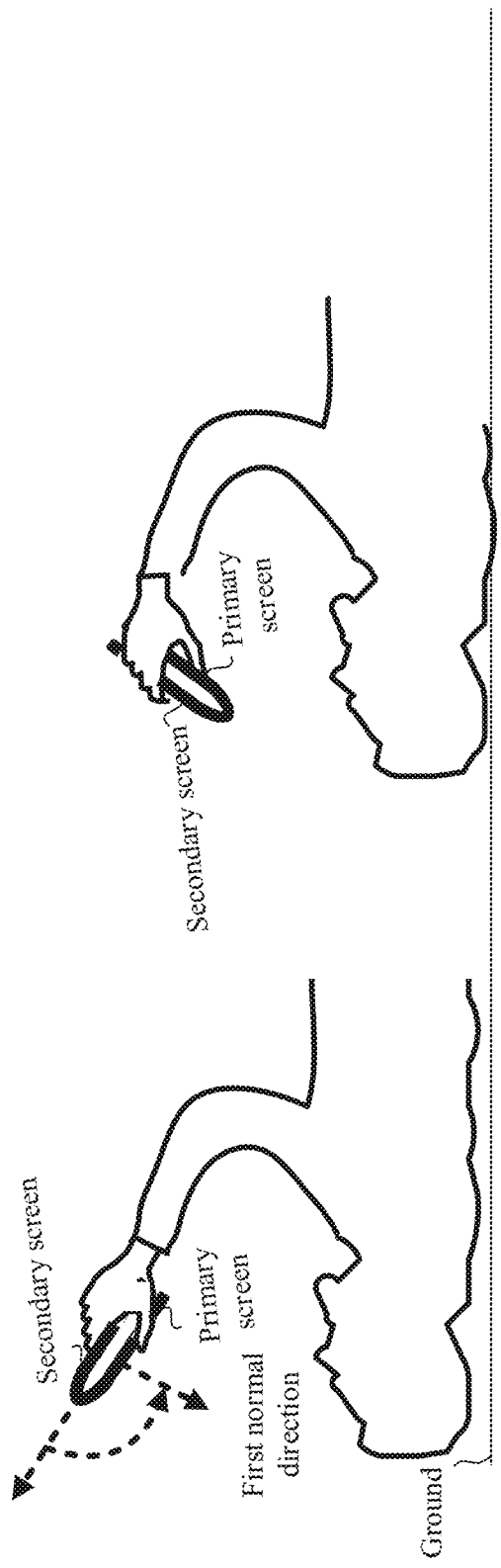
FIG. 15B(c)
FIG. 15B(d)

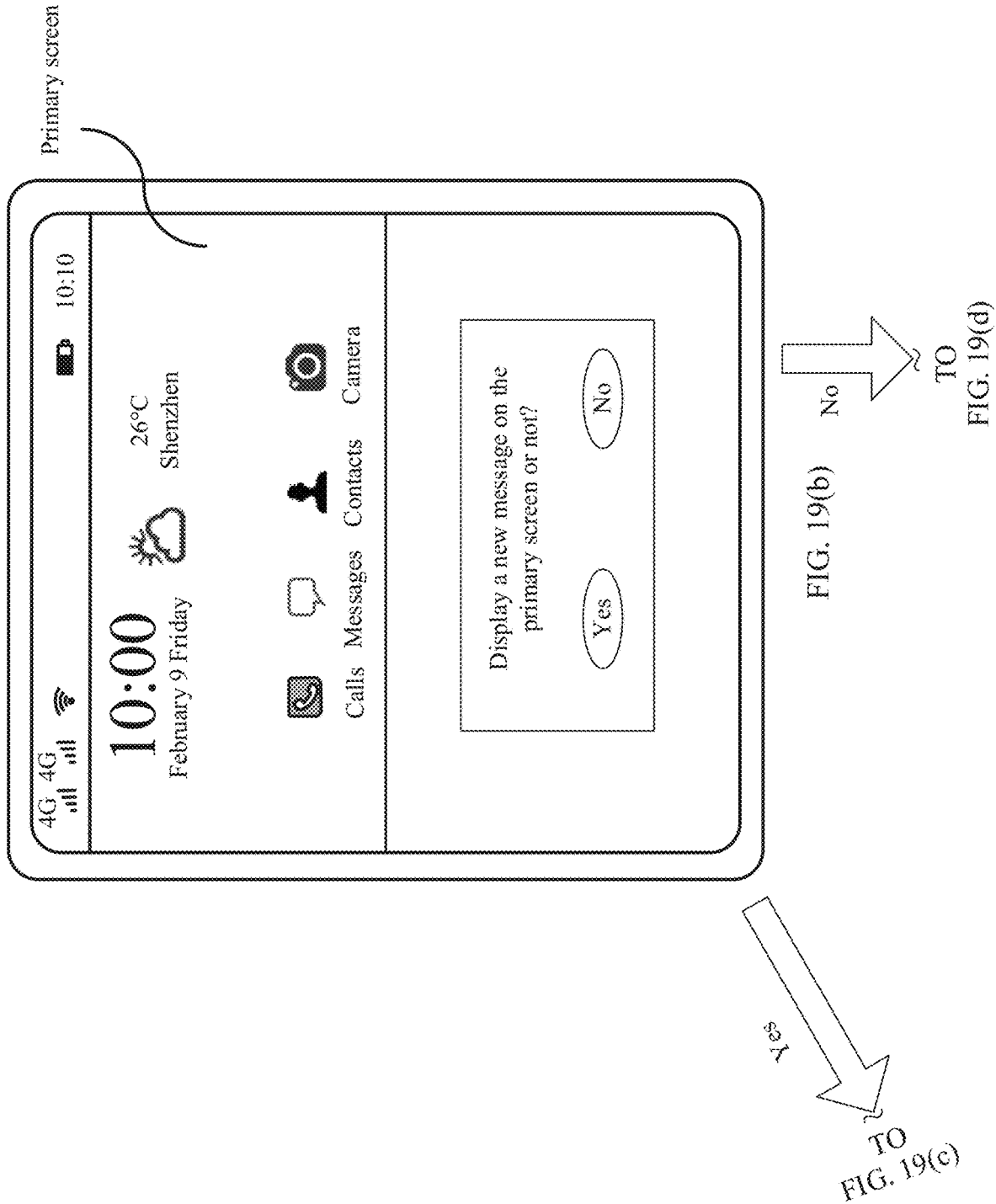

//  MESSAGE DISPLAY METHOD AND ELECTRONIC DEVICE

CROSS-REFERENCE TO RELATED APPLICATIONS

This is a U.S. National Stage of International Patent Application No. PCT/CN2020/104601 filed on Jul. 24, 2020, which claims priority to Chinese Patent Application No. 201910718031.3 filed on Aug. 5, 2019, both of which are hereby incorporated by reference in their entireties.

TECHNICAL FIELD

This application relates to the field of electronic technologies, and in particular, to a message display method and an electronic device.

BACKGROUND

With advancement of terminal technologies, electronic devices such as mobile phones provide increasingly abundant functions. For example, various application programs, such as a game, WeChat, and a camera, may be installed in a mobile phone to meet different requirements of a user.

In an example of a game application, when a user plays a game by using an electronic device such as a mobile phone, the mobile phone usually displays a game interface in full screen. Referring to FIG. 1(a), the mobile phone displays the game interface in full screen. In this scenario, if the mobile phone receives a new message or notification, the new message or notification is displayed in a status bar, as shown in FIG. 1(b). When detecting an operation targeted for the new message or notification in the status bar, the mobile phone switches the game application to a backend, and displays a display interface of an application corresponding to the new message or notification at a frontend, as shown in FIG. 1(c). Such a scenario in which a transaction currently being processed by a user is interrupted to display other content is prone to affecting user experience. Especially, during a game, exiting a game interface causes the game to be switched to a backend. This causes a game character to be killed, and causes game interruption and other problems, affecting user experience.

SUMMARY

An objective of this application is to provide a message display method and an electronic device. The method may be applicable to an electronic device having a foldable display. When the electronic device receives a message, the message can be viewed by using a side screen of the electronic device. This facilitates a user operation and improves user experience.

The foregoing objectives and another objective may be achieved by using features in independent claims. Further implementations are reflected in the dependent claims, the specification, and the accompanying drawings.

According to a first aspect, a message display method is provided. The method may be applicable to an electronic device provided with a foldable display, for example, a mobile phone or tablet computer that has a foldable display. The foldable display may include a first region, a second region, and a third region. When the electronic device is in a folded form, the second region is bent. The message display method may include: displaying a first interface of a first application in the first region; receiving a first message of a second application; displaying the first message in the first region; detecting a first flipping action, where the first flipping action is used to rotate the electronic device by a first preset angle along a first axis in a first direction, the first axis is an axis parallel to an unbent edge on the electronic device, and the first direction is a direction in which a second normal direction of the second region is rotated towards a first normal direction of the first region; and displaying the first message in the second region in response to the first flipping action.

In the embodiments of this application, when the electronic device is in the folded form, the second region is bent, and the second region forms a side screen. When receiving a message, the electronic device may display the message by using the side screen if detecting the first flipping action. That is, a user may view the message by using the side screen of the foldable electronic device. This fully utilizes the foldable display, facilitates a user operation, and improves user experience.

In a possible design, the electronic device detects a second flipping action, where the second flipping action is used to rotate the electronic device by a second preset angle along the first axis in a second direction, and the second direction is opposite to the first direction; and closes the first message in the second region in response to the second flipping action; and/or turns off the second region in response to the second flipping action.

For example, when the electronic device is in the folded form, a primary screen displays the first interface, and the side screen and a secondary screen are turned off. After the electronic device receives the first message of the second application, if detecting the first flipping operation, the electronic device displays the message by using the side screen; or if detecting the second flipping action (whose flipping direction is the same as that of the first flipping action), the electronic device turns off the side screen and/or closes the first message on the side screen. That is, in a process in which the user operates the primary screen of the electronic device (in the folded form), if the electronic device receives the first message of the second application, the user may flip the electronic device to view the first message by using the side screen; and if the user flips the electronic device in an opposite direction, the user may turn off the side screen and/or close the first message on the side screen. This facilitates a user operation and improves user experience.

In a possible design, the electronic device detects a third flipping action, where the third flipping action is used to rotate the electronic device by a third preset angle along the first axis in the first direction, and the third preset angle is greater than the first preset angle; and displays a second interface of the second application in the third region in response to the third flipping action, where the second interface includes the first message.

For example, when the electronic device is in the folded form, the primary screen displays the first interface, and the side screen and the secondary screen are turned off. The electronic device receives the first message of the second application. If detecting the first flipping operation, the electronic device displays the message by using the side screen. If detecting the third flipping operation, the electronic device displays the second interface of the second application by using the secondary screen. The second interface includes the first message. That is, in the process in which the user operates the primary screen of the electronic device (in the folded form), if the electronic device receives the first message of the second application, the user may flip the electronic device to view the first message by using the side screen; and may further continue to flip the electronic device to display the second interface of the second application by using the secondary screen. This facilitates a user operation and improves user experience.

In a possible design, the electronic device receives a second message; displays the second message in the first region; and when detecting that the foldable display changes from the folded form to an unfolded form, displays the second message in the second region.

For example, when the electronic device is in the folded form, the primary screen displays the first interface, and the side screen and the secondary screen are turned off. The electronic device receives the second message. If detecting a change from the folded form to the unfolded form, the electronic device displays the second message in the second region and/or the third region. That is, in the process in which the user operates the primary screen of the electronic device (in the folded form), if the electronic device receives the second message, the user may unfold the electronic device to view the second message by using the side screen and/or the secondary screen. This facilitates a user operation and improves user experience.

In a possible design, when detecting that the foldable display changes from the unfolded form to the folded form, the electronic device closes the second message in the second region; and/or when detecting that the foldable display changes from the unfolded form to the folded form, the electronic device turns off the second region.

For example, when the electronic device is in the folded form, the primary screen displays the first interface, and the side screen and the secondary screen are turned off. The electronic device receives the second message. If detecting a change from the folded form to the unfolded form, the electronic device displays the second message in the second region and/or the third region. If detecting a change from the unfolded form to the folded form, the electronic device turns off the second region and/or closes the second message in the second region. That is, in the process in which the user operates the primary screen of the electronic device (in the folded form), if the electronic device receives the second message, the user may unfold the electronic device to view the first message by using the side screen and/or the secondary screen. When the user folds the electronic device again, the second message in the second region is closed and/or the second region is turned off. This implements flexible use of the foldable display, facilitates a user operation, and improves user experience.

In a possible design, the electronic device receives a third message; displays the third message in the first region; and when detecting that the foldable display changes from the folded form to an unfolded form, enters a split-screen mode, where in the split-screen mode, the foldable display simultaneously displays the first interface of the first application and a third interface of a third application corresponding to the third message, and the third interface includes the third message.

For example, the electronic device receives the third message when it is in the folded form. If detecting that the foldable display changes from the folded form to the unfolded form, the electronic device enters the split-screen mode, and simultaneously displays the first interface of the first application and the third interface of the third application corresponding to the third message. This facilitates a user operation and improves user experience.

In a possible design, when detecting that the foldable display changes from the unfolded form to the folded form, the electronic device exits the split-screen mode, and turns off the third region, where the first region displays the first interface of the first application.

For example, the electronic device is in the folded form, and receives the third message. When changing from the folded form to the unfolded form, the electronic device enters the split-screen mode, and simultaneously displays the first interface of the first application and the third interface of the third application corresponding to the third message. When changing from the unfolded form to the folded form, the electronic device exits the split-screen mode. This implements flexible use of the foldable display, facilitates a user operation, and improves user experience.

In a possible design, after displaying the first message in the second region, if detecting a first operation targeted for the first message displayed in the second region, the electronic device performs close, deletion, or reply processing on the first message in response to the first operation.

In the embodiments of this application, when the electronic device is in the folded form, the electronic device can display a received message by using the side screen. The user may process the message on the side screen. This improves utilization of the foldable display, facilitates a user operation, and improves user experience.

According to a second aspect, an electronic device is further provided. The electronic device includes a foldable display and at least one processor, where the foldable display includes a first region, a second region, and a third region, and when the electronic device is in a folded form, the second region is bent; the first region is configured to display a first interface of a first application; the at least one processor is configured to: when a communications module in the electronic device receives a first message of a second application, display the first message by using the first region; and the at least one processor is further configured to: when a sensor module in the electronic device detects a first flipping action, display the first message by using the second region in response to the first flipping action; where the first flipping action is used to rotate the electronic device by a first preset angle along a first axis in a first direction, the first axis is an axis parallel to an unbent edge on the electronic device, and the first direction is a direction in which a second normal direction of the second region is rotated towards a first normal direction of the first region.

In a possible design, the at least one processor is further configured to: when the sensor module detects a second flipping action, close the first message in the second region in response to the second flipping action; and/or turn off the second region in response to the second flipping action; where the second flipping action is used to rotate the electronic device by a second preset angle along the first axis in a second direction, and the second direction is opposite to the first direction.

In a possible design, the at least one processor is further configured to: when the sensor module detects a third flipping action, display a second interface of the second application in the third region in response to the third flipping action, where the second interface includes the first message; where the third flipping action is used to rotate the electronic device by a third preset angle along the first axis in the first direction, and the third preset angle is greater than the first preset angle.

In a possible design, the at least one processor is further configured to: when the communications module receives a second message, display the second message by using the first region; and the at least one processor is further configured to: when it is determined that the foldable display changes from the folded form to an unfolded form, display the second message by using the second region.

In a possible design, the at least one processor is further configured to: when it is detected that the foldable display changes from the unfolded form to the folded form, close the second message in the second region; and/or when it is detected that the foldable display changes from the unfolded form to the folded form, turn off the second region.

In a possible design, the at least one processor is further configured to: when the communications module receives a third message, display the third message by using the first region; and the at least one processor is further configured to: when it is detected that the foldable display changes from the folded form to an unfolded form, control the foldable display to enter a split-screen mode, where in the split-screen mode, the foldable display simultaneously displays the first interface of the first application and a third interface of a third application corresponding to the third message, and the third interface includes the third message.

In a possible design, the at least one processor is further configured to: when it is detected that the foldable display changes from the unfolded form to the folded form, control the foldable display to exit the split-screen mode, and turn off the third region, where the first region displays the first interface of the first application.

In a possible design, the at least one processor is further configured to: after displaying the first message by using the second region, if a first operation targeted for the first message displayed in the second region is detected, perform close, deletion, or reply processing on the first message in response to the first operation.

According to a third aspect, an electronic device is further provided. The electronic device includes a foldable display, one or more processors, and one or more memories. The one or more memories store one or more computer programs, and the one or more computer programs include instructions. When the instructions are executed by the one or more processors, the electronic device is enabled to perform the technical solution in any one of the first aspect or the possible designs of the first aspect.

According to a fourth aspect, an electronic device is further provided. The electronic device includes modules/units that perform the method according to any one of the first aspect and the possible designs of the first aspect. These modules/units may be implemented by hardware, or may be implemented by hardware by executing corresponding software.

According to a fifth aspect, an embodiment of this application provides a chip. The chip is coupled to a memory in an electronic device, and performs the technical solution in any one of the first aspect of the embodiments of this application or the possible designs of the first aspect. In this embodiment of this application, "coupling" means that two components are directly or indirectly connected to each other.

According to a sixth aspect, an embodiment of this application provides a computer readable storage medium. The computer readable storage medium includes a computer program, and when the computer program is run on an electronic device, the electronic device is enabled to perform the technical solution according to any one of the first aspect or the possible designs of the first aspect of the embodiments of this application.

According to a seventh aspect, an embodiment of this application provides a computer program product. When the computer program product runs on an electronic device, the electronic device is enabled to perform the technical solution according to any one of the first aspect or the possible designs of the first aspect of the embodiments of this application.

According to an eighth aspect, an embodiment of this application further provides a graphical user interface on an electronic device. The electronic device has a foldable display, one or more memories, and one or more processors. The one or more processors are configured to execute one or more computer programs stored in the one or more memories. The graphical user interface includes a graphical user interface displayed when the electronic device performs the technical solution in any one of the first aspect of the embodiments of this application or the possible designs of the first aspect.

BRIEF DESCRIPTION OF DRAWINGS

FIG. 15B(a) to FIG. 15B(d) are a schematic diagram of a flipping process of a foldable electronic device according to an embodiment of this application:

DESCRIPTION OF EMBODIMENTS

Figure 1A:
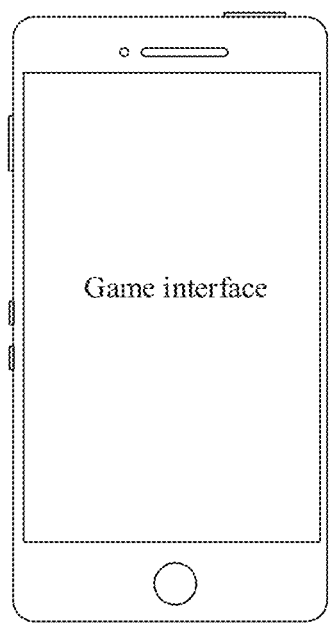
FIG. 1(a).
Figure 1B:
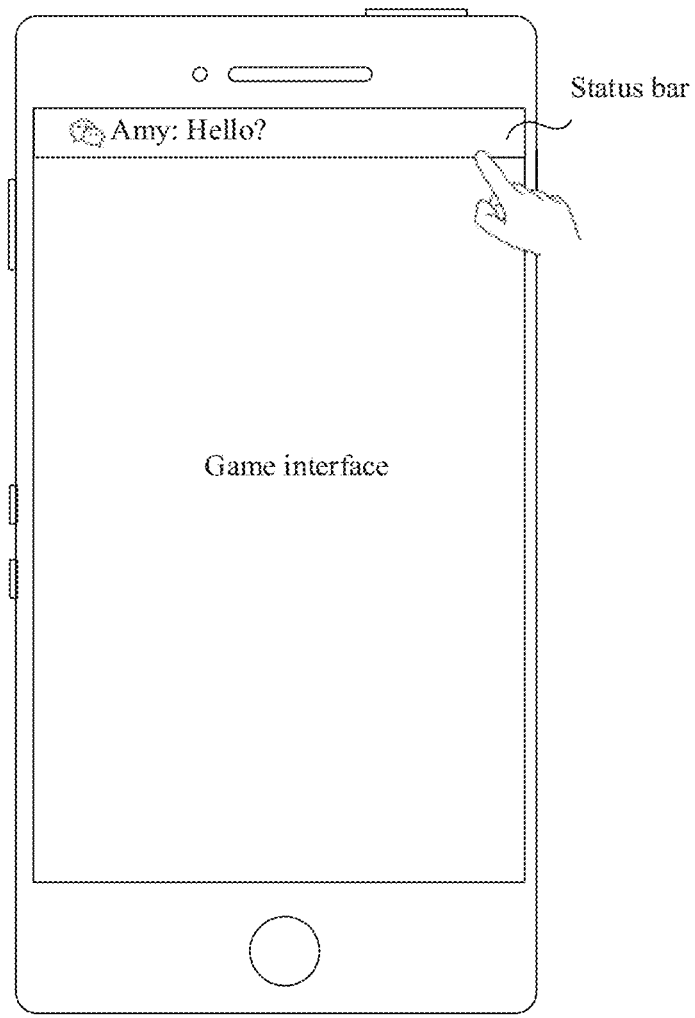
FIG. 1(b), and FIG. 1(c) are schematic diagrams of graphical user interfaces of a mobile phone according to an embodiment of this application.
Figure 1C:
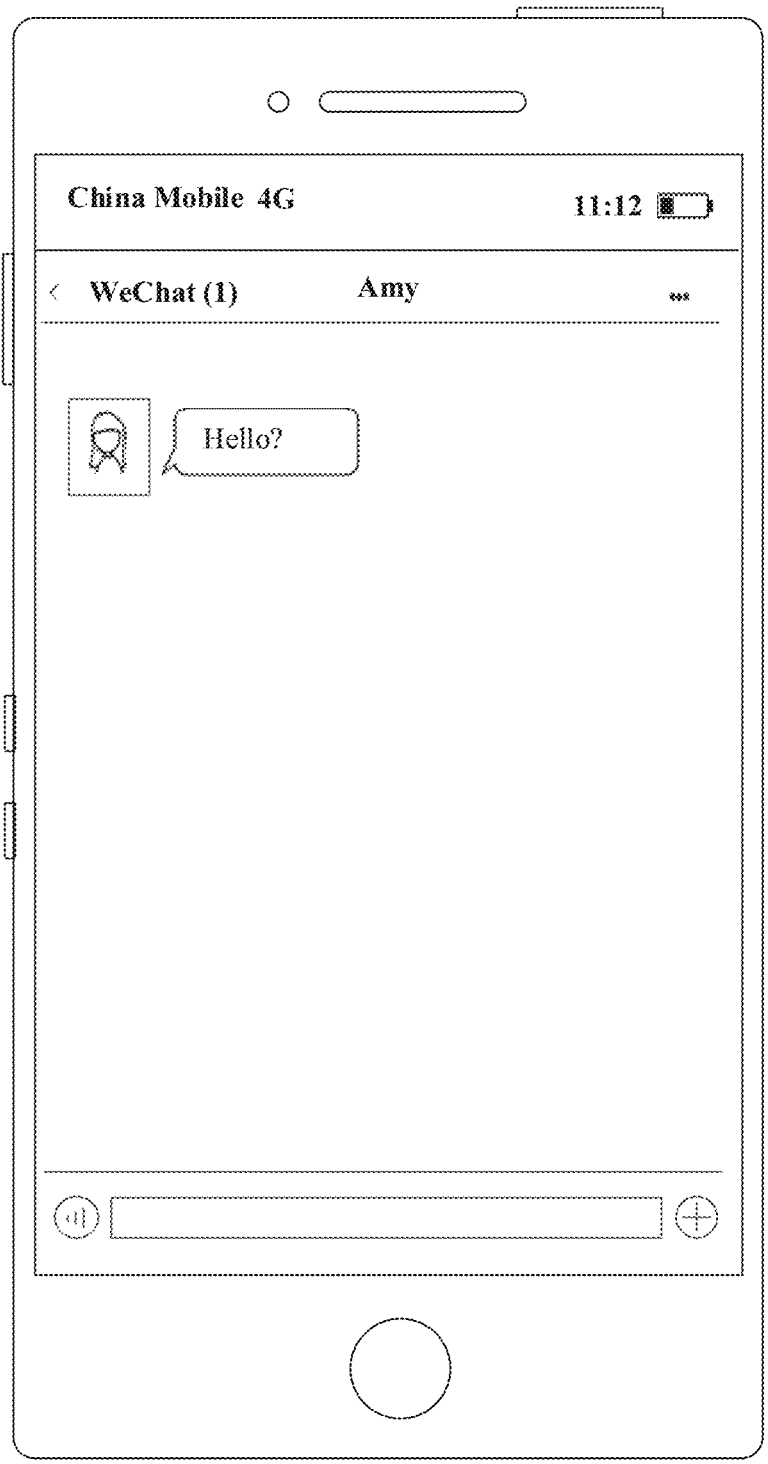

The following describes the technical solutions in the embodiments of this application with reference to accompanying drawings in the embodiments of this application.

Terms used in the following embodiments of this application are merely intended to describe specific embodiments, but are not intended to limit this application. The terms "one". "a", "the", "the foregoing", "this", and "the one" of singular forms used in this specification and the appended claims of this application are also intended to include expressions such as "one or more", unless otherwise specified in the context clearly. It should be further understood that, in the embodiments of this application, "one or more" means one, two, or more. In addition, "and/or" describes an association relationship between associated objects, and indicates that three relationships may exist. For example, A and/or B may indicate the following cases: Only A exists, both A and B exist, and only B exists, where A and B may be singular or plural. The character "/" generally represents an "or" relationship between the associated objects.

Reference to "one embodiment" or "some embodiments" described in this specification or the like means that one or more embodiments of this application include a particular feature, structure, or characteristic described in combination with the embodiment. Thus, phrases "in one embodiment", "in some embodiments", "in some other embodiments", "in some additional embodiments", and the like that appear in different parts in this specification do not necessarily mean referring to a same embodiment, but mean "one or more embodiments, but not all embodiments", unless otherwise specifically emphasized. The terms "include". "comprise", "have", and their variants all mean "include but are not limited to", unless otherwise specifically emphasized.

The following explains some terms in the embodiments of this application, to help understanding of a person skilled in the art.

In the embodiments of this application, "at least one" means one or more, and "a plurality of" means two or more. In addition, it should be understood that, in descriptions of this application, terms such as "first" and "second" are merely used for differentiation and description, but cannot be understood as an indication or implication of relative importance or an indication or implication of an order.

An application (application, app) program in the embodiments of this application may be referred to as an application for short, and is a software program that can implement one or more specific functions. Generally, a plurality of applications may be installed on an electronic device, for example, an instant messaging application, a video application, an audio application, and an image shooting application. The instant messaging application may be, for example, a "Messages" application, WeChat (WeChat), WhatsApp Messenger, Line (Line), Instagram (instagram), Kakao Talk, and DingTalk. The image shooting application may include, for example, a camera application (a system camera or a third-party camera application). The video application may include, for example, YouTube, Twitter, TikTok, iQIYI, and Tencent Video. The audio application may include, for example, KuGou, EMUMO, and QQ music. The application mentioned in the following embodiments may be an application installed before delivery of the electronic device, or may be an application downloaded from a network or obtained from another electronic device by a user in a process of using the electronic device.

An embodiment of this application provides a message display method. The method may be applied to any electronic device having a side screen, such as a mobile phone, a tablet computer, a wearable device (for example, a smartwatch, a smart band, and a smart helmet), a vehicle-mounted device, a smart home, an augmented reality (augmented reality, AR) device/a virtual reality (virtual reality, VR) device, a notebook computer, an ultra-mobile personal computer (ultra-mobile personal computer, UMPC), a netbook, or a personal digital assistant (personal digital assistant, PDA). In the message display method provided in this embodiment of this application, when the electronic device receives a new message, a user may view or process the new message by using the side screen of the electronic device, so as to avoid affecting a display interface on a primary screen of the electronic device. In some embodiments, the electronic device having the side screen may be an electronic device having a curved screen. For example, the curved screen is disposed on a front surface, a side surface, or the like of the electronic device. A display region corresponding to the front surface of the electronic device may be used as a primary screen, and a display region corresponding to the side surface of the electronic device may be used as a side screen. For another example, the electronic device having a side screen may alternatively be a foldable electronic device, such as a foldable mobile phone. When the foldable electronic device is in a folded form, a display region corresponding to a bend part on the foldable electronic device may be used as the side screen. It should be noted that the message display method provided in this embodiment of this application may be applied to any electronic device having the side screen. Details are not listed one by one in this embodiment of this application. The following embodiments are described mainly by using a foldable electronic device as an example.

Figure 2:
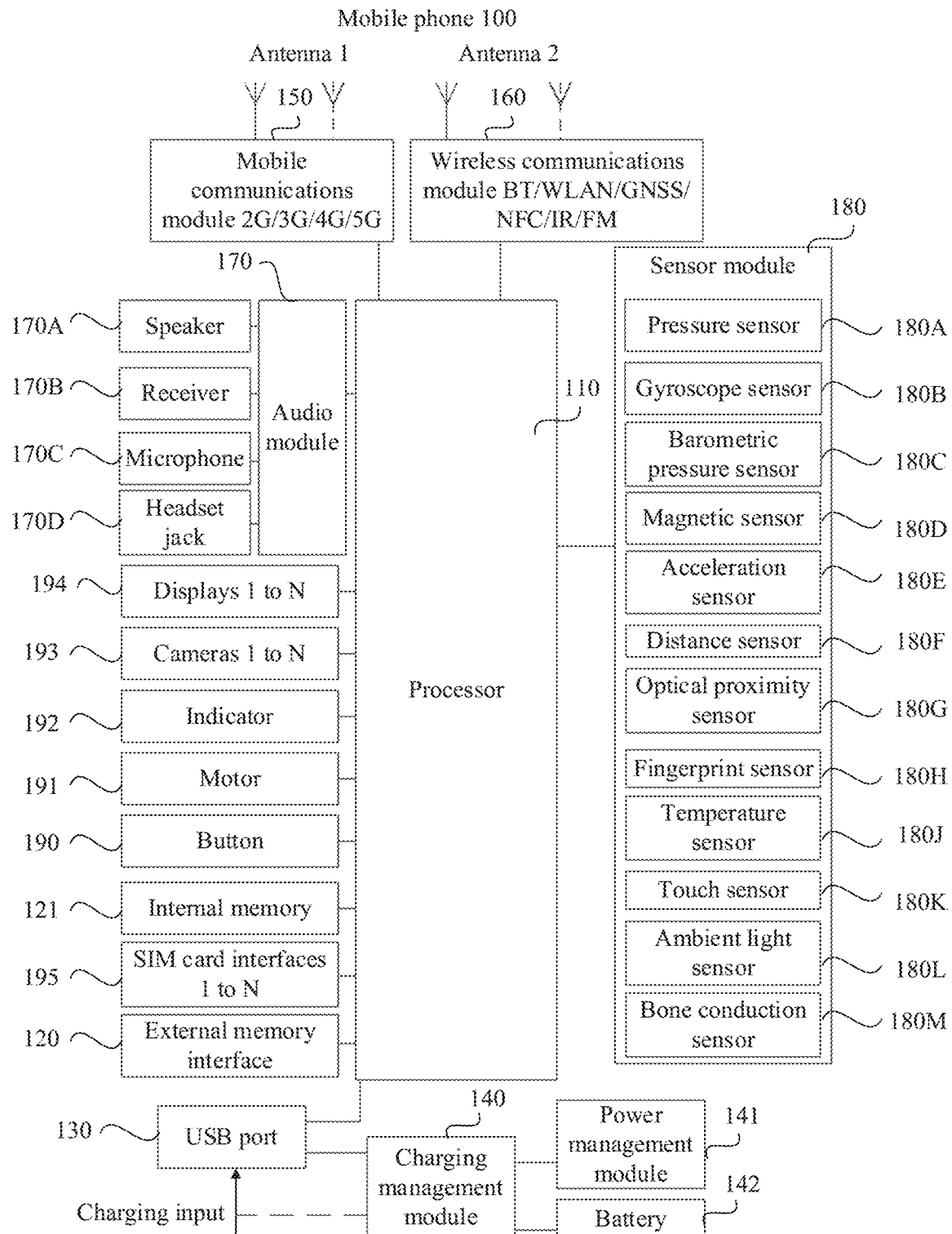
FIG. 2 is a schematic diagram of a hardware structure of a foldable electronic device according to an embodiment of this application.

For example, FIG. 2 is a schematic diagram of a structure of a foldable electronic device.

As shown in FIG. 2, the foldable electronic device may include a processor 110, an external memory interface 120, an internal memory 121, a universal serial bus (universal serial bus, USB) port 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (subscriber identity module, SIM) card interface 195, and the like.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent components, or may be integrated into one or more processors. The controller may be a nerve center and a command center of the foldable electronic device. The controller may generate an operation control signal based on instruction operation code and a time sequence signal, to complete control of instruction fetching and instruction execution. A memory may be further disposed in the processor 110, and is configured to store an instruction and data. In some embodiments, the memory in the processor 110 is a cache. The memory may store an instruction or data that has been used or is cyclically used by the processor 110. If the processor 110 needs to use the instruction or the data again, the processor 110 may directly invoke the instruction or the data from the memory. This avoids repeated access and reduces a waiting time of the processor 110, thereby improving efficiency of the system.

The USB port 130 is a port that conforms to a USB standard specification, and may be specifically a mini USB port, a micro USB port, a USB type-C port, or the like. The USB port 130 may be used to connect to a charger for charging the foldable electronic device, or may be used to transmit data between the foldable electronic device and a peripheral device. The charging management module 140 is configured to receive a charging input from the charger. The power management module 141 is configured to connect the battery 142 and the charging management module 140 to the processor 110. The power management module 141 receives an input of the battery 142 and/or the charging management module 140, and supplies power to the processor 110, the internal memory 121, an external memory, the display 194, the camera 193, the wireless communications module 160, and the like.

A wireless communication function of the foldable electronic device may be implemented through the antenna 1, the antenna 2, the mobile communications module 150, the wireless communications module 160, the modem processor, the baseband processor, and the like. The antenna 1 and the antenna 2 are configured to transmit and receive electromagnetic wave signals. Each antenna in the foldable electronic device may be configured to cover one or more communication bands. Different antennas may be further multiplexed, to improve antenna utilization. For example, the antenna 1 may be multiplexed as a diversity antenna in a wireless local area network. In some other embodiments, the antenna may be used in combination with a tuning switch.

The mobile communications module 150 may provide a wireless communication solution that includes 2G/3G/4G/5G or the like and that is applied to the foldable electronic device. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering and amplification on the received electromagnetic wave, and transmit a processed electromagnetic wave to the modem processor for demodulation. The mobile communications module 150 may further amplify a signal modulated by the modem processor, and convert the signal into an electromagnetic wave by using the antenna 1 for radiation. In some embodiments, at least some function modules of the mobile communications module 150 may be disposed in the processor 110. In some embodiments, at least some function modules of the mobile communications module 150 and at least some modules of the processor 110 may be disposed in a same device.

The wireless communications module 160 may provide a wireless communication solution that includes a wireless local area network (wireless local area network, WLAN) (for example, a wireless fidelity (wireless fidelity, Wi-Fi) network), Bluetooth (Bluetooth, BT), a global navigation satellite system (global navigation satellite system. GNSS), frequency modulation (frequency modulation, FM), a near field communication (near field communication, NFC) technology, an infrared (infrared, IR) technology, and the like and that is applied to the foldable electronic device. The wireless communications module 160 may be one or more components integrating at least one communications processing module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert a processed signal into an electromagnetic wave through the antenna 2 for radiation.

In some embodiments, the antenna 1 of the foldable electronic device is coupled to the mobile communications module 150, and the antenna 2 is coupled to the wireless communications module 160, so that the foldable electronic device may communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system GLONASS), a beidou navigation satellite system (beidou navigation satellite system, BDS), a quasi-zenith satellite system (quasi-zenith satellite system, QZSS), and/or a satellite based augmentation system (satellite based augmentation system, SBAS).

The display 194 is configured to display a display interface of an application, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), quantum dot light emitting diodes (quantum dot light emitting diodes, QLED), or the like. In some embodiments, the foldable electronic device may include one or N displays 194, where N is a positive integer greater than 1.

The camera 193 is configured to capture a static image or a video. In some embodiments, the camera 193 may include at least one camera, for example, one front-facing camera and one rear-facing camera.

The internal memory 121 may be configured to store computer executable program code, and the executable program code includes an instruction. The processor 110 runs the instructions stored in the internal memory 121 to execute various function applications of the foldable electronic device and data processing. The internal memory 121 may include a program storage area and a data storage area. The program storage area may store an operating system, software code of at least one application (such as an iQIYI application or a WeChat application), and the like. The data storage area may store data (for example, an image or a video) generated in a process of using the foldable electronic device, and the like. In addition, the internal memory 121 may include a high-speed random access memory, and may further include a nonvolatile memory, for example, at least one magnetic disk storage device, a flash memory, and a universal flash storage (universal flash storage, UFS).

The external memory interface 120 may be configured to connect to an external memory card, for example, a micro SD card, to extend a storage capability of the foldable electronic device. The external memory card communicates with the processor 110 through the external memory interface 120, to implement a data storage function. For example, files such as music and a video are stored in the external memory card.

The foldable electronic device may implement audio functions, for example, music playing and recording, by using the audio module 170, the speaker 170A, the receiver 170B, the microphone 170C, the headset jack 170D, the application processor, and the like.

The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

The pressure sensor 180A is configured to sense a pressure signal, and can convert the pressure signal into an electrical signal. In some embodiments, the pressure sensor 180A may be disposed on the display 194. The gyroscope sensor 180B may be configured to determine a motion posture of the foldable electronic device. In some embodiments, an angular velocity of the foldable electronic device around three axes (namely, axes X, Y. and Z) may be determined by using the gyroscope sensor 180B.

The gyroscope sensor 180B may be configured to implement image stabilization during photographing. The barometric pressure sensor 180C is configured to measure barometric pressure. In some embodiments, the foldable electronic device calculates an altitude based on a barometric pressure value measured by the barometric pressure sensor 180C, to assist in positioning and navigation. The magnetic sensor 180D includes a Hall effect sensor. The foldable electronic device may detect opening and closing of a flip leather case by using the magnetic sensor 180D. In some embodiments, when the foldable electronic device is a clamshell phone, the foldable electronic device may detect opening and closing of a flip cover by using the magnetic sensor 180D. Further, a feature such as automatic unlocking upon opening of the flip cover is set based on a detected opening or closing state of the leather case or a detected opening or closing state of the flip cover. The acceleration sensor 180E may detect accelerations in various directions (usually on three axes) of the foldable electronic device, and may detect magnitude and a direction of gravity when the foldable electronic device is still. The acceleration sensor may be further configured to recognize a posture of the electronic device, and is used in screen switching between a landscape mode and a portrait mode, a pedometer, or another application.

The distance sensor 180F is configured to measure a distance. The foldable electronic device may measure the distance in an infrared or a laser manner. In some embodiments, in a shooting scenario, the foldable electronic device may measure a distance by using the distance sensor 180F, to implement quick focusing. The optical proximity sensor 180G may include, for example, a light-emitting diode (LED) and an optical detector such as a photodiode. The light-emitting diode may be an infrared light-emitting diode. The foldable electronic device emits infrared light through the light-emitting diode. The foldable electronic device detects infrared reflected light from a nearby object by using the photodiode. When sufficient reflected light is detected, the foldable electronic device may determine that there is an object near the foldable electronic device. When insufficient reflected light is detected, the foldable electronic device may determine that there is no object near the foldable electronic device. The foldable electronic device may detect, by using the optical proximity sensor 180G, that a user holds the foldable electronic device close to an ear to make a call, to automatically perform screen-off for power saving. The optical proximity sensor 180G may also be used in a leather case mode or a pocket mode to automatically unlock or lock the screen.

The ambient light sensor 180L is configured to sense ambient light brightness. The foldable electronic device may adaptively adjust brightness of the display 194 based on the sensed ambient light brightness. The ambient light sensor 180L may also be configured to automatically adjust a white balance during photographing. The ambient light sensor 180L may also cooperate with the optical proximity sensor 180G to detect whether the foldable electronic device is in a pocket, to avoid an accidental touch. The fingerprint sensor 180H is configured to collect a fingerprint. The foldable electronic device may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the foldable electronic device executes a temperature processing policy based on the temperature detected by the temperature sensor 180J. For example, when the temperature reported by the temperature sensor 180W exceeds a threshold, the foldable electronic device lowers performance of a processor located near the temperature sensor 1803, to reduce power consumption to implement thermal protection. In some other embodiments, when the temperature is less than another threshold, the foldable electronic device heats the battery 142 to prevent the foldable electronic device from being shut down abnormally due to a low temperature. In some other embodiments, when the temperature is less than still another threshold, the foldable electronic device boosts an output voltage of the battery 142, to avoid abnormal shutdown due to a low temperature.

The touch sensor 180K may also be referred to as a "touch panel". The touch sensor 180K may be disposed on the display 194, and the touch sensor 180K and the display 194 constitute a touchscreen, which is also referred to as a "touchscreen". The touch sensor 180K is configured to detect a touch operation performed on or near the touch sensor 180K. The touch sensor may transfer the detected touch operation to the application processor, to determine a type of a touch event. Visual output related to the touch operation may be provided on the display 194. In some other embodiments, the touch sensor 180K may alternatively be disposed on a surface of the foldable electronic device at a location different from a location of the display 194.

The bone conduction sensor 180M may obtain a vibration signal. In some embodiments, the bone conduction sensor 180M may obtain a vibration signal of a vibration bone of a human vocal part. The bone conduction sensor 180M may also be in contact with a human pulse, and receive a blood pressure beating signal.

The button 190 includes a power button, a volume button, and the like. The button 190 may be a mechanical button, or may be a touch button. The foldable electronic device may receive a button input, and generate a button signal input related to a user setting and function control of the foldable electronic device. The motor 191 may generate a vibration prompt. The motor 191 may be configured to produce an incoming call vibration prompt and a touch vibration feedback. For example, touch operations performed on different applications (for example, photographing and audio playing) may correspond to different vibration feedback effects. The indicator 192 may be an indicator light, and may be configured to indicate a charging status and a power change, or may be configured to indicate a message, a missed call, a notification, and the like. The SIM card interface 195 is used to connect to a SIM card. The SIM card may be inserted into the SIM card interface 195 or removed from the SIM card interface 195, to implement contact with or separation from the foldable electronic device.

It may be understood that the components shown in FIG. 2 do not constitute a specific limitation on a mobile phone. The mobile phone may further include more or fewer components than those shown in the figure, or combine some components, or split some components, or have different component arrangements. The following embodiments provide descriptions by using the foldable electronic device shown in FIG. 2 as an example.

Figure 3:
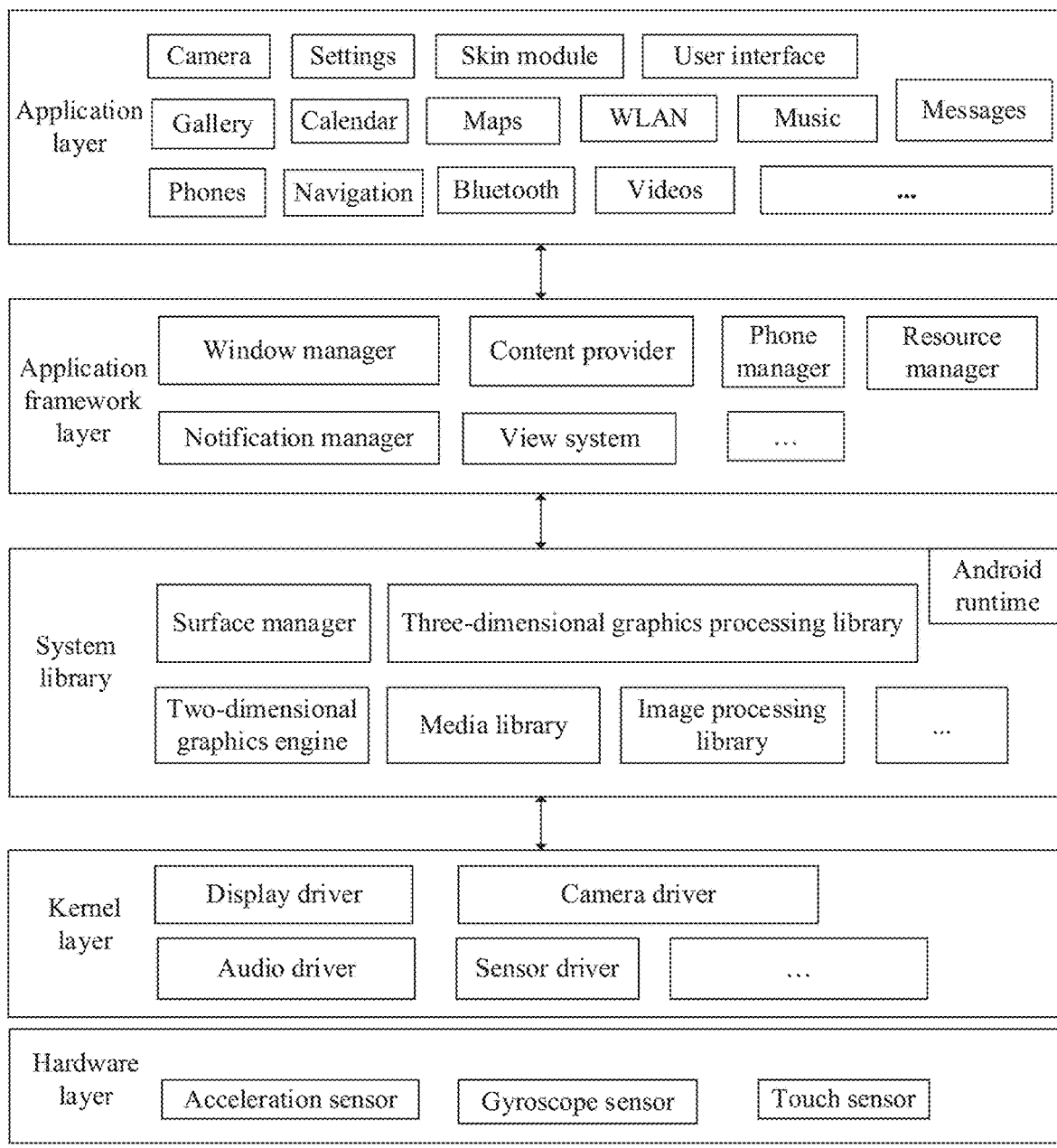
FIG. 3 is a schematic diagram of a software structure of a foldable electronic device according to an embodiment of this application.

FIG. 3 is a block diagram of a software structure of an electronic device according to an embodiment of this application. As shown in FIG. 3, the software structure of the electronic device may be a layered architecture. For example, software may be divided into several layers, and each layer has a clear role and responsibility. The layers communicate with each other through a software interface. In some embodiments, an Android system is divided into four layers: an application layer, an application framework (framework, FWK) layer, an Android runtime (Android runtime) and system library, and a kernel layer from top to bottom.

The application layer may include a series of application packages. As shown in FIG. 3, the application layer may include "Camera", "Settings", a skin module, a user interface (user interface, UI), a third-party application, and the like. The third-party application may include "WeChat", "QQ", "Gallery", "Calendar", "Phones", "Maps", "Navigation", "WLAN", "Bluetooth", "Music", "Videos", "Messages", and the like.

The application framework layer provides an application programming interface (application programming interface, API) and a programming framework for an application of the application layer. The application framework layer may include some predefined functions. As shown in FIG. 3, the application framework layer may include a window manager, a content provider, a view system, a phone manager, a resource manager, a notification manager, and the like.

The window manager is configured to manage a window program. The window manager may obtain a size of a display, determine whether there is a status bar, perform screen locking, take a screenshot, and the like. The content provider is configured to store and obtain data, and enable the data to be accessed by an application. The data may include a video, an image, audio, calls that are made and received, a browsing history and bookmarks, a phone book, and the like.

The view system includes visual controls, such as a control for displaying a text and a control for displaying an image. The view system may be configured to construct an application. A display interface may include one or more views. For example, a display interface including a message notification icon may include a text display view and a picture display view.

The phone manager is configured to provide a communication function of the electronic device 100, for example, management of a call status (including answering, declining, or the like).

The resource manager provides various resources for an application, such as a localized character string, an icon, a picture, a layout file, and a video file.

The notification manager enables an application to display notification information in a status bar, and may be configured to convey a notification type message, where the displayed notification information may automatically disappear after a short pause and require no user interaction. For example, the notification manager is configured to provide notifications of download completing, a message prompt, and the like. The notification manager may alternatively be a notification that appears in a top status bar of the system in a form of a graph or a scroll bar text, for example, a notification of an application running on the background or a notification that appears on the screen in a form of a dialog window. For example, text information is displayed in the status bar, an alert sound is played, the electronic device vibrates, or the indicator light blinks.

The Android runtime includes a kernel library and a virtual machine. The Android runtime is responsible for scheduling and management of the Android system.

The kernel library includes two parts: a function that needs to be invoked in Java language and a kernel library of Android. The application layer and the application framework layer run on the virtual machine. The virtual machine executes Java files at the application layer and the application framework layer as binary files. The virtual machine is configured to implement functions such as object lifecycle management, stack management, thread management, security and exception management, and garbage collection.

The system library may include a plurality of function modules, for example, a surface manager (surface manager), a media library (media library), a three-dimensional graphics processing library (for example, OpenGL ES), a 2D graphics engine (for example, SGL), and the like.

The surface manager is configured to manage a display subsystem and provide fusion of 2D and 3D layers for a plurality of applications.

The media library supports playback and recording of audio and video in a plurality of commonly used formats, static image files, and the like. The media library may support a plurality of audio and video coding formats such as MPEG4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

In addition, the system library may further include a form detection module, configured to identify a physical form of the foldable electronic device. For example, the form detection module may be configured to determine the physical form of the foldable electronic device based on sensor data uploaded by various types of sensors at a hardware layer. The physical form may include a folded form, an unfolded form, a semi-folded form with a specific angle, and the like.

The kernel layer is a layer between hardware and software. The kernel layer includes at least a display driver, a camera driver, an audio driver, and a sensor driver.

The hardware layer may include various types of sensors, for example, an acceleration sensor, a gyroscope sensor, and a touch sensor in this embodiment of this application.

The following describes working procedures of software and hardware of the foldable electronic device by using an example with reference to the new-message display method in this embodiment of this application.

In an example, after collecting sensor data, a sensor (for example, the acceleration sensor) in the hardware layer may send the sensor data to the system library by using the kernel layer. The form detection module in the system library determines a current physical form of the foldable electronic device based on the sensor data. In some embodiments, when the system library layer determines that the current physical form of the foldable electronic device is the folded form, if the foldable electronic device receives a new message or notification by using the wireless communications module 160 or the mobile communications module 150, the new message or notification may be displayed on the side screen of the foldable electronic device by using the hardware layer. In some other embodiments, when the system library layer determines that the current physical form of the foldable electronic device is the folded form, if the foldable electronic device receives a new message or notification by using the wireless communications module 160 or the mobile communications module 150, the new message or notification may be displayed on the primary screen (for example, a status bar on the primary screen) of the foldable electronic device by using the hardware layer. When the system library determines, based on the sensor data, that the side screen of the foldable electronic device is flipped upward, the new message or notification may be displayed on the side screen of the foldable electronic device by using the hardware layer. In this way, the user can view the new message by using the side screen. This implements proper use of the display.

FIG. 4(a), FIG. 4(b), FIG. 4(c), and FIG. 4(d) are schematic diagrams of a plurality of physical forms of a foldable electronic device according to an embodiment of this application. FIG. 5 is a schematic diagram of unfolded angles corresponding to different physical forms of a foldable electronic device according to an embodiment of this application. The following embodiments describe the foldable electronic device with reference to FIG. 4(a), FIG. 4(b), FIG. 4(c), FIG. 4(d), and FIG. 5.

Figure 4A:
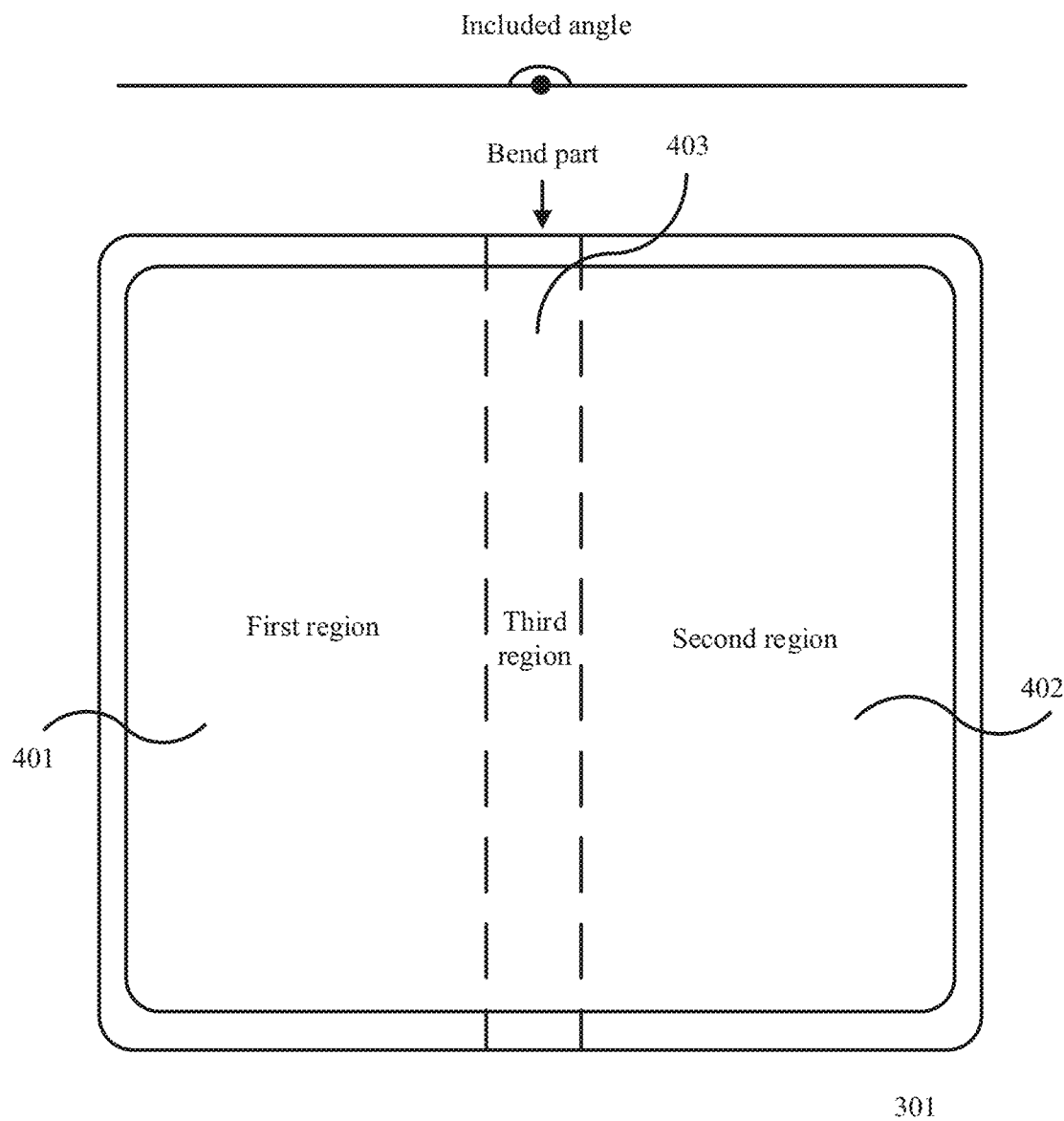
FIG. 4(a), FIG. 4(b), FIG. 4(c), and FIG. 4(d) are schematic diagrams of physical forms of a left-right foldable electronic device according to an embodiment of this application.
Figure 5:
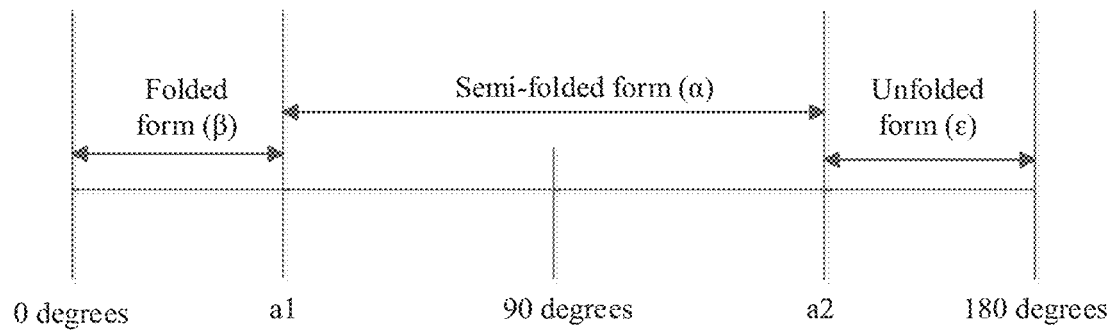
FIG. 5 is a schematic diagram of unfolded angles corresponding to different physical forms of a foldable electronic device according to an embodiment of this application.

As shown in FIG. 4(a), the foldable electronic device may include a first part 401, a second part 402, and a third part 403. The third part 403 may be a bend part. When the bend part is bent or deformed, an included angle (which may be referred to as an unfolding angle for short below) between the first part 401 and the second part 402 may be changed. Correspondingly, display regions on the display of the foldable electronic device may include three regions, which are respectively a first region, a second region, and a third region. As shown in FIG. 4(a), the first region corresponds to the first part 401, the second region corresponds to the second part 402, and the third region corresponds to the third part 403. Because the third part 403 is a bend part, when the bend part is bent or deformed, the third region may form the side screen.

In some embodiments, the display of the foldable electronic device may be a whole screen, and the first region, the second region, and the third region may be different regions on the whole screen. In some other embodiments, the display of the foldable electronic device may be formed by splicing a plurality of screens, for example, formed by splicing three screens, where the first region is a display region on a first screen, the second region is a display region on a second screen, and the third region is a display region on a third screen. This is not limited in this embodiment of this application. It should be understood that, the first region of the foldable electronic device may serve as the primary screen, and the second region may serve as a secondary screen. Alternatively, the first region may serve as a secondary screen, and the second region may serve as the primary screen. The primary screen and the secondary screen may have a same function or have different functions. Specifically, which region is used as the primary screen and which region is used as the secondary screen may be specified by a user, or may be set by default before delivery of the foldable electronic device. This is not limited in this embodiment of this application.

In some embodiments, when the angle between the first part 401 and the second part 402 on the foldable electronic device is different, the foldable electronic device may form a different physical form, for example, the folded form, a semi-folded form with a specific angle, or the unfolded form. It should be understood that division of the screens of the foldable electronic device into physical forms and definition of each physical form are not limited in this embodiment of this application.

Figure 4B:
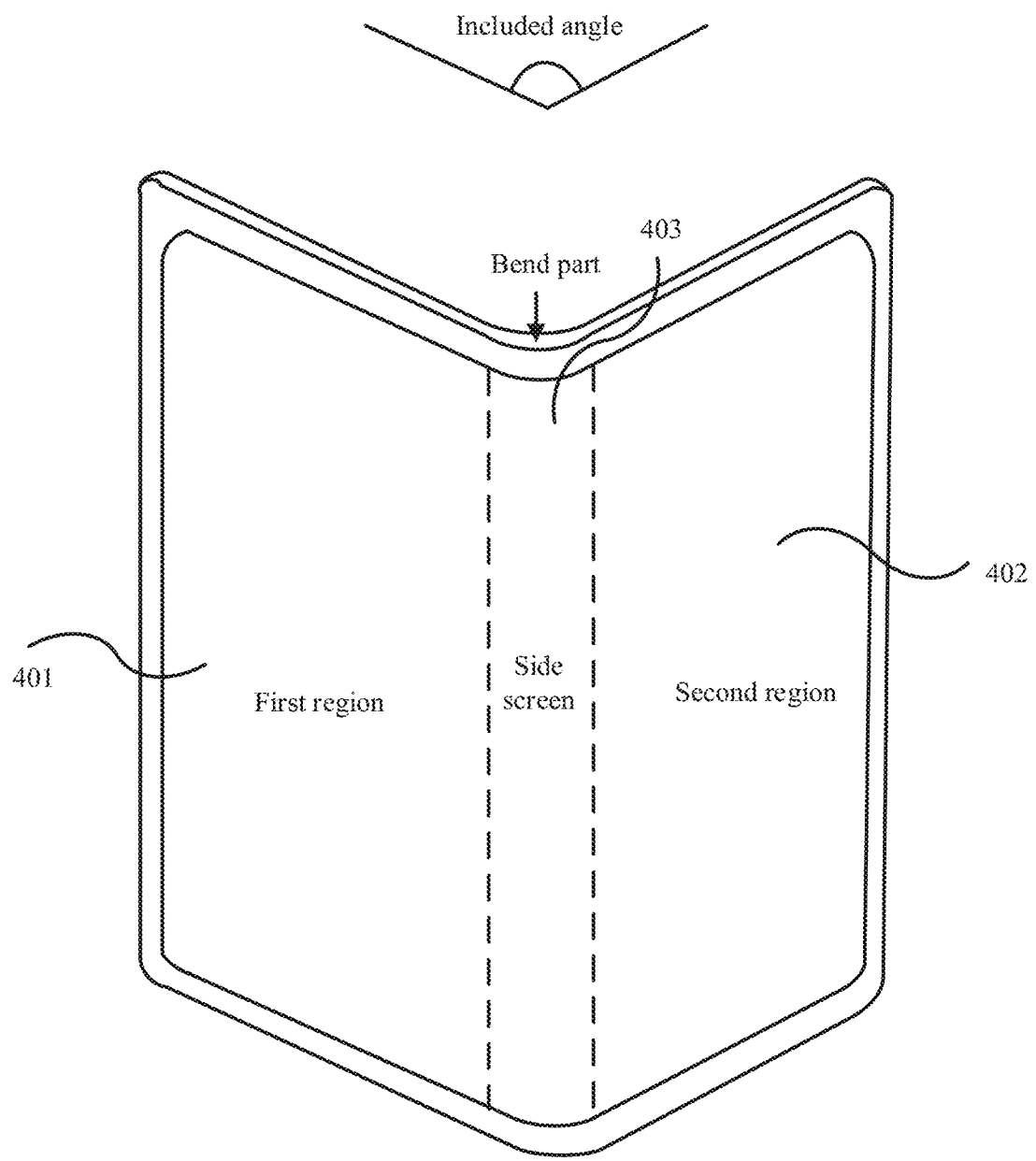

For example, when the foldable electronic device is in an unfolded form, the foldable electronic device may be shown in FIG. 4(a) or in FIG. 4(b). Specifically, when the foldable electronic device is in the unfolded form, an included angle between the first region and the second region is a first angle ε. As shown in FIG. 5, a2≤ε≤180 degrees, where a2 is greater than 90 degrees and less than or equal to 180 degrees. For example, a2 may be 150 degrees, or 180 degrees.

Figure 4C:
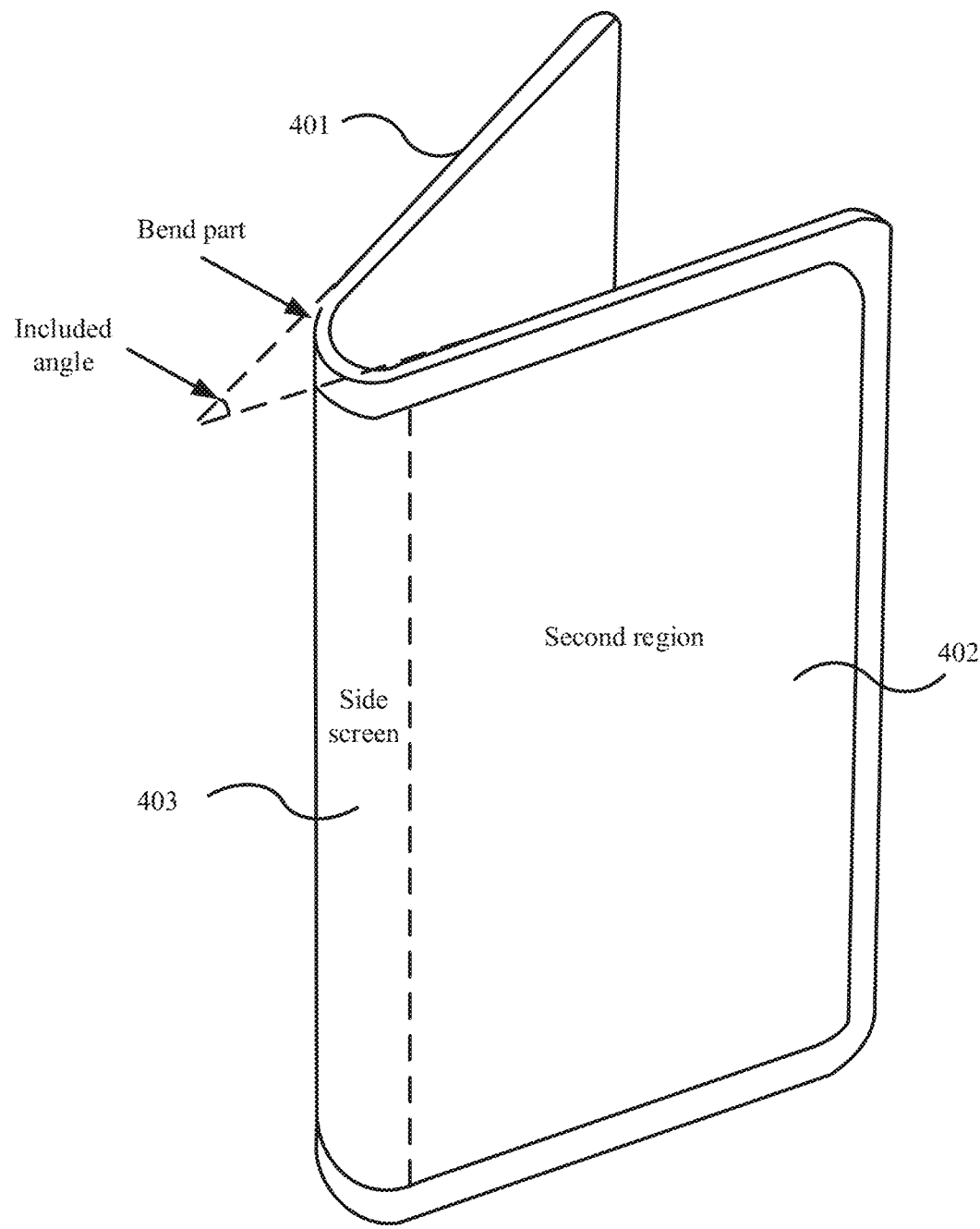

For example, when the foldable electronic device is in a semi-folded form, the foldable electronic device may be shown in FIG. 4(c). Specifically, when the foldable electronic device is in the semi-folded form, an included angle between the first region and the second region is a second angle α. As shown in FIG. 5, a1≤α≤a2, where a1 is greater than 0 degrees and less than or equal to 90 degrees, and a2 is greater than or equal to 90 degrees and less than 180 degrees. For example, a1 may be 90 degrees, and a2 may be 150 degrees.

Figure 4D:
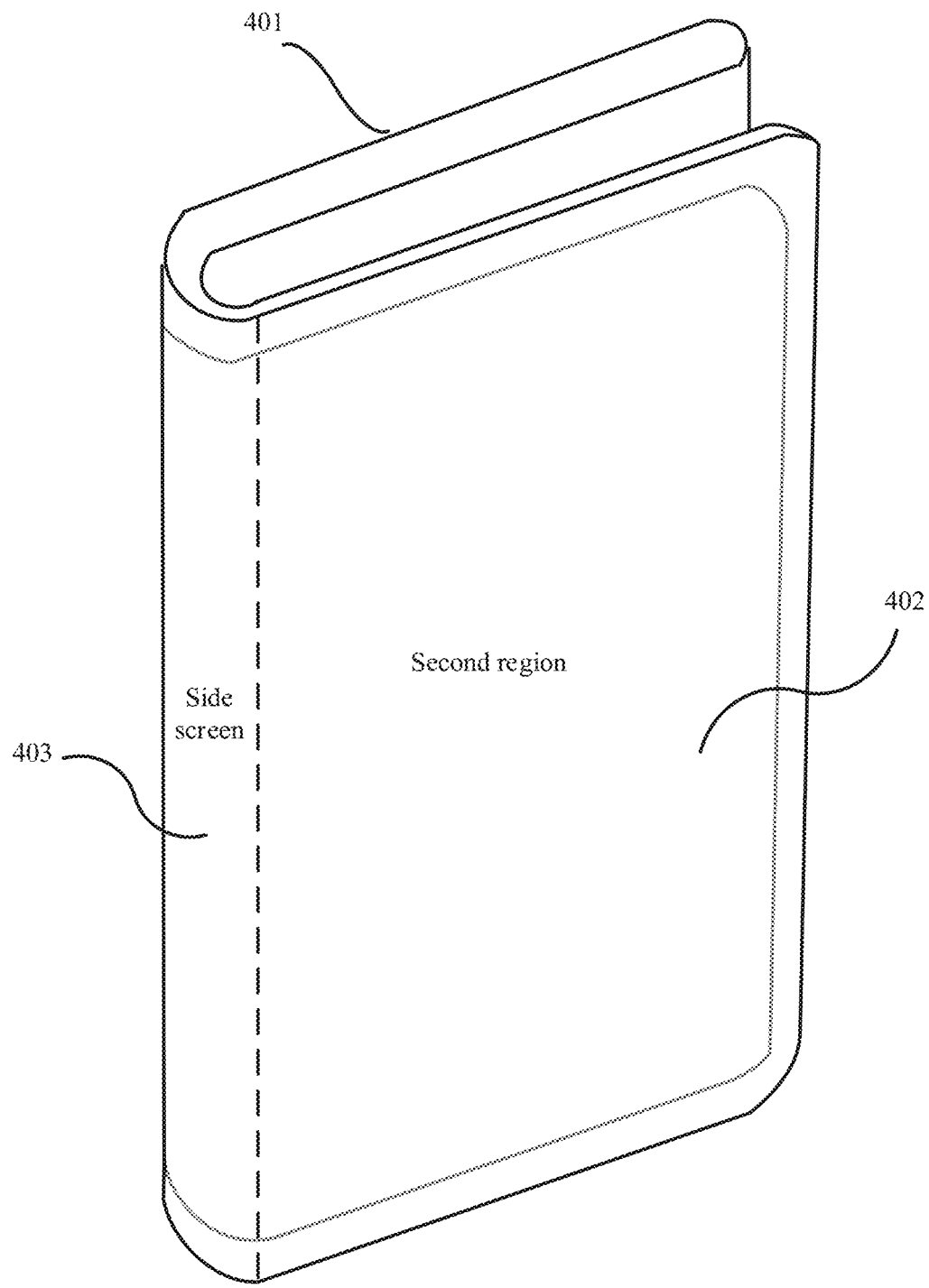

For example, when the foldable electronic device is in a folded form, the foldable electronic device may be shown in FIG. 4(d). Specifically, when the foldable electronic device is in the folded form, the included angle between the first region and the second region is a third included angle β. As shown in FIG. 5, 0≤β≤a1, and a1 is greater than or equal to 0 degrees and less than or equal to 90 degrees. For example, a1 may be 0 degrees, or 5 degrees. It should be noted that a specific value range in this embodiment of this application is merely an example rather than a limitation.

Figure 6A:
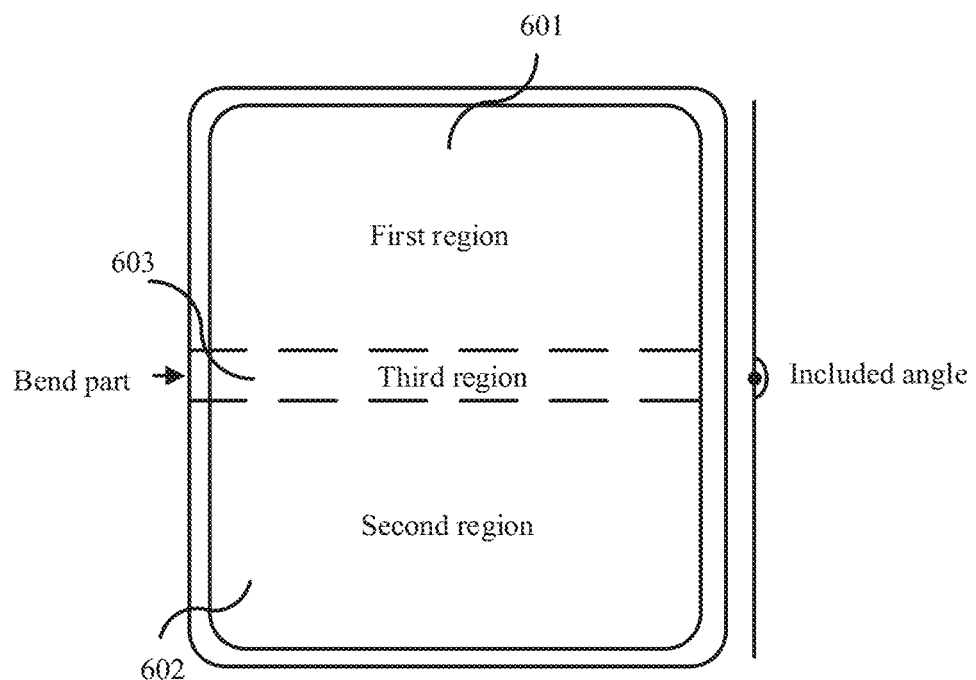
FIG. 6(a), FIG. 6(b), FIG. 6(c), and FIG. 6(d) are schematic diagrams of physical forms of an up-down foldable electronic device according to an embodiment of this application.
Figure 6B:
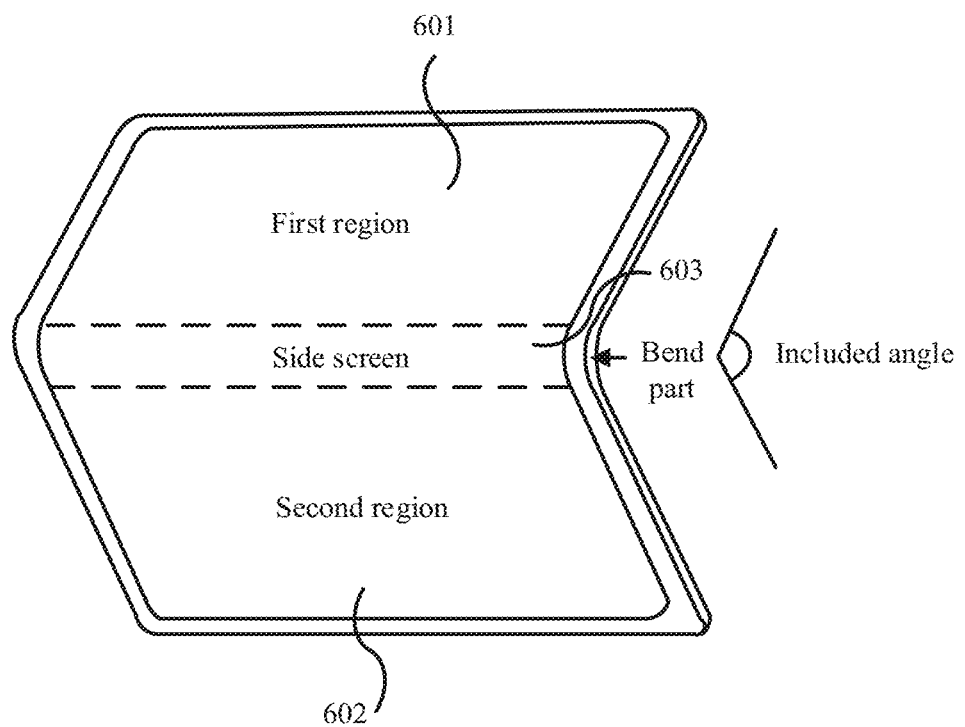

In the foregoing embodiment, the foldable electronic device is folded left and right. In some other embodiments, the foldable electronic device may alternatively be folded up and down. For example, in FIG. 4(a), a bend part may further be horizontally distributed in FIG. 4(a), so that the foldable electronic device may be folded up and down. For example, referring to FIG. 6(a), the foldable electronic device includes a first part 601, a second part 602, and a third part 603. The third part 603 may be a bend part. When the bend part is bent or deformed, an included angle between the first part 601 and the second part 602 is changed. Correspondingly, the up-down foldable electronic device may also include three display regions: a first region, a second region, and a third region. The first region corresponds to the first part 601, the second region corresponds to the second part 602, and the third region corresponds to the third part 603. Therefore, the up-down foldable electronic device may also include three physical forms, for example, a folded form, a semi-folded form, and an unfolded form. The folded form may be a form shown in FIG. 6(d), the semi-folded form may be a form shown in FIG. 6(c), and the unfolded form may be a form shown in FIG. 6(a) or FIG. 6(b).

In some embodiments, the foldable electronic device may be folded left and right or folded up and down. Alternatively, the foldable electronic device may be folded up and down and folded left and right. The new-message display method provided in this application may be applicable to foldable electronic devices foldable in various directions. The following embodiments provides descriptions by using an up-down foldable electronic device as an example, for example, the foldable electronic device shown in FIG. 6(a) to FIG. 6(d). Specifically, for the foldable electronic device shown in FIG. 6(a) to FIG. 6(d), it is assumed that the first region is used as a primary screen, and the second region is used as a secondary screen.

In some embodiments of this application, the third region of the display of the foldable electronic device, for example, the third region of the foldable electronic device shown in FIG. 6(a), FIG. 6(b), FIG. 6(c), and FIG. 6(d), may serve as the side screen. When receiving a new message, the foldable electronic device may display the new message by using the side screen, that is, the user may view or process the new message by using the side screen, without interrupting a display interface on the primary screen or the secondary screen, thereby properly using the display. This is described in detail in the following embodiments.

In some embodiments, a new-message display function of the side screen of the foldable electronic device may be enabled or disabled. The foldable electronic device can display a new message by using the side screen only after enabling the new-message display function. After the foldable electronic device disables the new-message display function of the side screen, the side screen cannot display a new message. For example, when detecting that the foldable electronic device meets a specific condition, the foldable electronic device may enable the new-message display function of the side screen. The following embodiments describe several examples.

Example 1: When detecting a switch from the unfolded form to the folded form, the foldable electronic device automatically enables the new-message display function of the side screen.

Figure 6C:
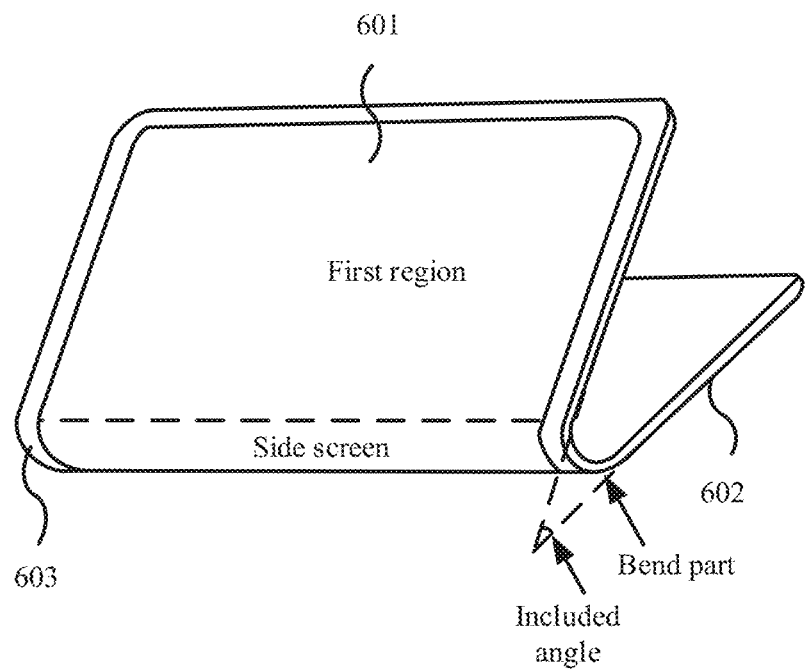
Figure 6D:
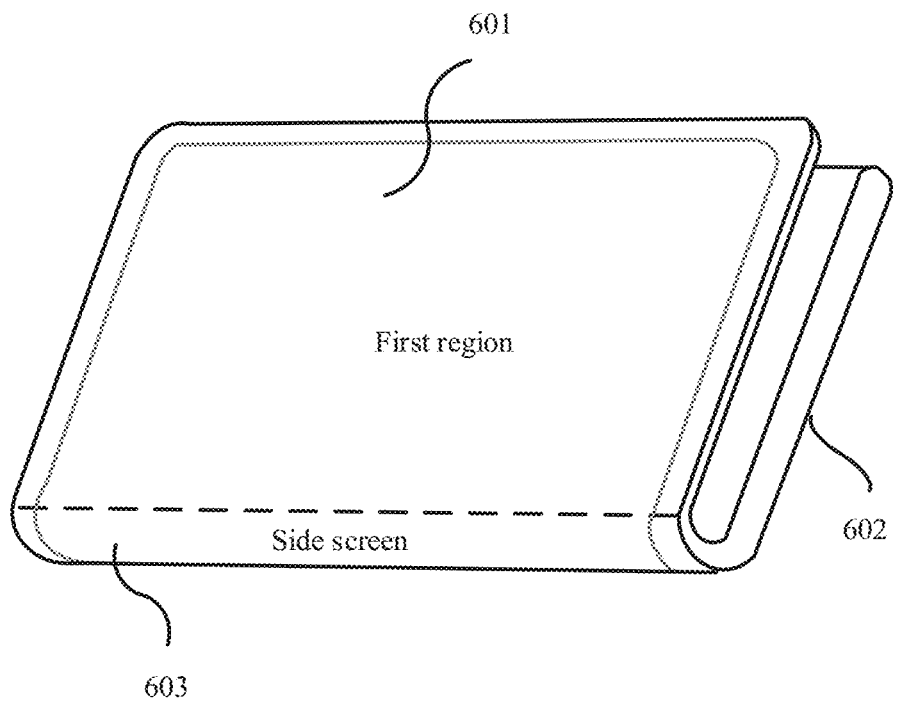

For example, when the unfolding angle of the foldable electronic device changes from 180 degrees to 0 degrees, or when the physical form of the foldable electronic device changes from the semi-folded form shown in FIG. 6(c) to the folded form shown in FIG. 6(d), the foldable electronic device automatically enables the new-message display function of the side screen.

Example 2: When detecting that a first interface of a first application is displayed in full screen on the primary screen or the secondary screen, the foldable electronic device may automatically enable the new-message display function of the side screen. For example, when the foldable electronic device is in the unfolded form, the semi-folded form, or the unfolded form, the first interface of the first application is displayed in full screen on the primary screen, the secondary screen and the side screen are turned off, and the foldable electronic device enables the new-message display function of the side screen.

In some embodiments, the first application may be a preset application, or any one or more applications in all applications on the foldable electronic device. The preset application may be one or more applications specified by the user, may be one or more applications that are set by default after delivery of the electronic device, or may be one or more applications determined by the foldable electronic device according to a use habit of the user. For example, the preset application may be one or more applications determined by the foldable electronic device and frequently used by the user, or may be one or more applications belonging to a specific application type, for example, a game application, a video application, or an audio application. This is not limited in this embodiment of this application. In some other embodiments, the first interface of the first application may alternatively be a home screen (or a home), the leftmost screen, or the like of the foldable electronic device.

In some embodiments, the first interface of the first application displayed in a full screen manner on the primary screen may be the first interface of the first application displayed in an entire region that is on the primary screen and that may be used to display an application interface. For example, there is a status bar and a navigation bar on the primary screen. When the status bar on the primary screen cannot be hidden, but the navigation bar can be hidden, the first interface of the first application displayed in a full screen manner on the primary screen is the first interface of the first application displayed in an entire display region on the primary screen except a region for the status bar. For another example, when neither the status bar nor the navigation bar on the primary screen cannot be hidden, the first interface of the first application displayed in a full screen manner on the primary screen is the first interface of the first application displayed in an entire display region on the primary screen except regions for the status bar and the navigation bar. For another example, when ben both the status bar and the navigation bar on the primary screen can be hidden, the first interface of the first application displayed in a full screen manner on the primary screen is the first interface of the first application displayed in an entire display region (including regions for the status bar and the navigation bar) on the primary screen.

Example 3: When detecting that the foldable electronic device is in a first holding state, the foldable electronic device enables the new-message display function of the side screen. Alternatively, after detecting that the foldable electronic device is in the first holding state and maintains the first holding state for preset duration, the foldable electronic device enables the new-message display function of the side screen.

Figure 7A:
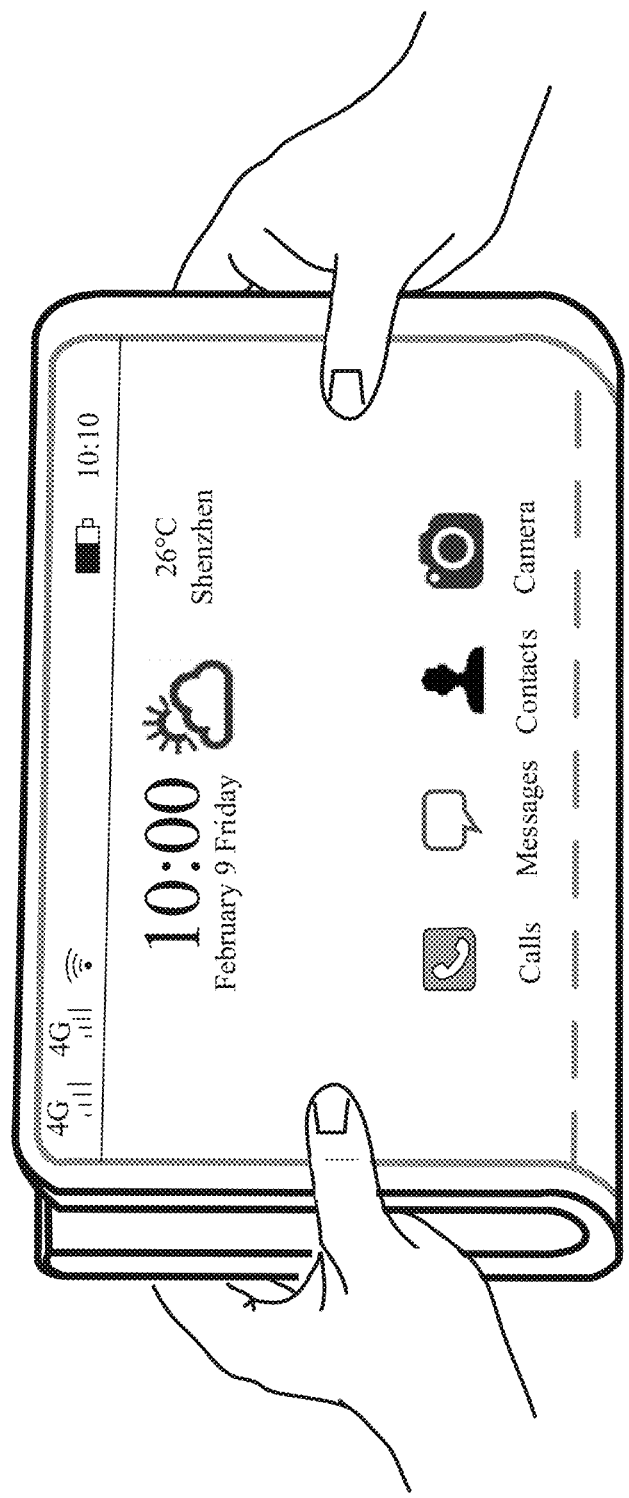
FIG. 7(a) and FIG. 7(b) are schematic diagrams of a holding state of a foldable electronic device according to an embodiment of this application.
Figure 7B:
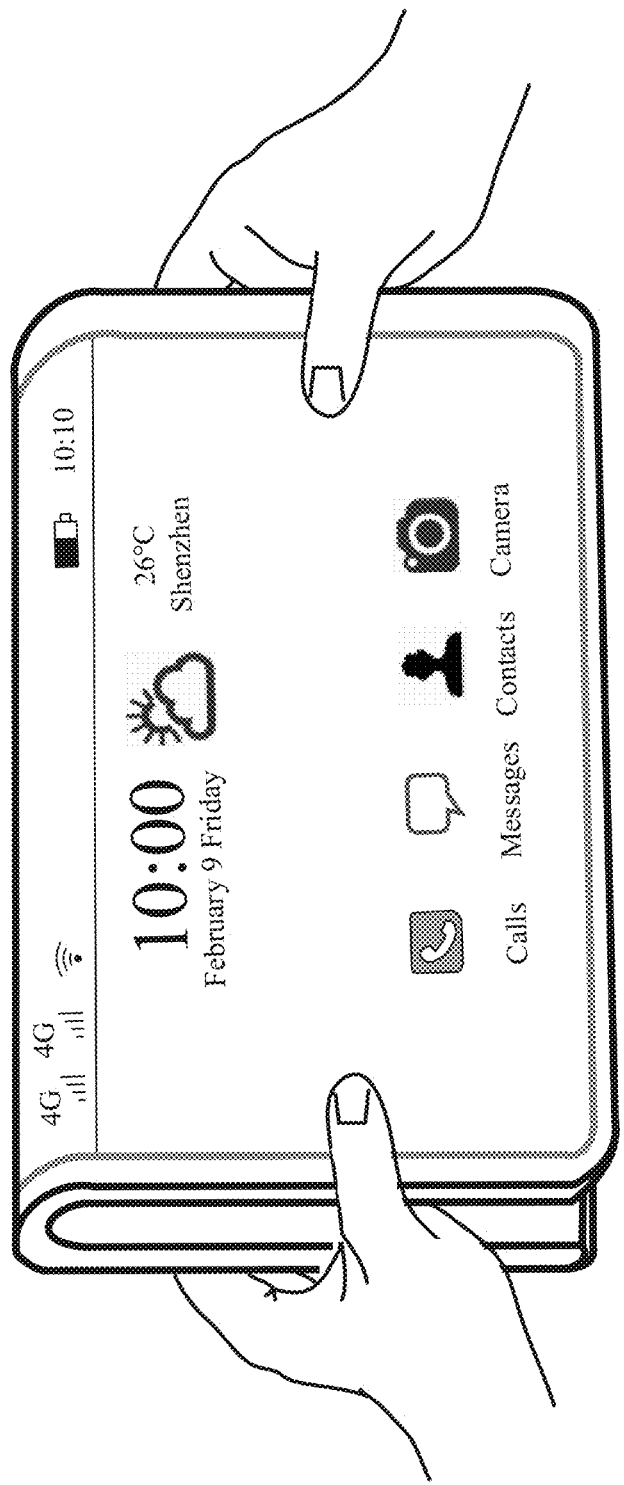
Figure 8:
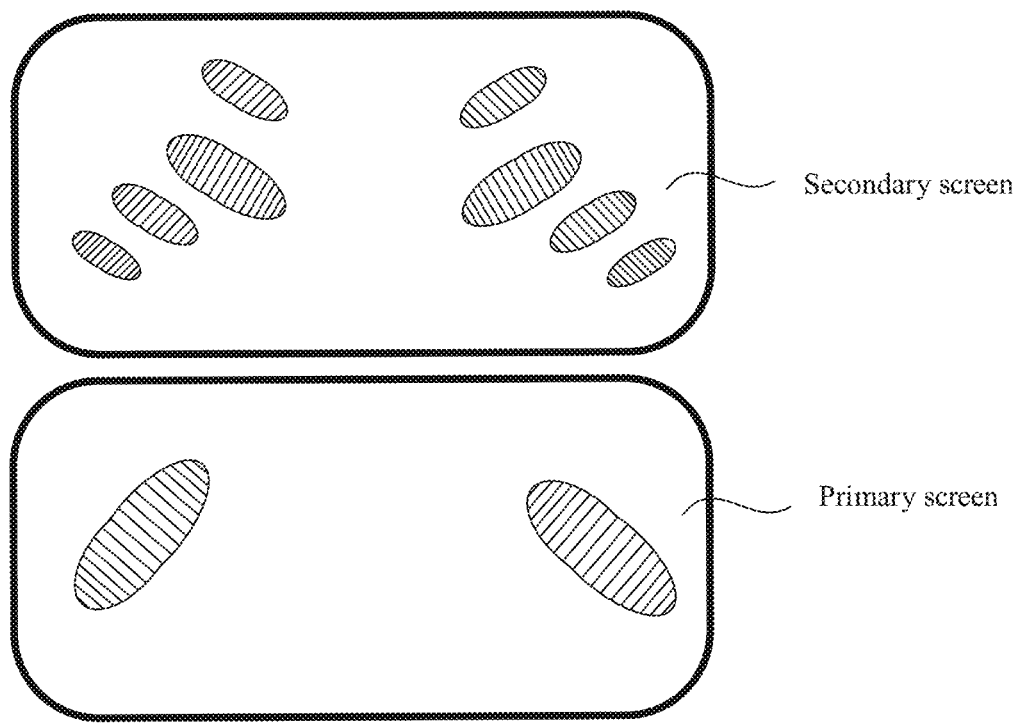
FIG. 8 is a schematic diagram of user fingerprints on a foldable electronic device according to an embodiment of this application.

For example, the first holding state may be the holding state shown in FIG. 7(a) or in FIG. 7(b). In some embodiments, the foldable electronic device may determine the holding state based on fingerprints detected on the primary screen and the secondary screen. For example, as shown in FIG. 8, if a foldable electronic device detects two fingerprints on a primary screen, and detects eight fingerprints on a secondary screen, it is determined that the foldable electronic device is in the first holding state.

Example 4: When the foldable electronic device does not enable the new-message display function of the side screen, if receiving a new message, the foldable electronic device may output prompt information, so as to prompt the user to enable the new-message display function of the side screen. For example, the first interface of the first application is displayed in full screen on the primary screen of the foldable electronic device. When receiving a new message, the foldable electronic device may output prompt information. The prompt information is used to prompt the user to set the new-message display function of the side screen. Alternatively, when receiving a new message, the foldable electronic device displays the new message in the status bar, and after detecting an operation targeted for the new message, may output prompt information, so as to prompt the user to enable the new-message display function of the side screen.

Example 5: The new-message display function of the side screen may be provided and enabled before the foldable electronic device is delivered from a factory, or may be set and enabled by the user. For example, the user may enable the new-message display function of the side screen by using a setting application in the electronic device.

It should be noted that the foregoing embodiments are merely examples of trigger conditions for the foldable electronic device to enable the new-message display function for the side screen. In actual application, the foregoing different examples may be used in combination. This is not limited in this embodiment of this application. After enabling the new-message display function of the side screen, the foldable electronic device may display a new message by using the side screen. The following embodiments use the holding state shown in FIG. 7(a) as an example to describe a possible process in which the foldable electronic device displays a new message by using the side screen.

Figure 9A:
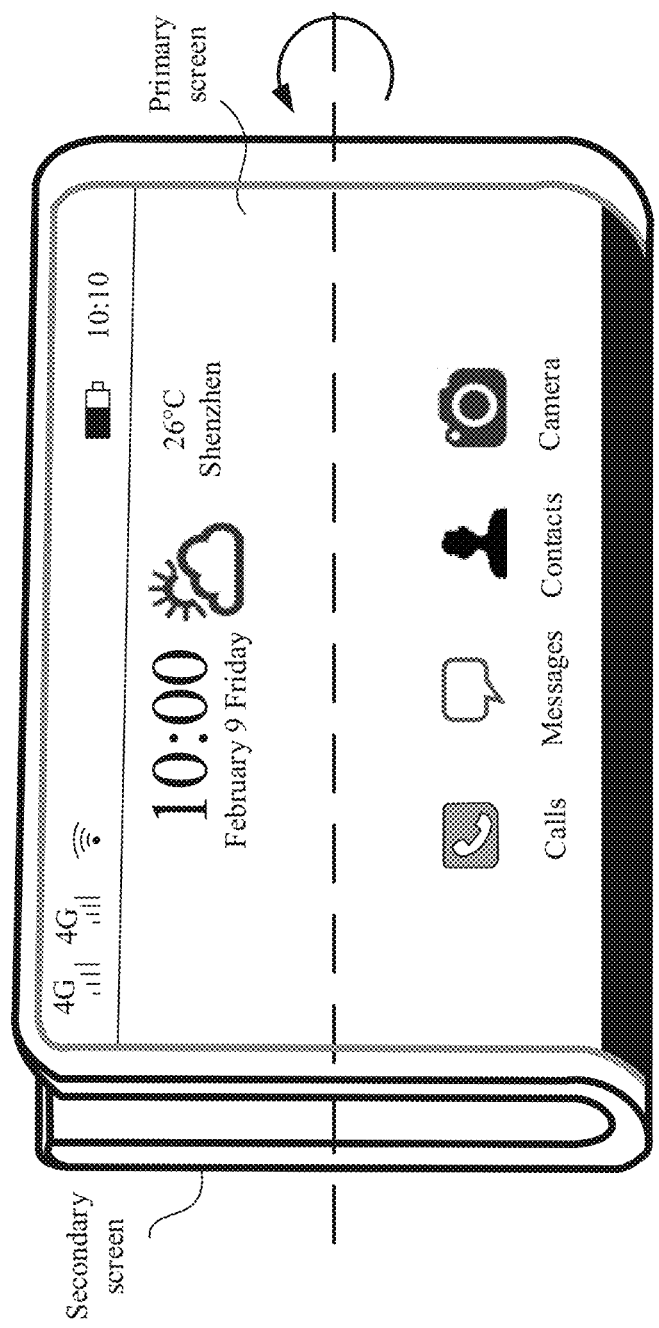
FIG. 9A(a) and FIG. 9A(b) are schematic diagrams of graphical user interfaces of a foldable electronic device according to an embodiment of this application.
Figure 9A:
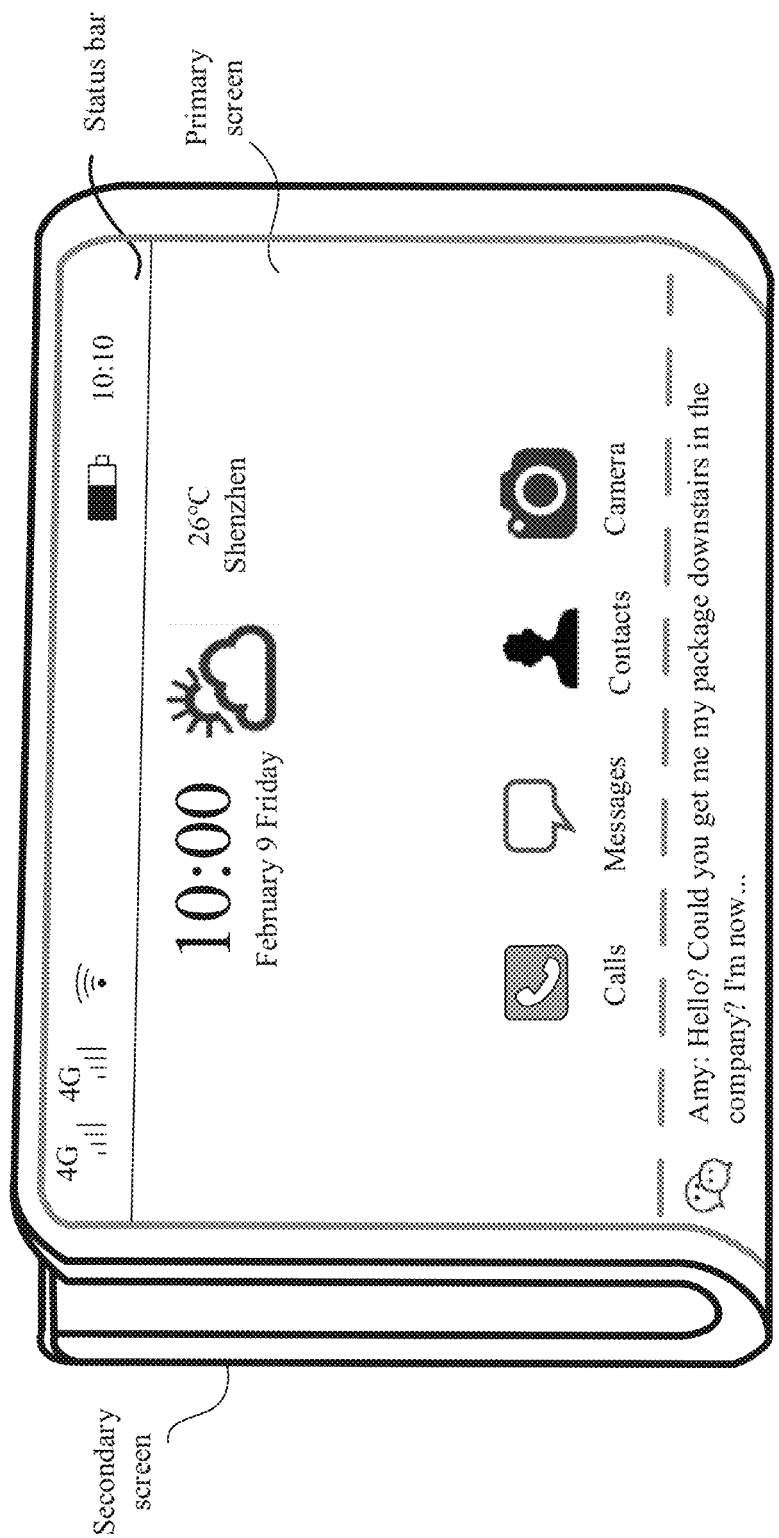

In some embodiments, the foldable electronic device is in the folded form, the primary screen is turned on and displays the first interface of the first application, and the side screen is in an off state. In a possible case, after receiving a new message, the foldable electronic device may directly turn on the side screen, and display the new message on the side screen, without displaying the new message on the primary screen. For example, referring to FIG. 9A(a), the primary screen of the foldable electronic device displays the home screen, and the side screen is turned off. As shown in FIG. 9A(b), when receiving a new message, the foldable electronic device may turn on the side screen, and display the new message on the side screen.

In another possible case, after receiving a new message, the foldable electronic device may first display the new message on the primary screen (for example, display the new message in the status bar). After detecting a flipping operation for flipping the side screen upward, the foldable electronic device turns on the side screen, and displays the new message on the side screen.

In some embodiments, a new message on the primary screen may be always displayed, and the display on the primary screen may be canceled after the foldable electronic device determines that the new message has been displayed on the side screen.

In some other embodiments, a new message on the primary screen is automatically hidden after being displayed for a period of time. After the new message on the primary screen is hidden, if the foldable electronic device detects, within preset duration, that the side screen is flipped upward, the foldable electronic device then turns on the side screen, and displays the new message on the side screen. The preset duration may be preset duration starting from a first time point. The first time point may be a time point at which the new message on the primary screen is hidden. The preset duration may be set by the user, or may be a default system setting of the foldable electronic device. This is not limited in the embodiments of this application.

In still some embodiments, during a period in which a new message is displayed on the primary screen, if detecting that the side screen is flipped upward, the foldable electronic device turns on the side screen and displays the new message on the side screen. The side screen may not be turned on if the foldable electronic device does not display the new message by using the side screen within this period but automatically hides the new message on the primary screen after the new message is displayed for a period of time, and if the foldable electronic device detects, after the hiding, that the side screen is flipped upward. In the embodiments, the new message is displayed by using the side screen only when it is detected, during the display of the new message on the primary screen, that the side screen is flipped upward. When the primary screen does not display the new message, the new messages is not displayed by using the side screen even if it is detected that the side screen is flipped upward.

Figure 9B:
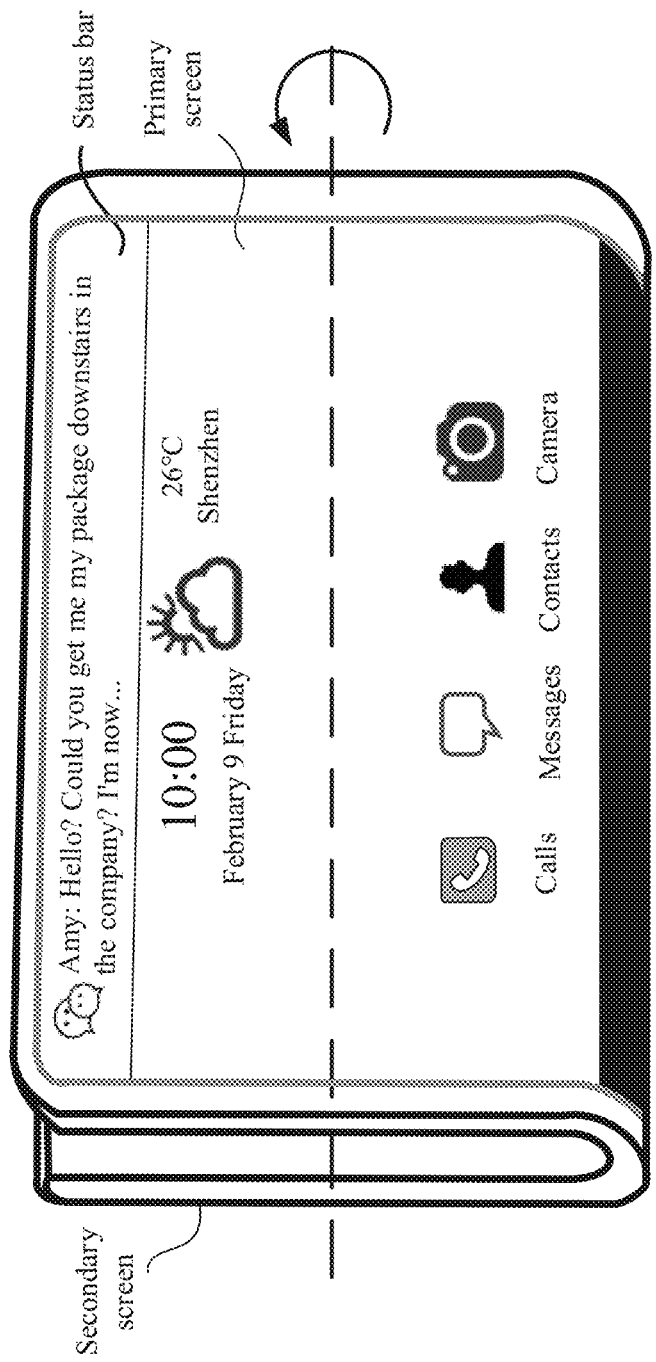
FIG. 9B(a) and FIG. 9B(b) are schematic diagrams of graphical user interfaces of a foldable electronic device according to an embodiment of this application.
Figure 9B:
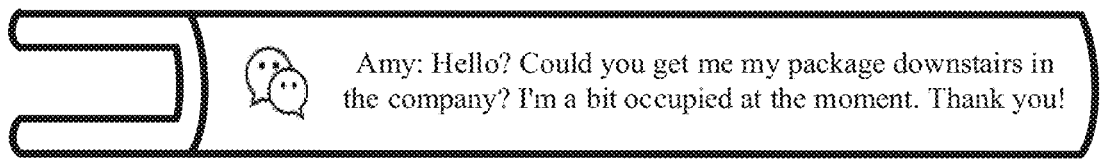

For example, referring to FIG. 9B(a), the foldable electronic device is in the folded form. The primary screen displays the home screen (home screen), and both the secondary screen and the side screen are in the off state. When the foldable electronic device receives a new message, the status bar on the primary screen displays the new message. When detecting a flipping operation shown by an arrow in the figure, the foldable electronic device turns on the side screen, and displays the new message on the side screen, as shown in FIG. 9B(b). In some embodiments, when detecting the flipping operation, the foldable electronic device may disable a touch function of the primary screen. When detecting that the primary screen is flipped upward, the foldable electronic device enables the touch function of the primary screen again.

In some other embodiments, after receiving a new message, the foldable electronic device may not display the new message in the status bar of the primary screen, but prompt the user m another manner that a new message has been received. When detecting a flipping operation for flipping the side screen upward, the foldable electronic device then displays the new message on the side screen. The another prompt manner may be displaying a new-message identifier (for example, an icon or a text) on the home screen. The identifier may be different from the new message displayed in the status bar in FIG. 9B(a). For example, the new-message identifier may be an individual icon. If the icon appears on the primary screen, it indicates that the foldable electronic device receives a new message; or if the icon does not appear on the primary screen, it indicates that the foldable electronic device does not receive a new message. Alternatively, the new-message identifier may be an application icon of an application that receives a new message, or the like. This is not limited in the embodiments of this application. The new-message identifier may be displayed in the status bar or displayed at any location on the primary screen in a floating manner. In the embodiments, a new message may occupy a display area as small as possible on the primary screen, to avoid blocking the display interface on the primary screen.

Figure 10A:
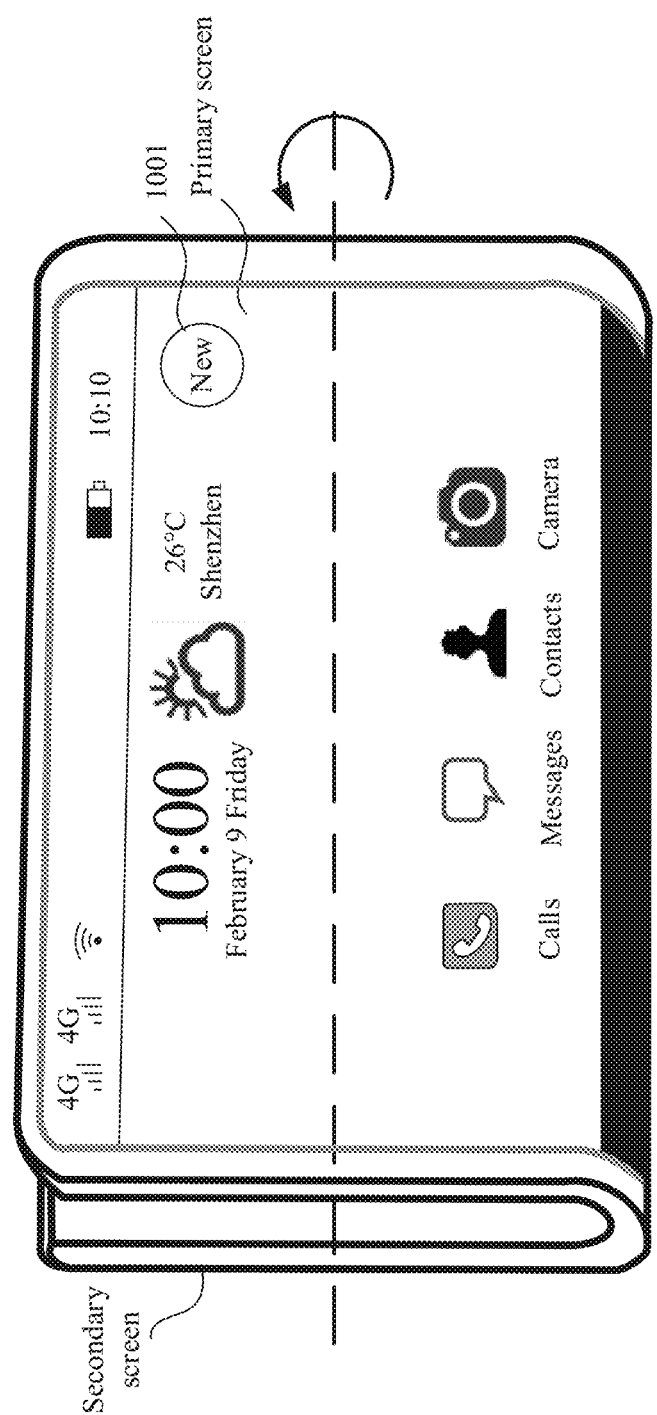
FIG. 10(a), FIG. 10(b), and FIG. 10(c) are schematic diagrams of graphical user interfaces of a foldable electronic device according to an embodiment of this application.
Figure 10B:
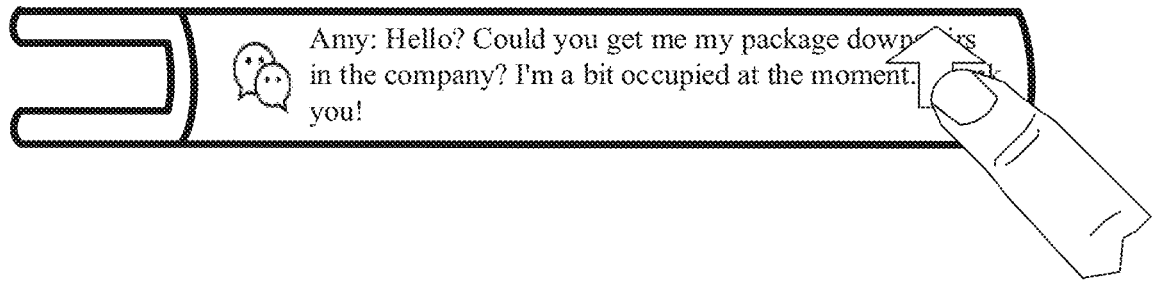
Figure 10C:
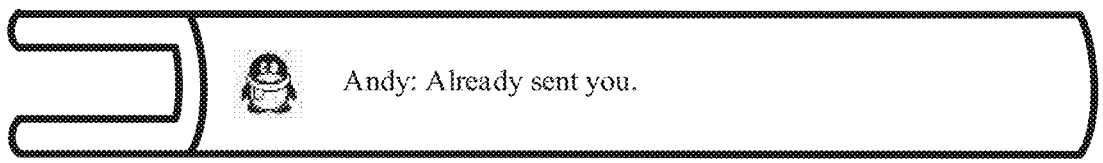

For example, as shown in FIG. 10(a), the foldable electronic device is in the folded form. The primary screen displays the home screen, and the side screen is in the off state. When the foldable electronic device receives one or more new messages, the primary screen displays an identifier 1001. In this example, the icon 1001 does not mark which application receives the new message or how many new messages are received. After detecting a flipping operation for flipping the side screen upward, the foldable electronic device turns on the side screen, and displays the new message on the side screen, as shown in FIG. 10(b). When the foldable electronic device receives a plurality of new messages, after detecting that the side screen is flipped upward, the foldable electronic device may display a most recently received new message on the side screen. In some embodiments, when detecting a swiping operation on the side screen, for example, an operation of swiping upward, the foldable electronic device may display a new message received earlier. For example, referring to FIG. 10(b), after detecting that the user performs an operation of swiping upward on the side screen, the foldable electronic device displays another new message, as shown in FIG. 10(c).

In some embodiments, the mark 1001 may be automatically hidden after being displayed on the primary screen for a period of time. Alternatively, the mark 1001 may be always displayed on the primary screen, and the icon 1001 is hidden after the new message has been displayed on the side screen. If the foldable electronic device receives a plurality of new messages, the mark 1001 may be always displayed on the primary screen, and the mark 1001 is hidden after all the received new messages have been displayed on the side screen.

In the foregoing embodiments, the foldable electronic device is in the folded form, the primary screen is turned on and displays the first interface of the first application, and the side screen is in the off state. In some other embodiments, the foldable electronic device is in the folded form, and the primary screen and the side screen serve as a whole screen to display the first interface of the first application, that is, the side screen is not in the off state. In a possible case, after receiving a new message, the foldable electronic device may directly display the new message on the side screen, and zoom out and display the first interface on the primary screen, so that the new message does not block the first interface. Alternatively, after receiving a new message, the foldable electronic device may display the new message on the side screen, without zooming out the first interface, that is, the new message blocks a region in the first interface that is located on the side screen. In another possible case, after receiving a new message, the foldable electronic device may first display the new message on the primary screen. When detecting that the side screen is flipped upward, the foldable electronic device may display the new message on the side screen. For example, after detecting that the side screen is flipped upward, the foldable electronic device may zoom out and display the first interface of the first application on the primary screen, and display the new message on the side screen, so that the new message does not block the first interface. Alternatively, after detecting that the side screen is flipped upward, the foldable electronic device may display the new message in a region of the first interface that is located on the side screen, without zooming out the first interface.

In some embodiments, when displaying a new message, the side screen may display an application icon of an application corresponding to the new message and content of the new message, such as text content. In some other embodiments, the side screen may display all or some of content of a new message. For example, in FIG. 9B(a), the status bar on the primary screen of the foldable electronic device displays some text in the new message. In FIG. 9B(b), the side screen of the foldable electronic device displays all text of the new message. In another embodiment, the electronic device may detect an operation performed by the user on the side screen, and perform deletion, reply, closing, and other processing on the new message on the side screen based on the operation.

In some embodiments, the foldable electronic device is in the folded form, the primary screen displays the first interface of the first application, and the side screen is in the off state. After the foldable electronic device receives a new message, if detecting that the side screen is flipped upward, the foldable electronic device may turn on the side screen and display the new message on the side screen. When detecting that the primary screen is flipped upward, the foldable electronic device may close the new message and turn off the side screen. In some other embodiments, when detecting that the primary screen is flipped upward, the foldable electronic device may not turn off the side screen temporarily, but turn off the side screen after a period of time.

Figure 11A:
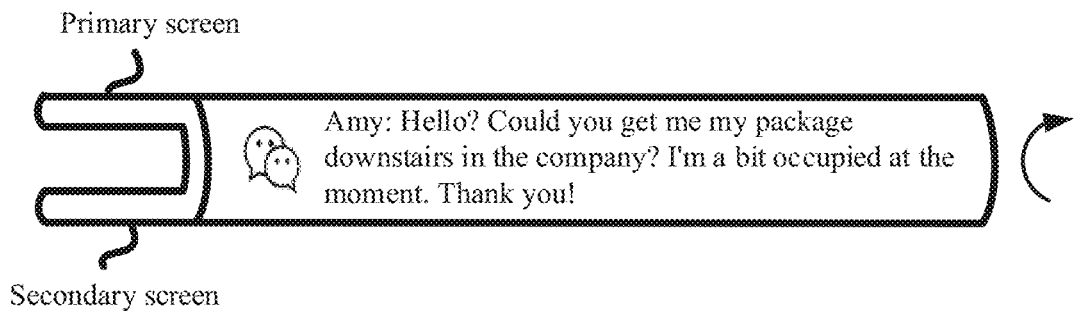
FIG. 11(a) and FIG. 11(b) are schematic diagrams of graphical user interfaces of a foldable electronic device according to an embodiment of this application.
Figure 11B:
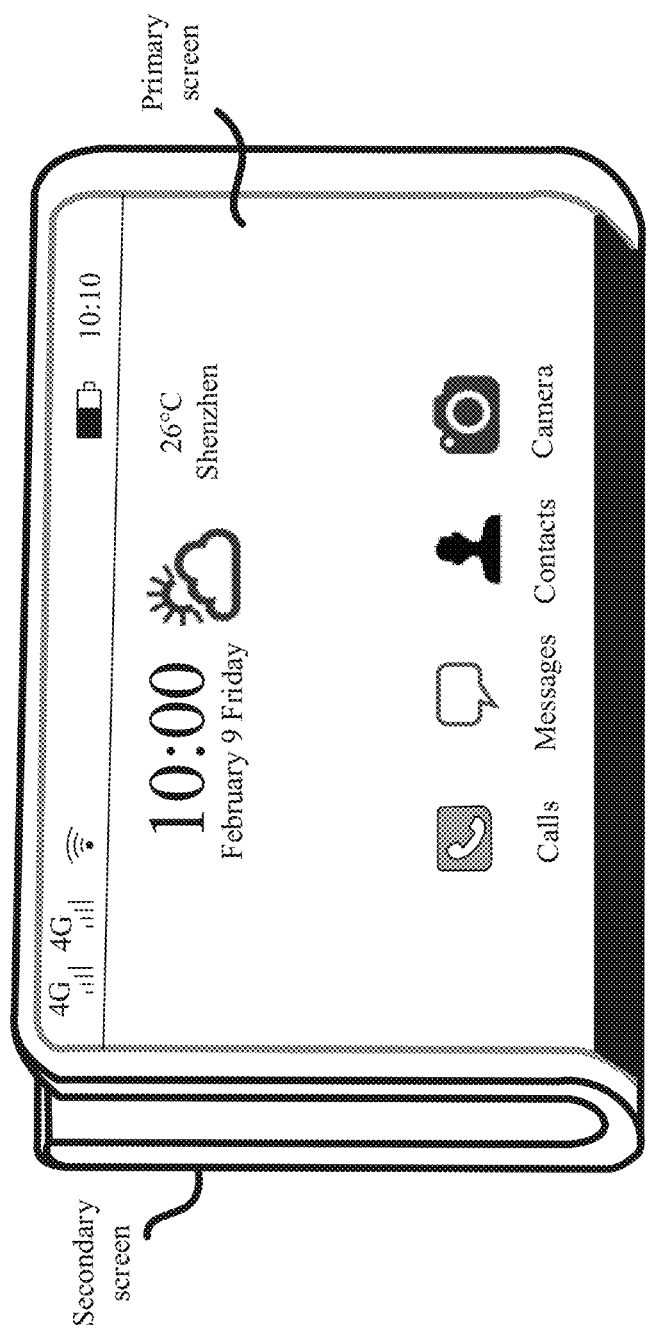

For example, referring to FIG. 11(a), the side screen of the foldable electronic device is flipped upward and displays a new message, the primary screen displays the first interface of the first application, and the secondary screen is turned off. When detecting a flipping operation shown by an arrow in FIG. 11(a), the foldable electronic device may automatically close the new message on the side screen and turn off the side screen, and still display the first interface of the first application on the primary screen, as shown in FIG. 11(b). In some embodiments, the foldable electronic device in FIG. 11(a) may disable the touch function of the primary screen.

In some other embodiments, the foldable electronic device is in the folded form, the primary screen displays the first interface of the first application, and the side screen is in the off state. After the foldable electronic device receives a new message, if detecting that the side screen is flipped upward, the foldable electronic device may turn on the side screen and display the new message on the side screen. When detecting that the secondary screen is flipped upward, the foldable electronic device may turn on the secondary screen and display a display interface of a second application corresponding to the new message on the secondary screen.

Figure 12A:
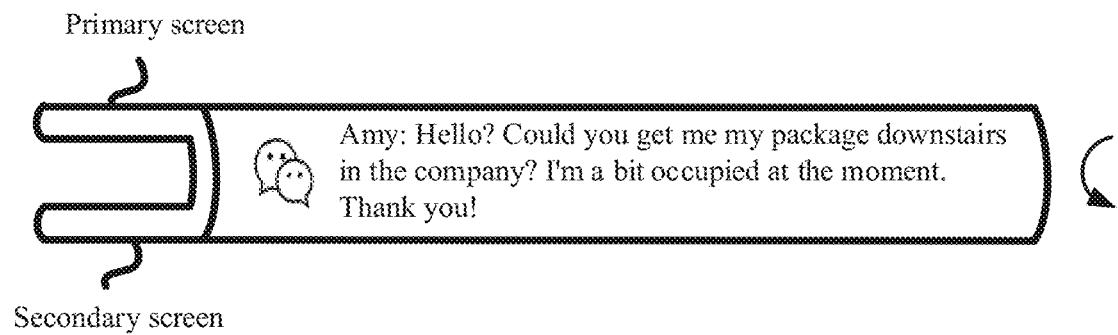
FIG. 12(a) and FIG. 12(b) are schematic diagrams of graphical user interfaces of a foldable electronic device according to an embodiment of this application.
Figure 12B:
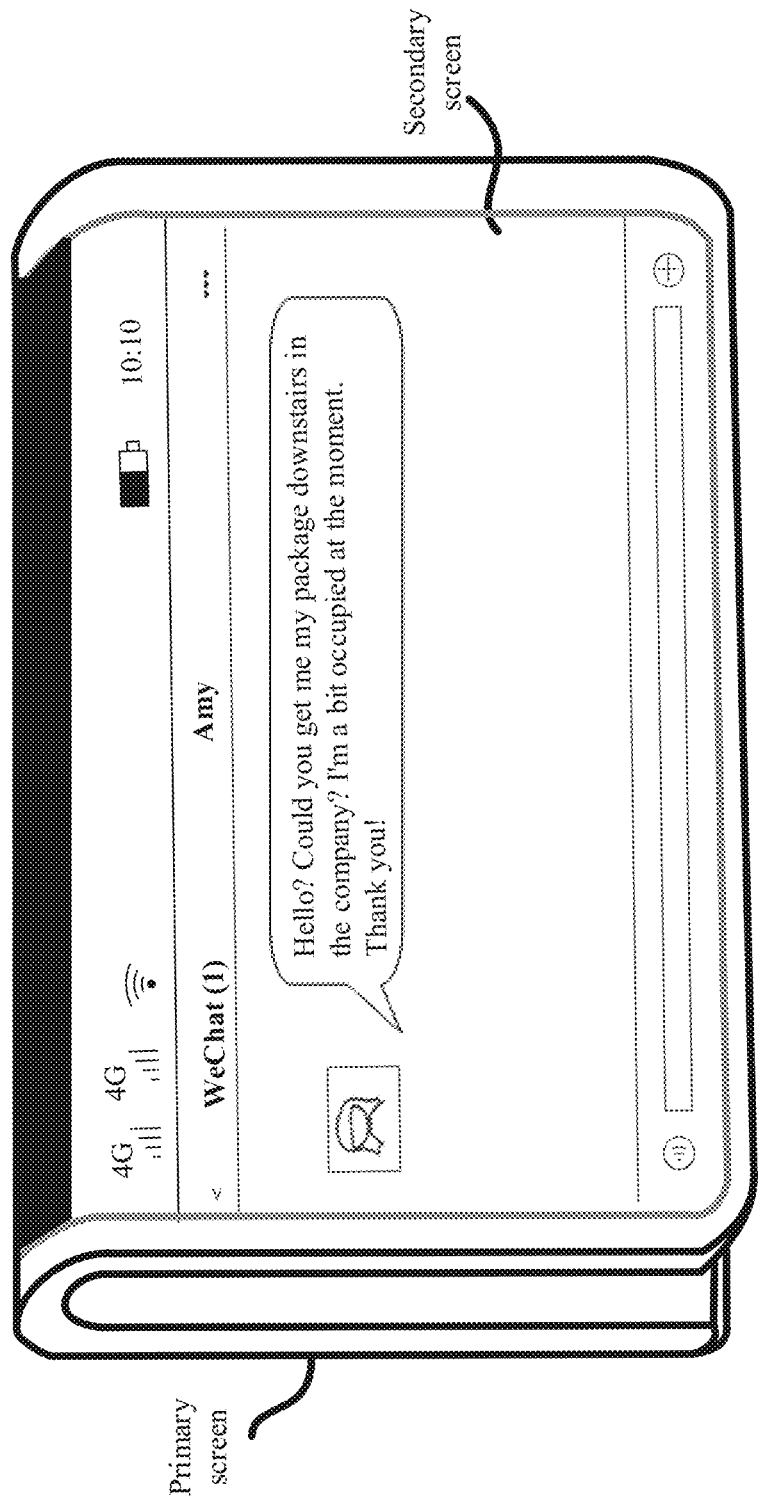

For example, referring to FIG. 12(a), the side screen of the foldable electronic device is flipped upward, and the side screen displays a new message. The primary screen displays the first interface of the first application, and the secondary screen is turned off. After detecting a flipping operation shown by an arrow in FIG. 12(a), the foldable electronic device may turn on the secondary screen, and display a display interface of a WeChat application on the secondary screen, as shown in FIG. 12(b). After detecting an operation for flipping the secondary screen upward, the foldable electronic device may turn off the side screen.

In some embodiments, to prevent the user from accidentally touching the primary screen, the foldable electronic device may disable the touch function of the primary screen when determining that the primary screen does not face upward. In a possible case, in an example of FIG. 9B(a) and FIG. 9B(b), when detecting that the side screen is flipped upward, the foldable electronic device may disable the touch function of the primary screen, and may enable the touch function of the primary screen until the foldable electronic device detects that the primary screen faces upward. In another possible case, with reference to an example of FIG. 9B(a), FIG. 9B(b), FIG. 12(a), and FIG. 12(b), the foldable electronic device in FIG. 9B(a) and FIG. 9B(b) may temporarily not disable the touch function of the primary screen in a process of detecting that the side screen is flipped upward. In FIG. 12(a) and FIG. 12(b), when detecting that the secondary screen is flipped upward, the foldable electronic device disables the touch function of the primary screen.

Figure 13:
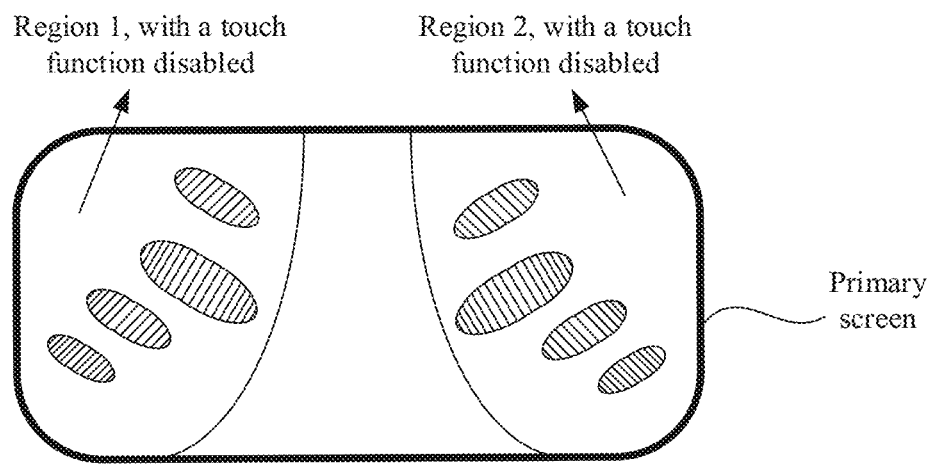
FIG. 13 is a schematic diagram of user fingerprints on a foldable electronic device according to an embodiment of this application.

In some embodiments, the foldable electronic device may disable touch functions of all or some regions on the primary screen. For example, referring to FIG. 13, the foldable electronic device may disable touch functions of only region 1 and region 2 on the primary screen. Area ranges of region 1 and region 2 may be preset, or may be determined based on detected user fingerprints. This is not limited in the embodiments of this application. For example, after detecting fingerprints of the user on the primary screen, the foldable electronic device may determine region 1 and region 2 based on the detected fingerprints. For example, still using FIG. 13 as an example, the foldable electronic device detects four fingerprints in a left region of the primary screen, and may determine region 1 based on the four fingerprints. For example, an area of region 1 is greater than or equal to an area of the four fingerprints. Still using FIG. 13 as an example, the foldable electronic device detects four fingerprints in a right region of the primary screen, and may determine region 2 based on the four fingerprints. For example, an area of region 2 is greater than or equal to an area of the four fingerprints.

Figure 14:
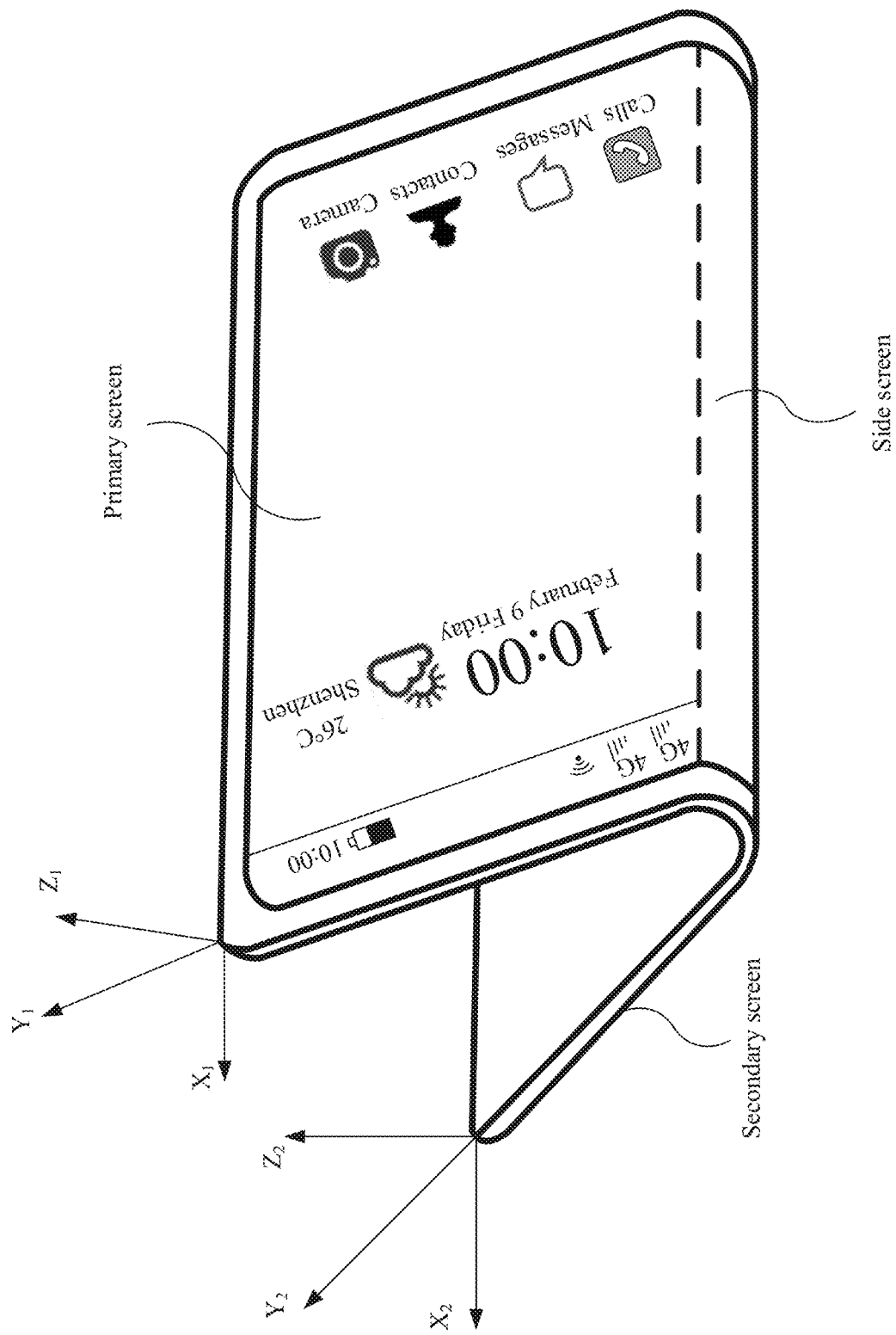
FIG. 14 is a schematic diagram of establishing coordinate systems on a foldable electronic device according to an embodiment of this application.

The following embodiments describe a flipping process of the foldable electronic device with reference to FIG. 9B(a), FIG. 9B(b), FIG. 11(a), and FIG. 11(b). As shown in FIG. 14, the electronic device in the semi-folded form is used as an example to establish coordinate systems shown in FIG. 14. Coordinate systems X1-Y1-Z1 and X2-Y2-Z2 are established on the primary screen and the secondary screen, respectively. The coordinate system X1-Y1-Z1 may be denoted as B1 (body frame 1). B1 is a coordinate system that uses a long side of the primary screen as an X axis, a short side of the primary screen as a Y axis, and a straight line perpendicular to the primary screen as a Z axis. The coordinate system X2-Y2-Z2 may be denoted as B2 (body frame 2). B2 is a coordinate system that uses a long side of the secondary screen as an X axis, a short side of the secondary screen as a Y axis, and a straight line perpendicular to the secondary screen as a Z axis.

Figure 15A:
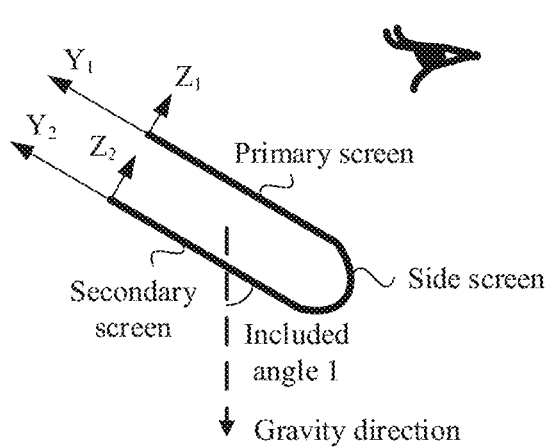
FIG. 15A(a) and FIG. 15A(b) are a schematic diagram of a flipping process of a foldable electronic device according to an embodiment of this application.
Figure 15A:
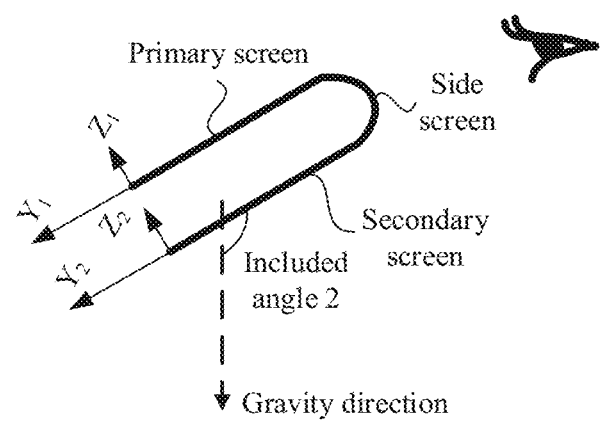

In some embodiments, as shown in FIG. 15A(a) and FIG. 15A(b), the foldable electronic device is in the folded form. When detecting that included angle 1 between an X1-Y1 plane or an X2-Y2 plane and a gravity direction falls within a first angle range, the foldable electronic device determines that the primary screen is flipped upward. The first angle range may be any angle values in [0 degrees, 90 degrees]. When the primary screen of the foldable electronic device faces upwards, the side screen and the secondary screen may be turned off. When detecting a flipping operation and detecting that included angle 2 between the X1-Y1 plane or the X2-Y2 plane and the gravity direction is greater than included angle 1 by a specific angle after flipping, the foldable electronic device determines that the side screen is flipped upward, and may turn on the side screen and display a new message on the side screen. Specifically, an angle value by which included angle 2 is greater than included angle 1 may be 5 degrees, 10 degrees, 15 degrees, 30 degrees, 60 degrees, 90 degrees, or the like. This is not limited in the embodiments of this application.

Correspondingly, when detecting that included angle 2 between the X1-Y1 plane or the X2-Y2 plane and the gravity direction is less than included angle 1 by a specific angle, the foldable electronic device may determine that the primary screen is flipped upward. After detecting that the primary screen faces upward, the foldable electronic device may close the new message on the side screen and turn off the side screen. Specifically, an angle value by which included angle 2 is less than included angle 1 may be 5 degrees, 10 degrees, 15 degrees, 30 degrees, 60 degrees, 90 degrees, or the like. This is not limited in the embodiments of this application.

For example, FIG. 15B(a) to FIG. 15B(d) show four scenarios in which the user holds the foldable electronic device when lying down. Using FIG. 15B(a) as an example, the primary screen of the foldable electronic device displays the first interface of the first application, and the secondary screen and the side screen may be turned off. When receiving a new message, the electronic device may display it by using the side screen. For example, referring to FIG. 15B(b), after detecting a first flipping operation, the electronic device turns on the side screen and displays the new message on the side screen. The first flipping operation is used to flip the electronic device along an x-axis (for example, the x-axis shown in FIG. 14). In addition, a flipping direction is a rotation direction (for example, an arrow direction shown in FIG. 15B(a)) in which a second normal direction of the side screen is rotated towards a first normal direction of the primary screen. For another example, as shown in FIG. 15B(c), the primary screen of the foldable electronic device displays the first interface of the first application, and the secondary screen and the side screen may be turned off. When receiving a new message, the electronic device may display it by using the side screen. For example, referring to FIG. 15B(d), after detecting a second flipping operation, the electronic device turns on the side screen and displays the new message on the side screen. The second flipping operation is used to flip the electronic device along an x-axis (for example, the x-axis shown in FIG. 14). In addition, a flipping direction is a rotation direction (for example, an arrow direction shown in FIG. 15B(a)) in which a second normal direction of the side screen is rotated towards a first normal direction of the primary screen. It should be noted that, an example in which the user holds the foldable electronic device when lying down is used in FIG. 15B(a) to FIG. 15B(d). In actual application, the user may view the new message by using the side screen in a similar manner when standing, sitting, or being in another posture.

In some other embodiments, the foldable electronic device is in the folded form, the primary screen displays the first interface of the first application, and the side screen is turned off. In a possible case, after receiving a new message, the foldable electronic device may first display the new message by using the status bar on the primary screen. When detecting an unfolding operation, the foldable electronic device may turn on the side screen and display the new message on the side screen, and/or may turn on the secondary screen and display the new message or a second interface of a second application corresponding to the new message on the secondary screen. The unfolding operation may be unfolding the foldable electronic device to any non-zero angle of, for example, 5 degrees, 10 degrees, or the like.

Figure 16A:
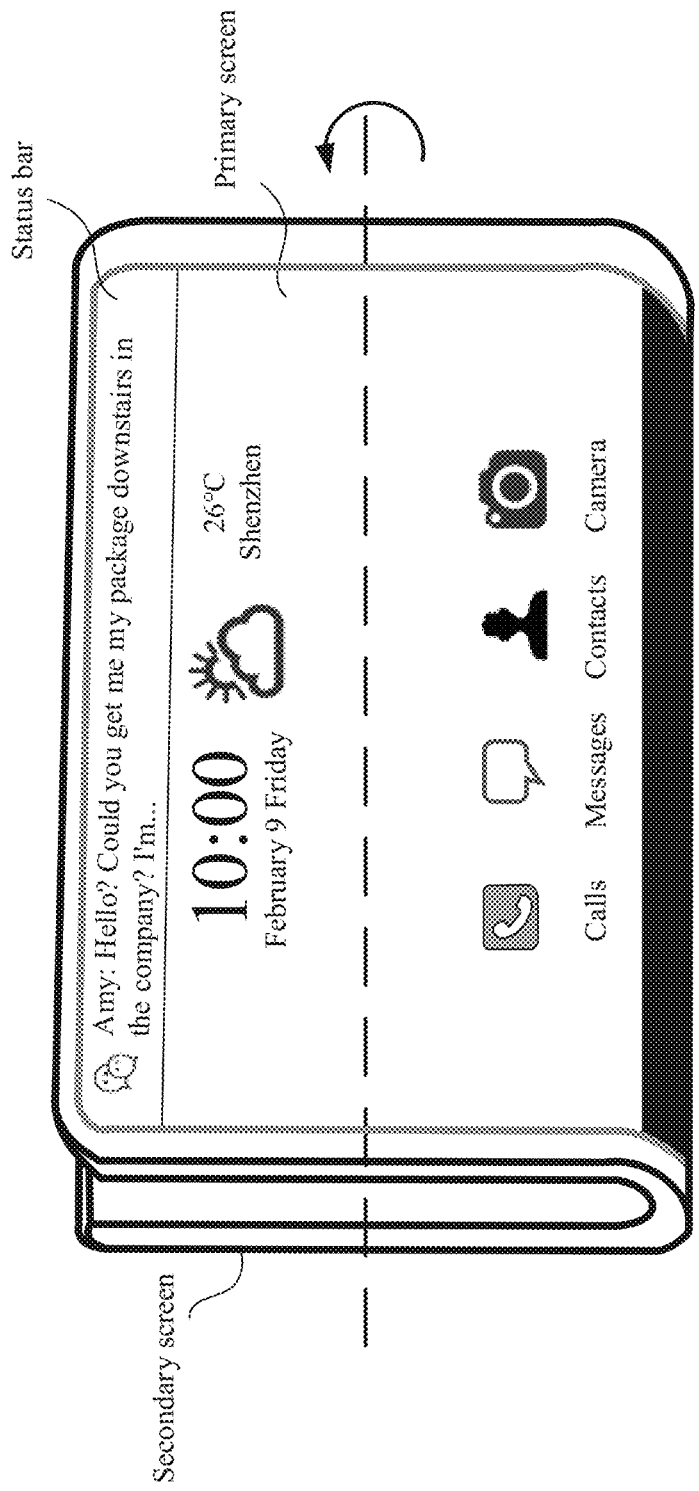
FIG. 16(a) to FIG. 19(d) are schematic diagrams of a foldable electronic device from a folded form to an unfolded form according to an embodiment of this application.

For example, referring to FIG. 16(a), the primary screen of the foldable electronic device displays the home screen, and the side screen and the secondary screen are turned off. When the foldable electronic device receives a new message, the status bar on the primary screen displays the new message. After detecting an unfolding operation, the foldable electronic device may turn on the side screen, and display the new message on the side screen, as shown in FIG. 16(b).

Figure 16B:
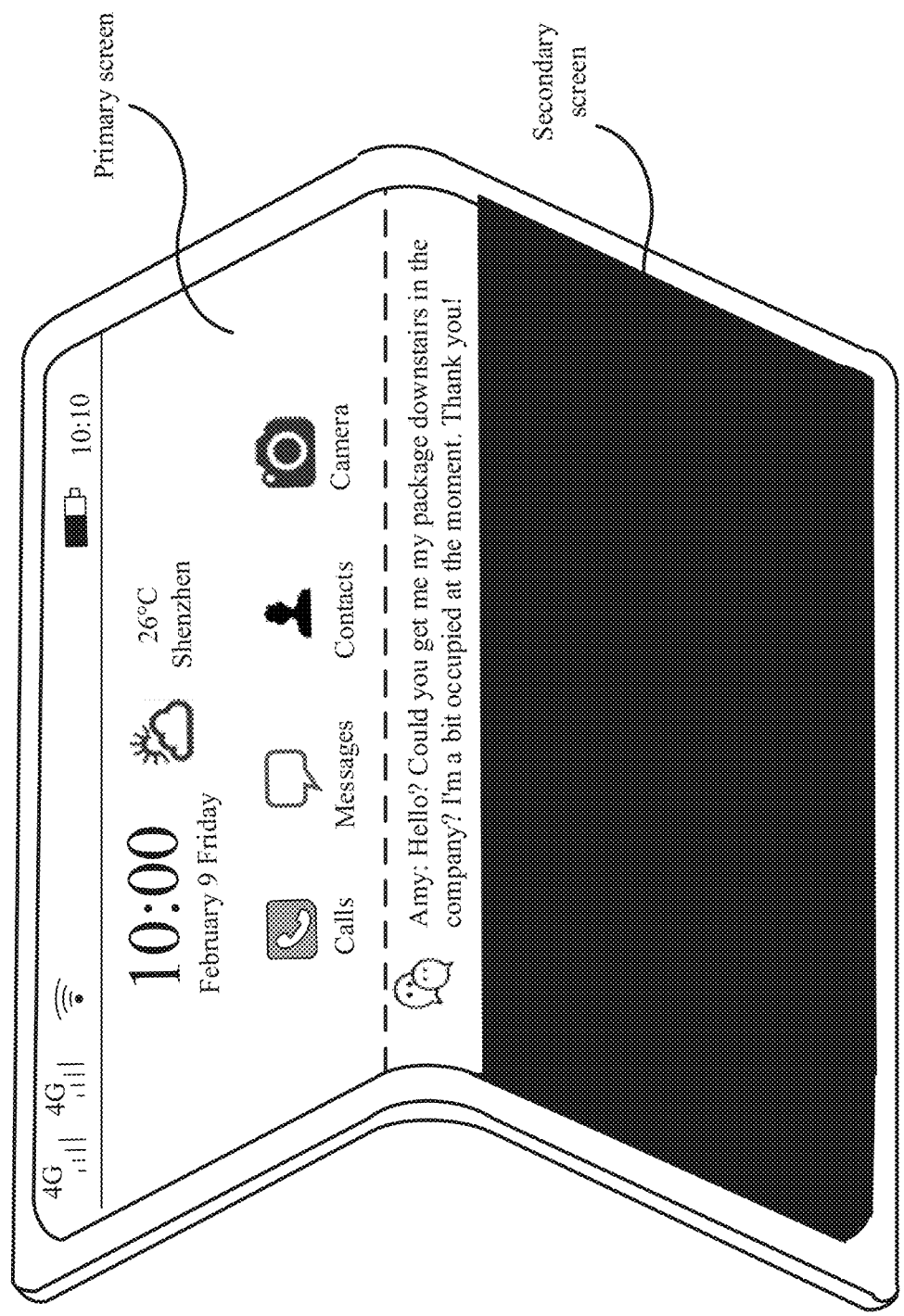

Still using FIG. 16(b) as an example, when the foldable electronic device is in the semi-folded form, the side screen displays a new message. When changing from the semi-folded form to the folded form, the foldable electronic device may turn off the side screen.

Figure 16C:
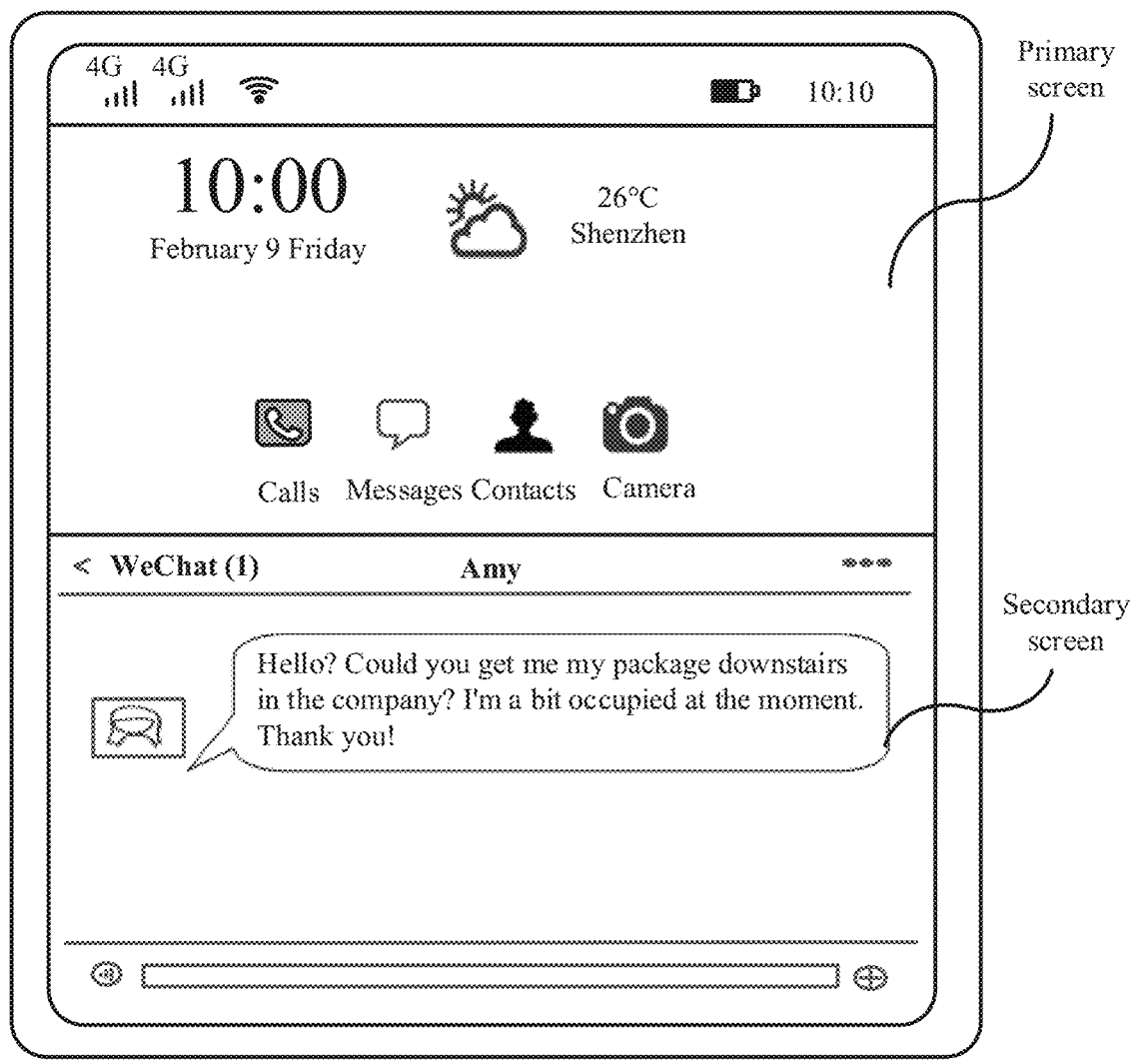

In some embodiments, when unfolded to 180 degrees, the foldable electronic device may enter a split-screen mode. In the split-screen mode, a first display region of the foldable electronic device displays the first interface of the first application, and a second display region displays a second interface of a second application corresponding to the new message. The first display region may be a partial region of the primary screen or of the primary screen and the side screen, and the second display region may be a partial region of the secondary screen or of the secondary screen and the side screen. For example, the first display region and the second display region may occupy an entire display region of the foldable electronic device. For example, as shown in FIG. 16(c), when the foldable electronic device is unfolded to 180 degrees, the split screens display the home screen and a display interface of the WeChat application.

In another possible case, after receiving a new message, the foldable electronic device may directly turn on the side screen, and display the new message on the side screen. When detecting a change from the folded form to the unfolded form, the foldable electronic device enters a split-screen mode. In the split-screen mode, a first display region of the foldable electronic device displays the first interface of the first application, and a second display region displays a second interface of a second application corresponding to the new message.

Figure 17A:
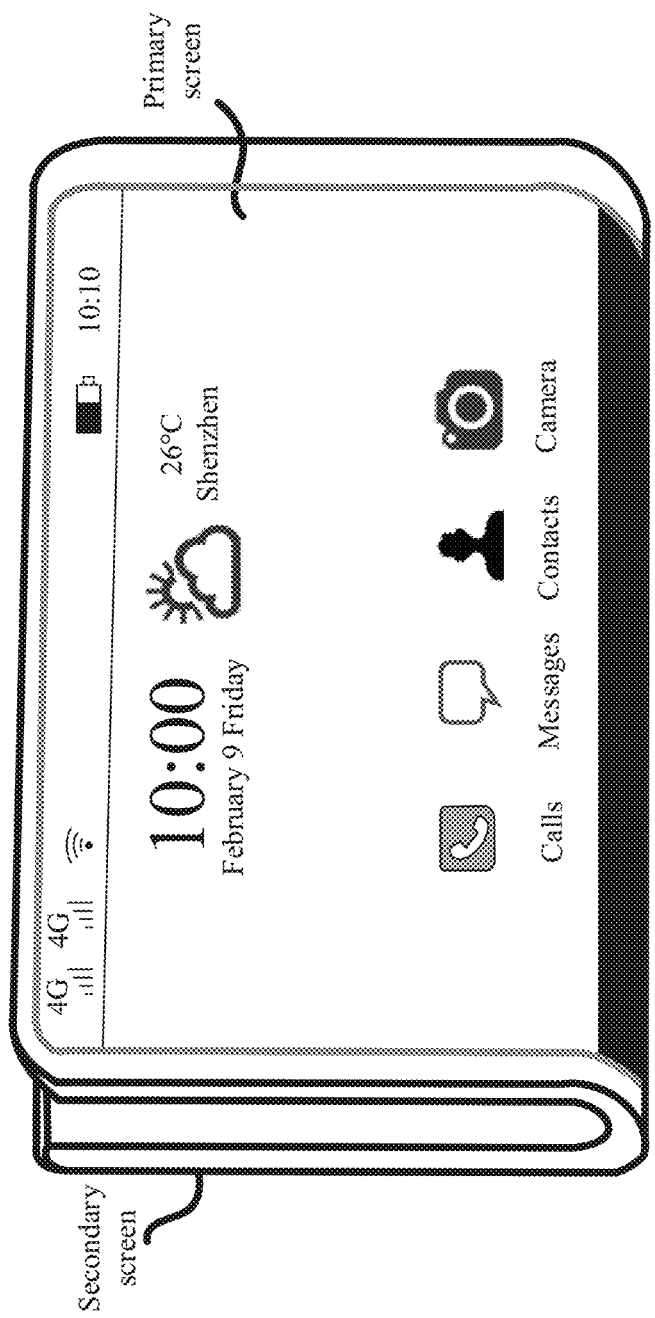
Figure 17B:
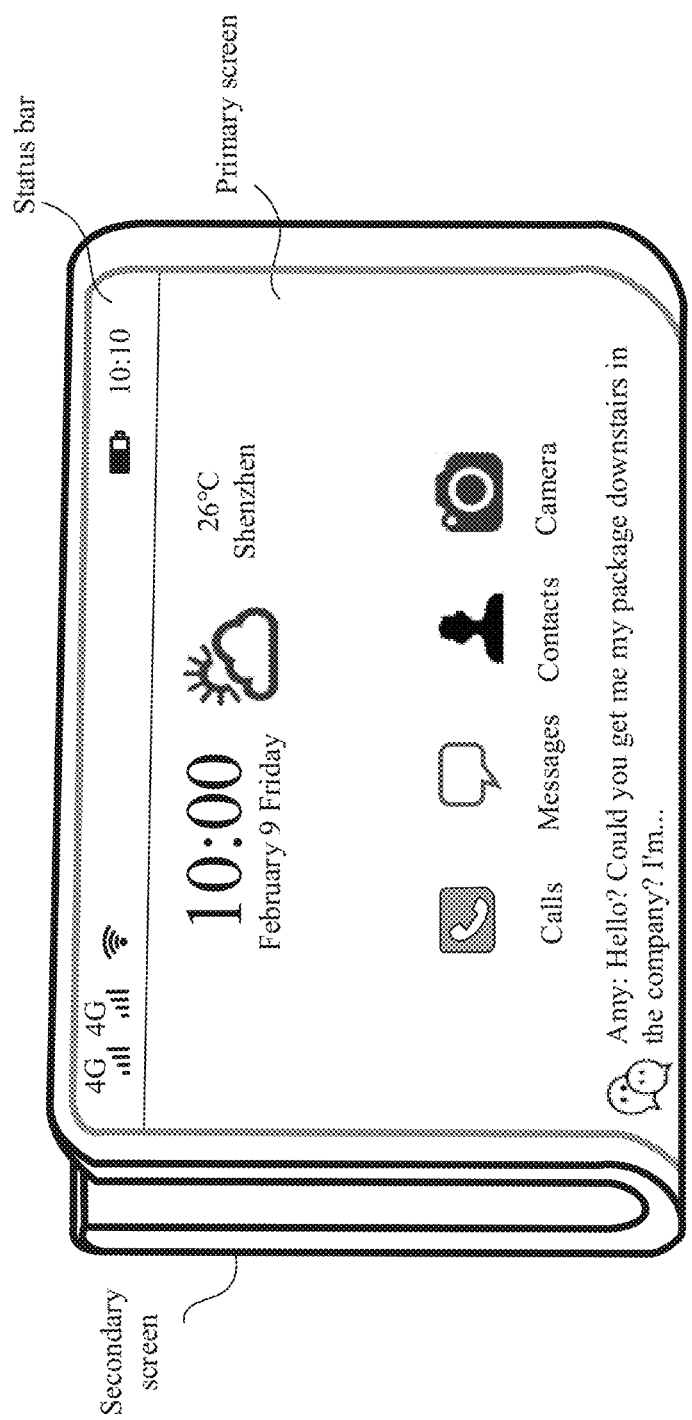
Figure 17C:
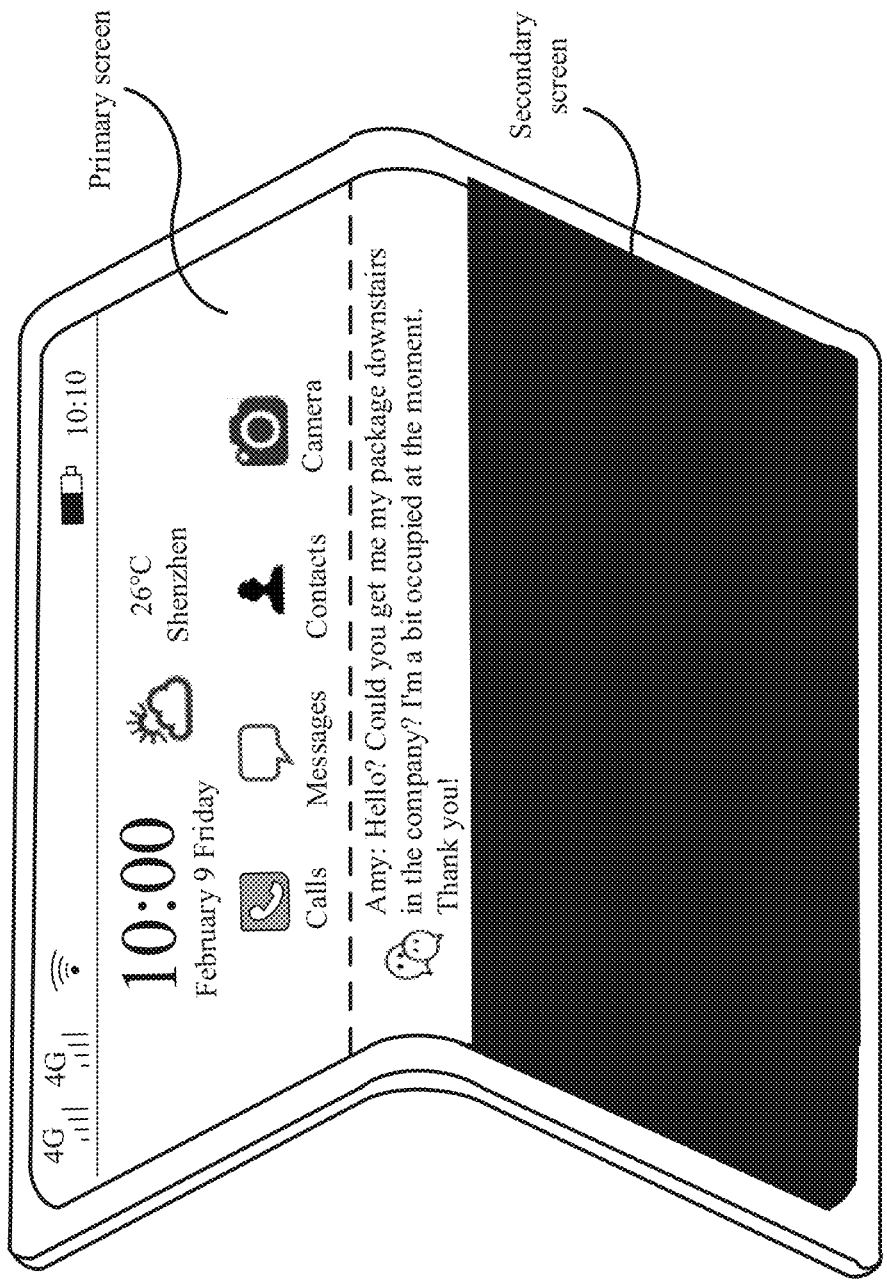
Figure 17D:
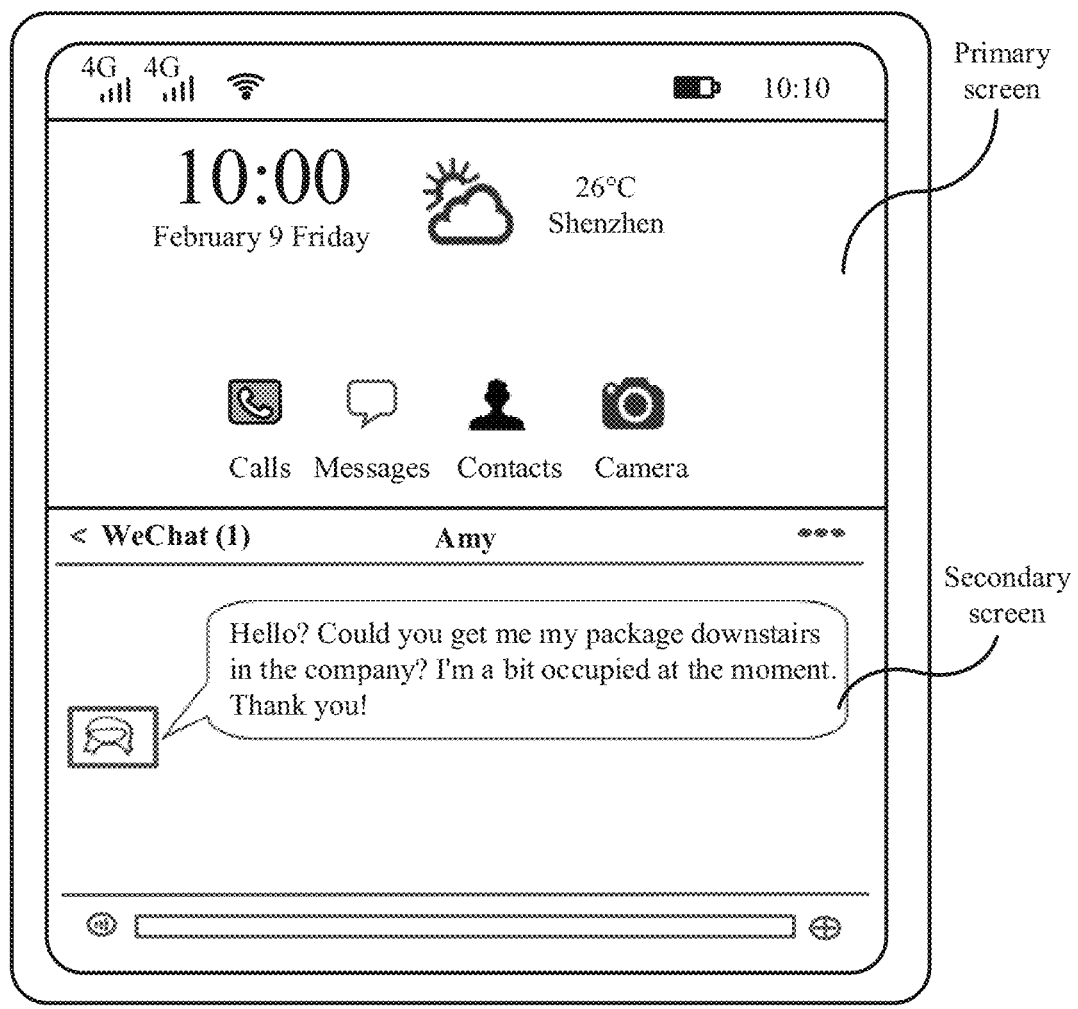

In Example 1, referring to FIG. 17(a), the primary screen of the foldable electronic device displays the home screen, and the secondary screen and the side screen are turned off. When receiving a new message, the foldable electronic device may turn on the side screen and display the new message on the side screen, as shown in FIG. 17(b). When detecting 180-degree unfolding, the foldable electronic device may enter the split-screen mode, and simultaneously display the home screen and the display interface of the WeChat application, as shown in FIG. 17(d). In some embodiments, in a process of gradual unfolding under an effect of an unfolding operation, the foldable electronic device may not turn on the secondary screen, but turns on the secondary screen after the unfolding reaches 180 degrees, and then enters the split-screen mode, as shown in FIG. 17(c).

In Example 1, a possible case is that the side screen always displays a new message, and when detecting 180-degree unfolding, the foldable electronic device enters the split-screen mode. In some other possible cases, the side screen displays a new message for a period of time and then cancels displaying the new message. In duration in which the side screen displays the new message, when detecting 180-degree unfolding, the foldable electronic device may enter the split-screen mode. When the side screen cancels displaying the new message, and the foldable electronic device detects 180-degree unfolding, the foldable electronic device may not enter the split-screen mode. In another possible case, after displaying a new message for a period of time, the side screen cancels displaying the new message. When the side screen cancels displaying the new message, and the foldable electronic device detects 180-degree unfolding, the foldable electronic device still enters the split-screen mode.

Figure 18A:
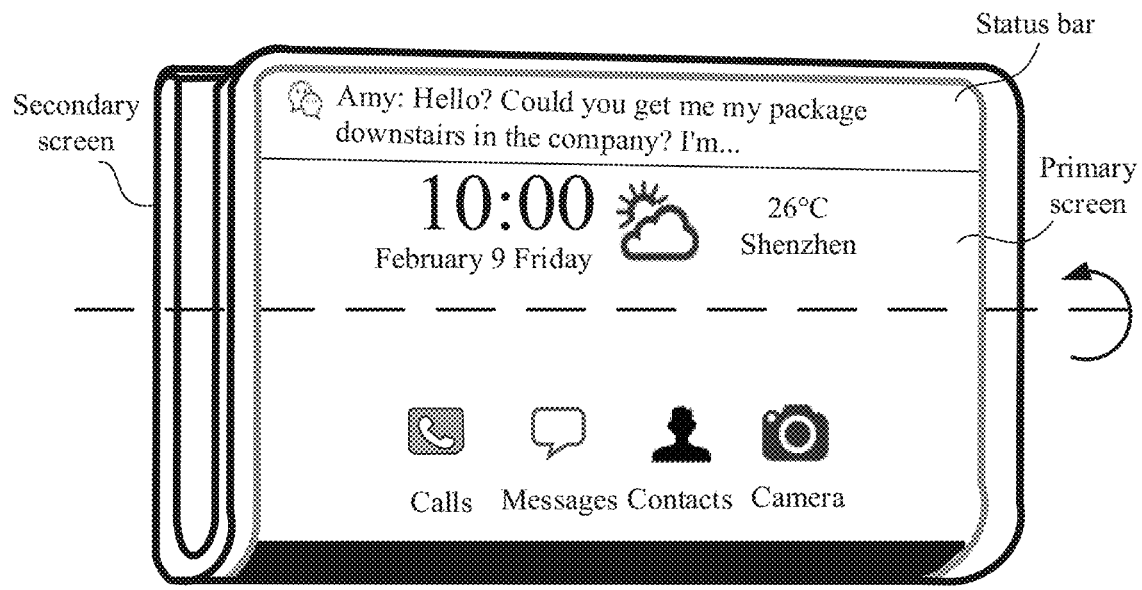
Figure 18B:
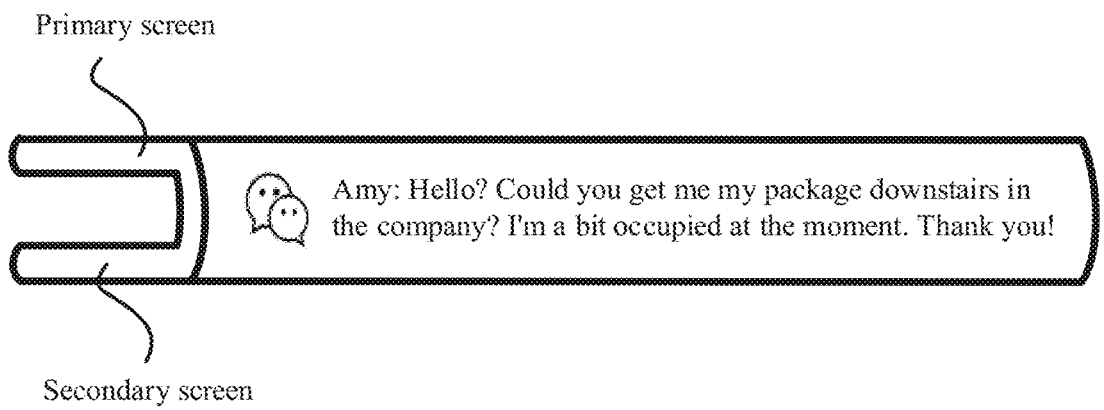
Figure 18C:
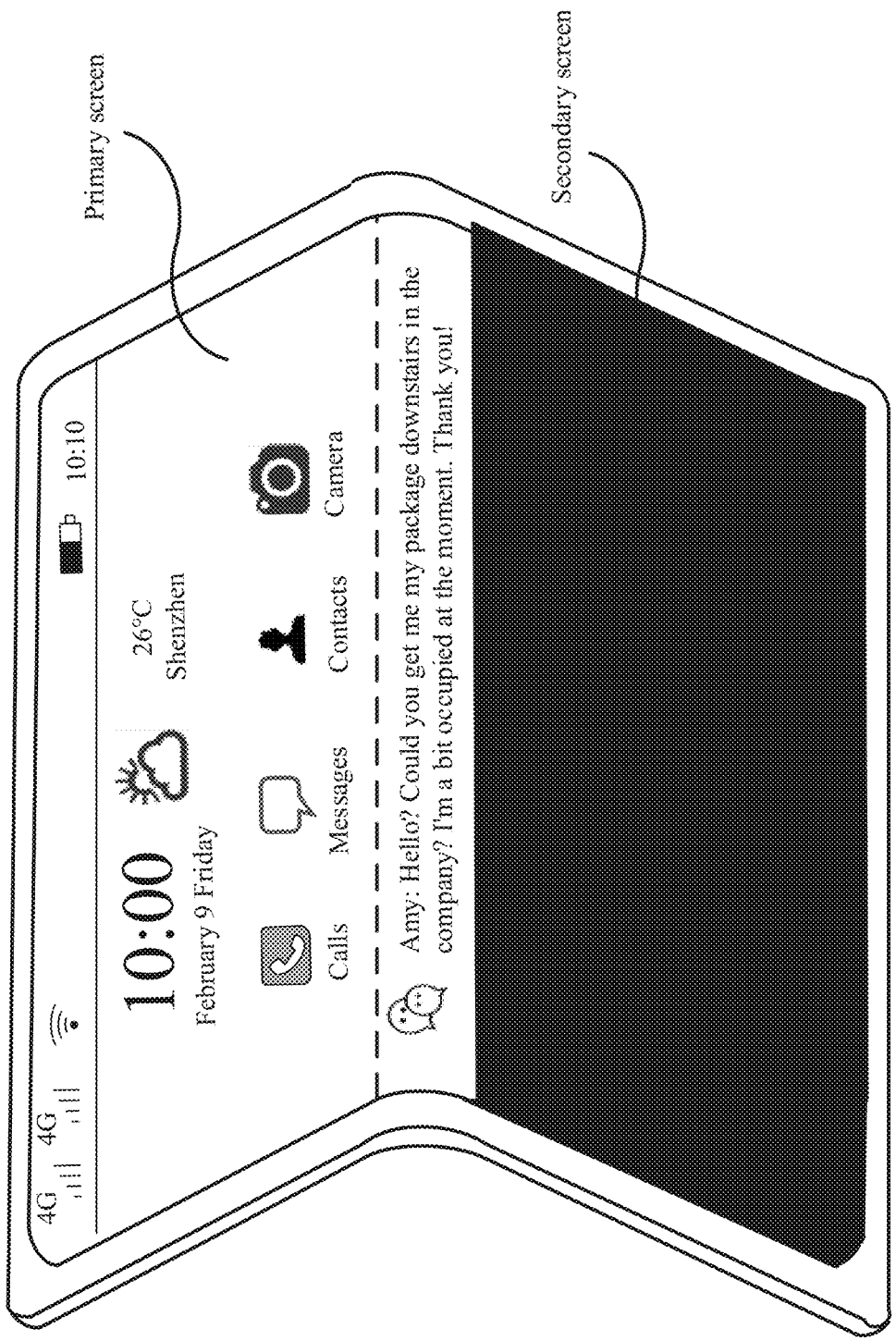
Figure 18D:
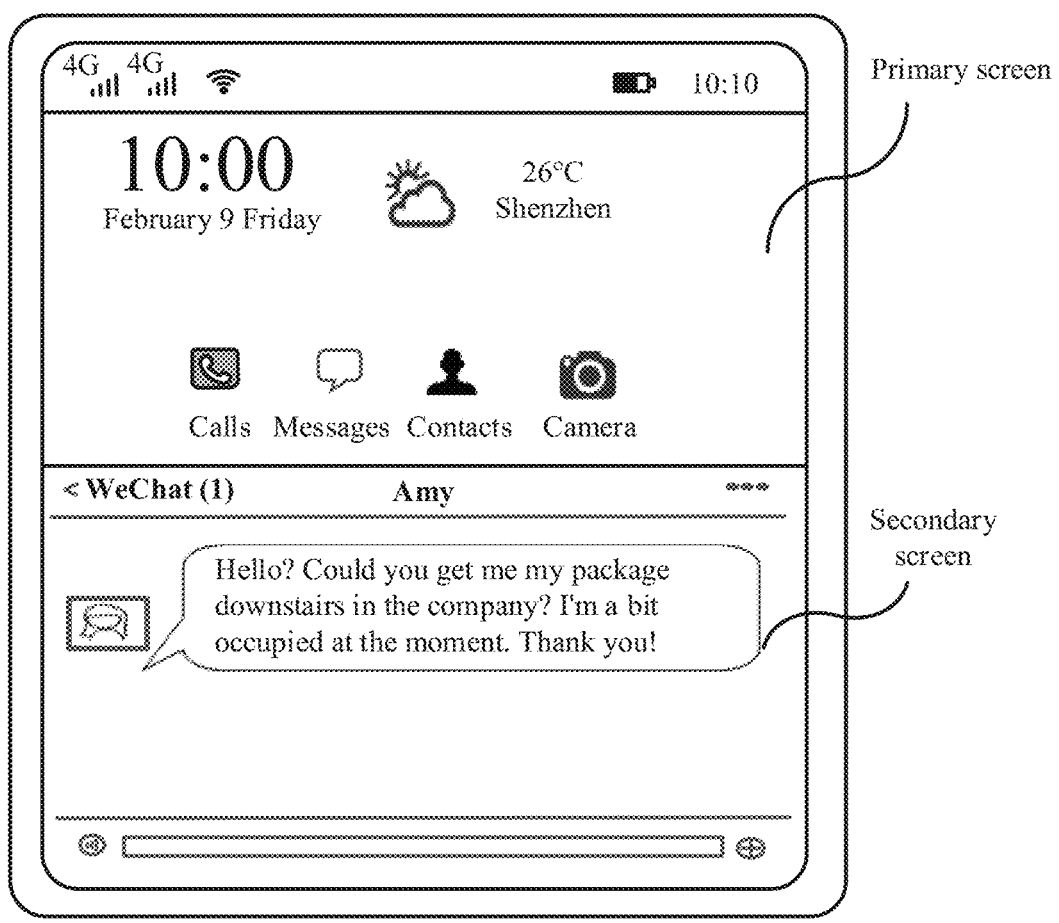

In Example 2, referring to FIG. 18(a), the primary screen of the foldable electronic device displays the home screen. The secondary screen and the side screen are in the off state. The WeChat application in the foldable electronic device receives a new message. The foldable electronic device displays the new message in the status bar on the primary screen. When detecting that the side screen is flipped upward, the foldable electronic device turns on the side screen, and displays, on the side screen, the new message received by the WeChat application, as shown in FIG. 18(b). When the foldable electronic device is unfolded to a specific angle under an effect of an unfolding operation, the secondary screen has not been turned on, the primary screen still displays the home screen, and the side screen displays the new message, as shown in FIG. 18(c). When unfolded to 180 degrees, the foldable electronic device closes the new message on the side screen, and enters the split-screen mode, as shown in FIG. 18(d). In the split-screen mode, the foldable electronic device simultaneously displays the home screen and the display interface of the WeChat application.

In Example 2, a possible case is that, using FIG. 18(b) as an example, the side screen may always display the new message during a period in which the side screen faces upward. When detecting 180-degree unfolding, the foldable electronic device enters the split-screen mode. In some other possible cases, still using FIG. 18(b) as an example, during a period in which the side screen faces upward, the side screen may cancel displaying the new message after the new message is displayed for a period of time. In duration in which the side screen displays the new message, when detecting 180-degree unfolding, the foldable electronic device may enter the split-screen mode. When the side screen faces upward and cancels displaying the new message, and the foldable electronic device detects 180-degree unfolding, the foldable electronic device may not enter the split-screen mode. In another possible case, still using FIG. 18(b) as an example, during a period in which the side screen faces upward, the side screen may cancel displaying the new message after the new message is displayed for a period of time. When the side screen faces upward and cancels displaying the new message, and the foldable electronic device detects 180-degree unfolding, the foldable electronic device still enters the split-screen mode.

If detecting a flipping operation for flipping the primary screen upward, the foldable electronic device may turn off the side screen. When the side screen is turned off, and the foldable electronic device is unfolded to 180 degrees, the foldable electronic device may not enter the split-screen mode.

In some other embodiments, when detecting an operation for switching from the folded form to the unfolded form, the foldable electronic device may turn on the secondary screen, and display prompt information on the secondary screen.

The prompt information is used to prompt the user whether to display, on the secondary screen, a display interface of a second application corresponding to the new message. If the foldable electronic device receives a confirm instruction, the secondary screen displays the display interface of the second application corresponding to the new message. If the foldable electronic device receives a reject instruction, the display of the foldable electronic device displays the first interface of the first application in full screen.

Figure 19A:
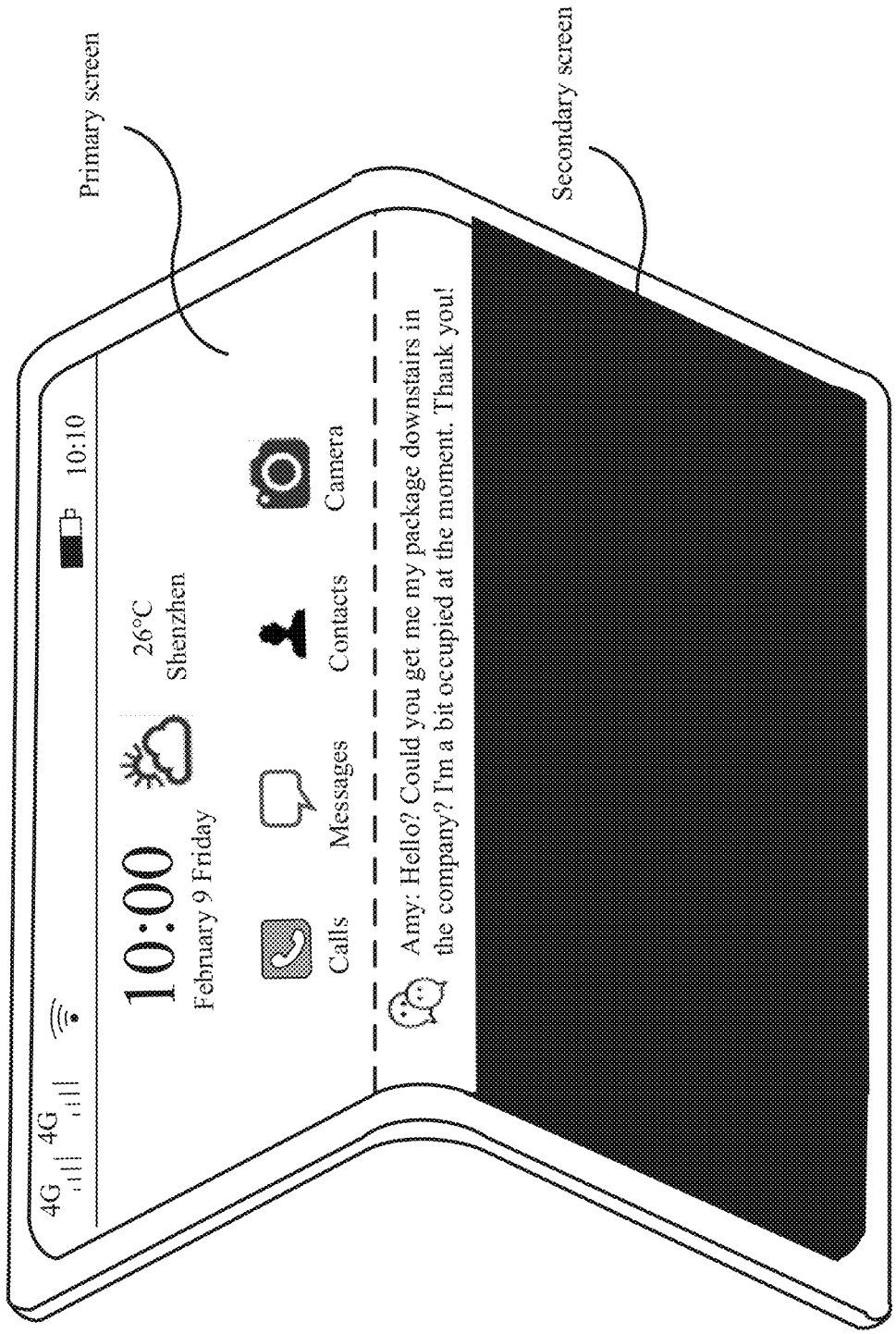
Figure 19C:
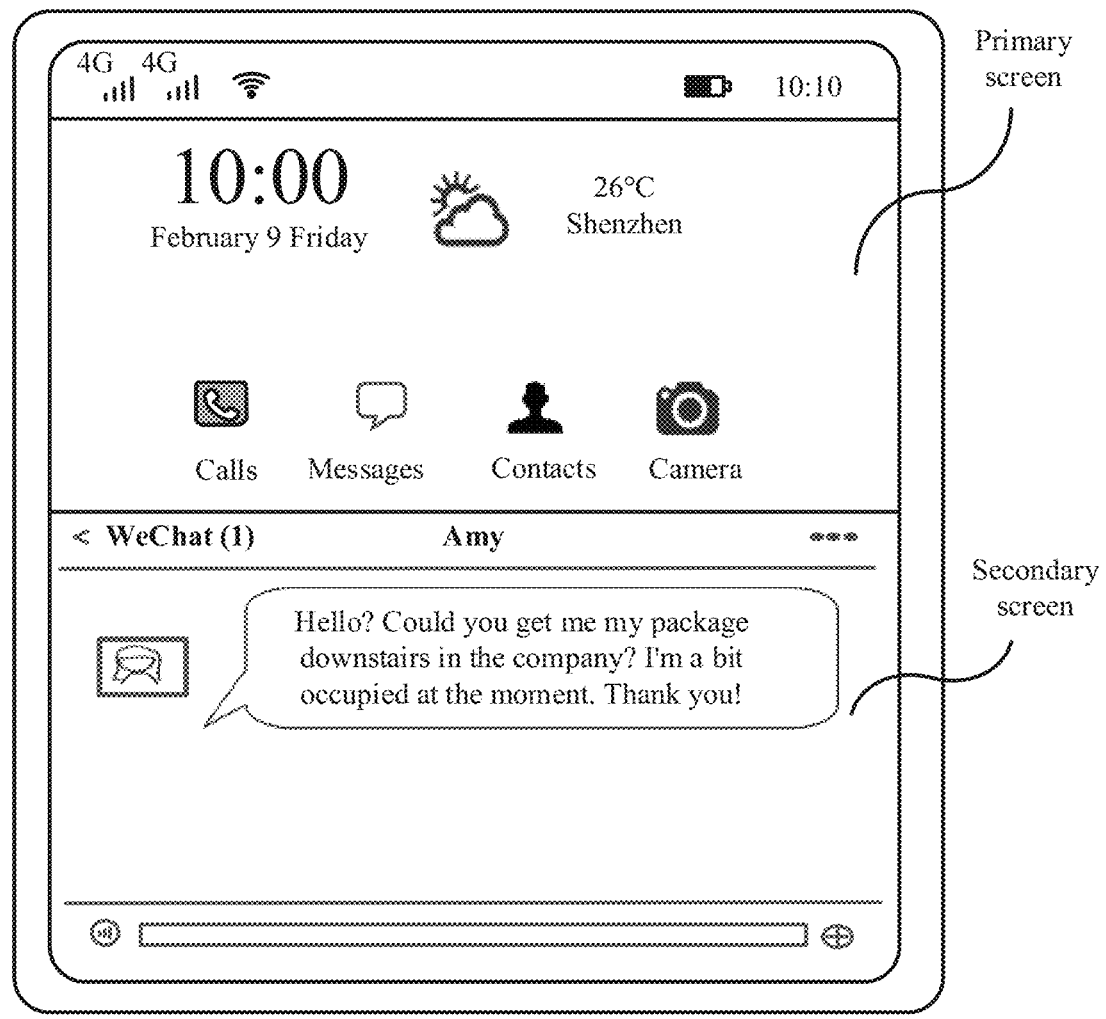
Figure 19D:

For example, referring to FIG. 19(a), the foldable electronic device is in the semi-folded form, the primary screen displays the home screen, the side screen displays a new message, and the secondary screen is in the off state. When the foldable electronic device is unfolded to 180 degrees, the secondary screen is turned on and displays prompt information, as shown in FIG. 19(b). The prompt information is used to prompt the user whether to display the new message on the secondary screen. If detecting an operation targeted for a "Yes" control, the foldable electronic device enters the split-screen mode. In the split-screen mode, the first display region of the foldable electronic device displays the home screen, and the second display region displays the display interface of the WeChat application, as shown in FIG. 19(c). If detecting an operation targeted for a "No" control, the foldable electronic device may display the home screen in full screen, as shown in FIG. 19(d).

In some embodiments, after the foldable electronic device enters the split-screen mode, if detecting a change from the unfolded form to the folded form, the foldable electronic device may turn off the secondary screen, and may further turn off the side screen.

Figure 20A:
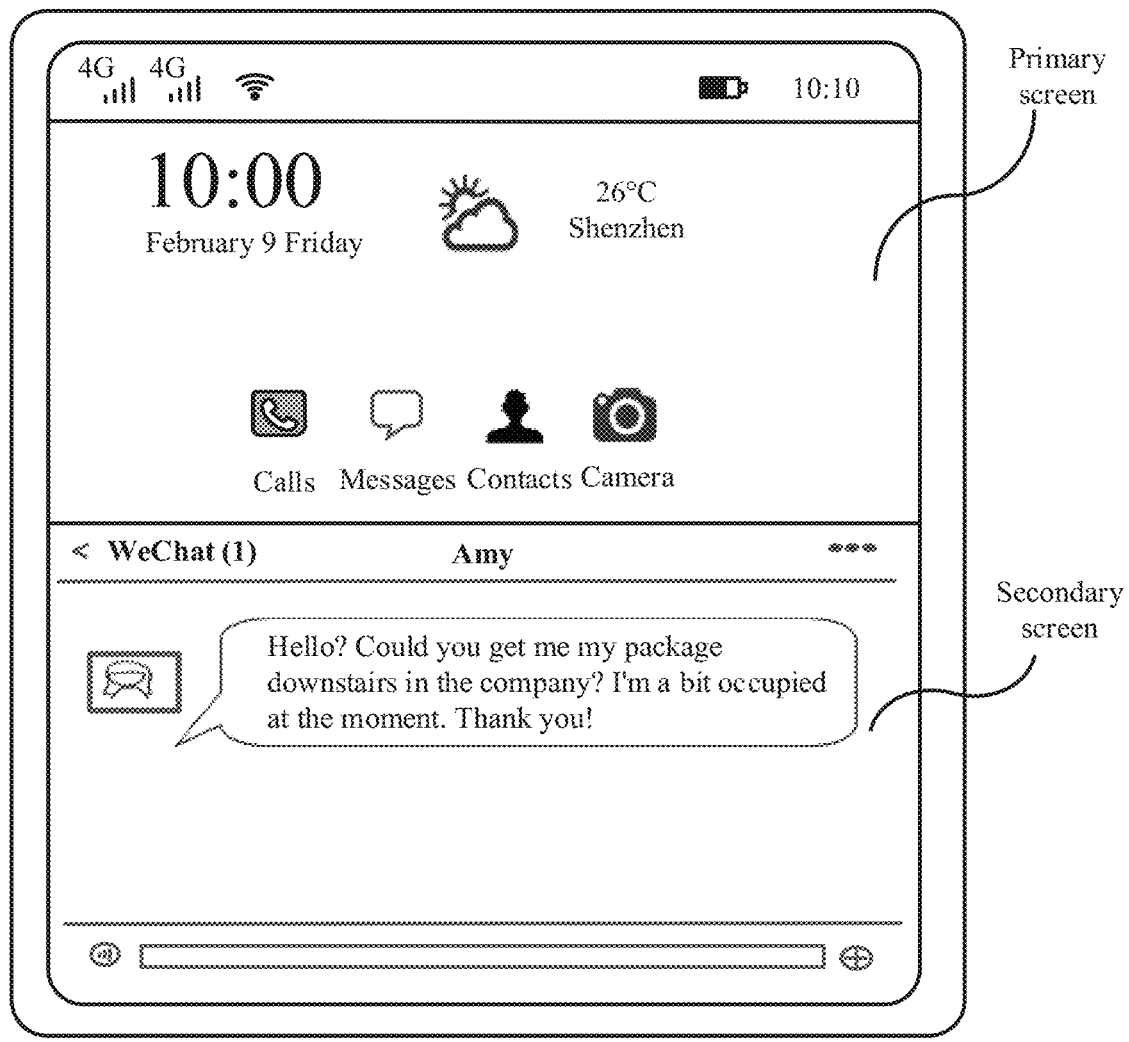
FIG. 20(a), FIG. 20(b), and FIG. 20(c) are schematic diagrams of a foldable electronic device from an unfolded form to a folded form according to an embodiment of this application.
Figure 20B:
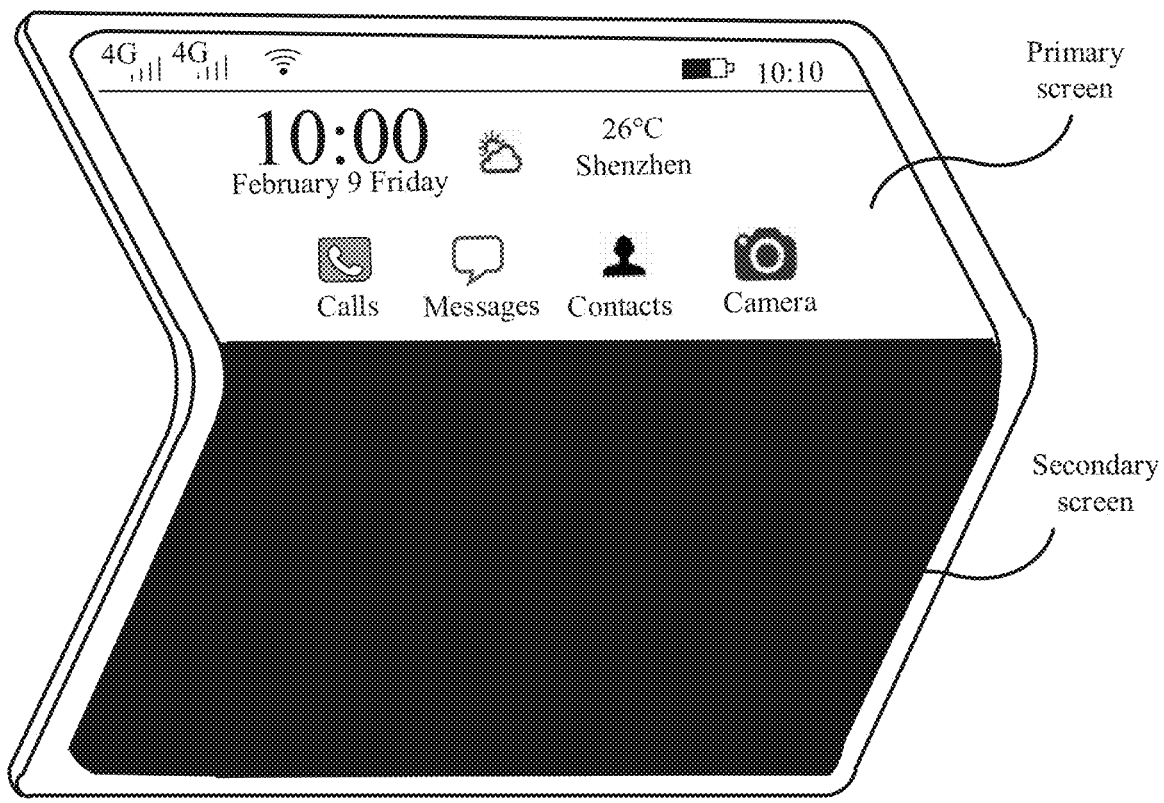
Figure 20C:

For example, referring to FIG. 20(a), the foldable electronic device is in the folded form. When detecting an operation for switching from the unfolded form to the semi-folded form, the foldable electronic device may turn off the secondary screen and the side screen, as shown in FIG. 20(b). When the foldable electronic device is in the folded form, the primary screen displays the home screen, and the secondary screen and the side screen are turned off, as shown in FIG. 20(c).

In some other embodiments, after the side screen is turned on and displays a new message, the side screen may have a touch sensing capability. When detecting a touch operation performed by the user on the side screen, the foldable electronic device may process the new message. For example, the foldable electronic device may determine, based on the touch operation performed by the user on the side screen, to enable an application corresponding to the new message on the primary screen or the secondary screen, or close the new message.

Figure 21:
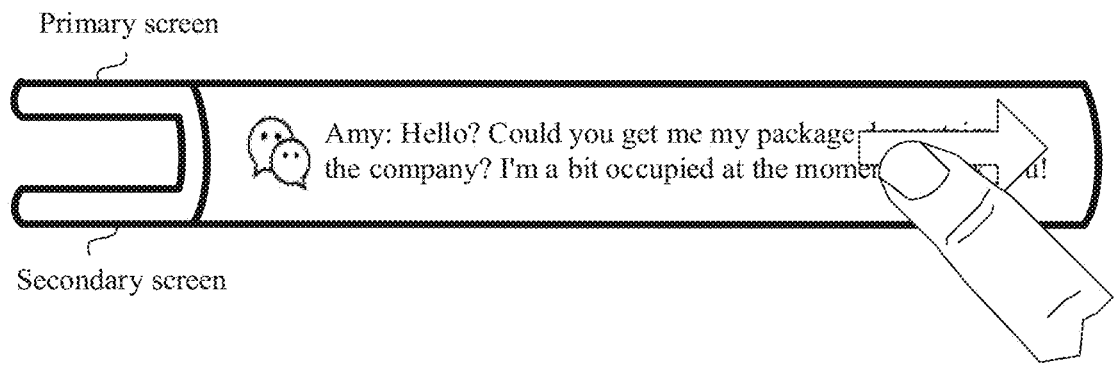
FIG. 21 is a schematic diagram of a side screen of a foldable electronic device according to an embodiment of this application.

In an example, referring to FIG. 21, the side screen of the foldable electronic device displays a new message. The primary screen displays the first interface of the first application (the touch function of the primary screen may be disabled), and the secondary screen is turned off. When detecting that the user performs an operation of swiping leftward or rightward on the side screen, the foldable electronic device may close the new message, and turn off the side screen.

Figure 22A:
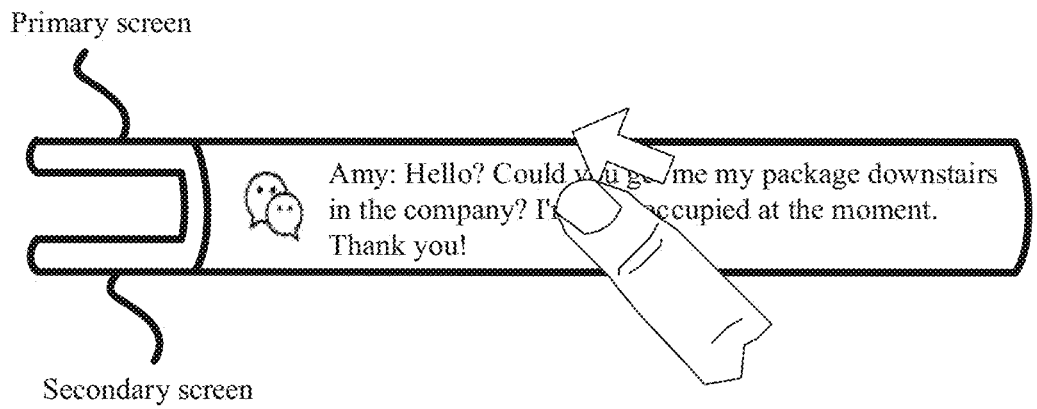
FIG. 22(a) and FIG. 22(b) are schematic diagrams of graphical user interfaces of a foldable electronic device according to an embodiment of this application.
Figure 22B:
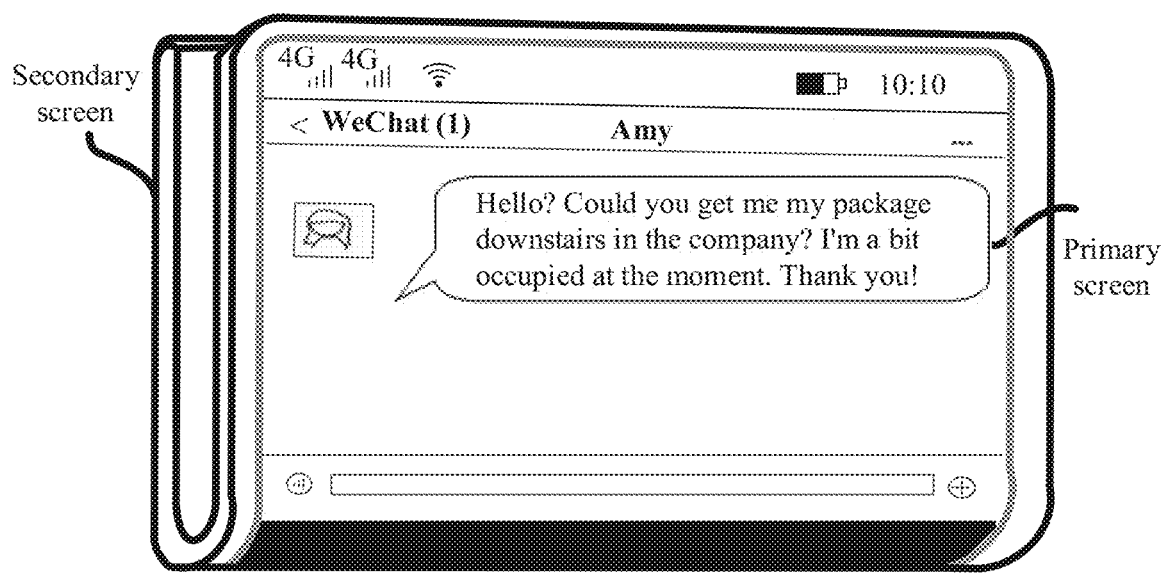

In some other examples, referring to FIG. 22(a), the side screen of the foldable electronic device displays a new message. The primary screen displays the first interface of the first application, and the secondary screen is turned off. When detecting that the user performs an operation of swiping upward on the side screen, the foldable electronic device may enable a second application corresponding to the new message, and display a second interface of the second application on the primary screen. After displaying the second interface of the second application on the primary screen, the foldable electronic device may turn off the side screen, as shown in FIG. 22(b). Alternatively, when detecting that the user performs an operation of swiping upward on the side screen, the foldable electronic device may use the primary screen and the side screen as one screen to display the second interface of the second application. In this example, after detecting that the user performs the operation of swiping upward on the side screen, the foldable electronic device may switch the first application originally displayed on the primary screen to a backend for running. Alternatively, the foldable electronic device may switch the first application to the secondary screen for display.

Figure 23A:
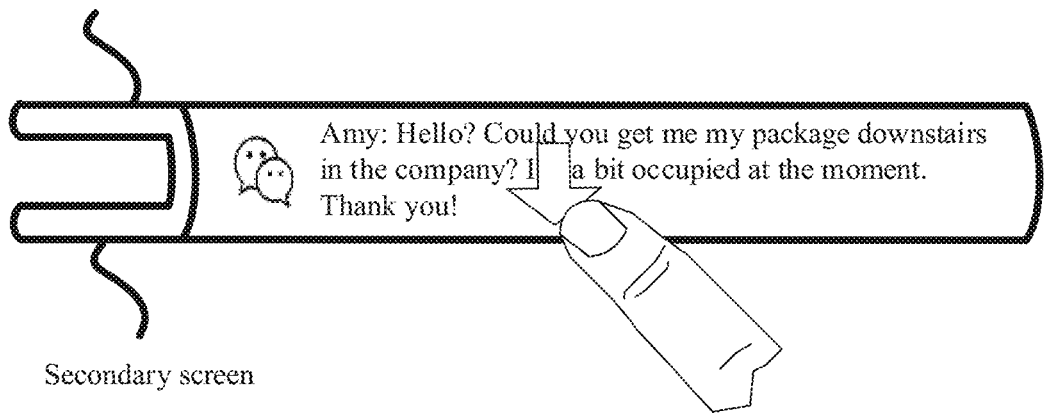
FIG. 23(a) and FIG. 23(b) are schematic diagrams of graphical user interfaces of a foldable electronic device according to an embodiment of this application.
Figure 23B:
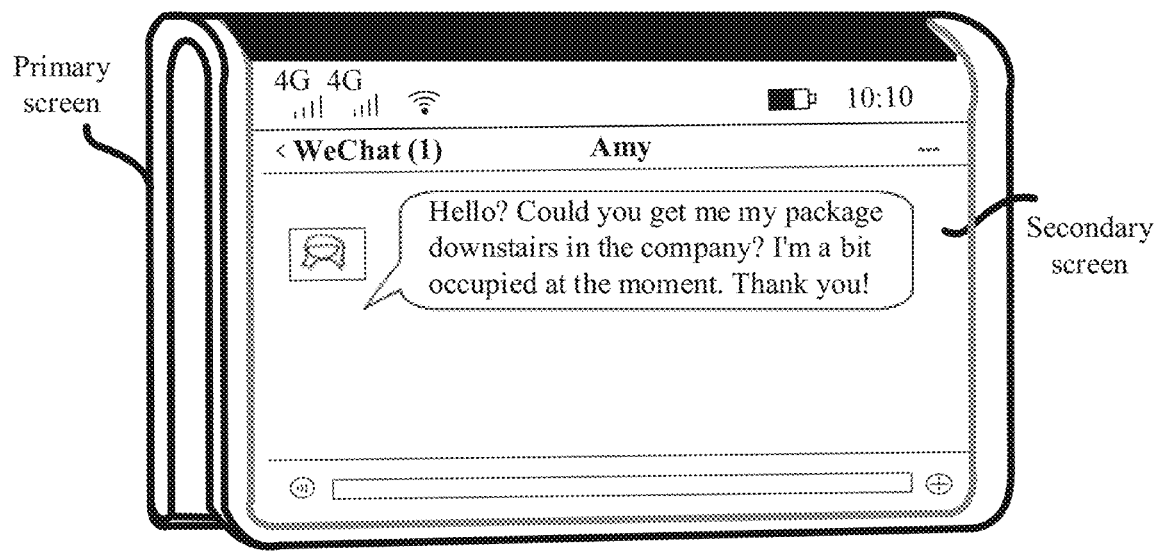

In still some other examples, referring to FIG. 23(a), the side screen of the foldable electronic device displays a new message. The primary screen displays the first interface of the first application, and the secondary screen is turned off. When detecting that the user performs an operation of swiping downward on the side screen, the foldable electronic device may enable a second application corresponding to the new message, and display a second interface of the second application on the secondary screen. After displaying the second interface of the second application on the secondary screen, the foldable electronic device may turn off the side screen, as shown in FIG. 23(b). Alternatively, when detecting that the user performs an operation of swiping downward on the side screen, the foldable electronic device may use the secondary screen and the side screen as one screen to display the second interface of the second application. In this example, the foldable electronic device displays the new message by using the side screen. When the user needs to view or process the new message, the second interface of the second application corresponding to the new message may be displayed by using the secondary screen, and the first interface of the first application is still displayed on the primary screen. In this example, to prevent the user from accidentally touching the first interface of the first application on the primary screen, after displaying the second interface of the second application on the secondary screen, the foldable electronic device may disable the touch function of the primary screen. After detecting that the primary screen faces upward, the foldable electronic device may enable the touch function of the primary screen again, and may further turn off the secondary screen.

The foregoing embodiments are described by using the holding state shown in FIG. 7(a) as an example. For the holding state shown in FIG. 7(b), similar processing manners may be used, which are not enumerated one by one herein.

The implementations of this application may be randomly combined to achieve different technical effects.

Figure 24:
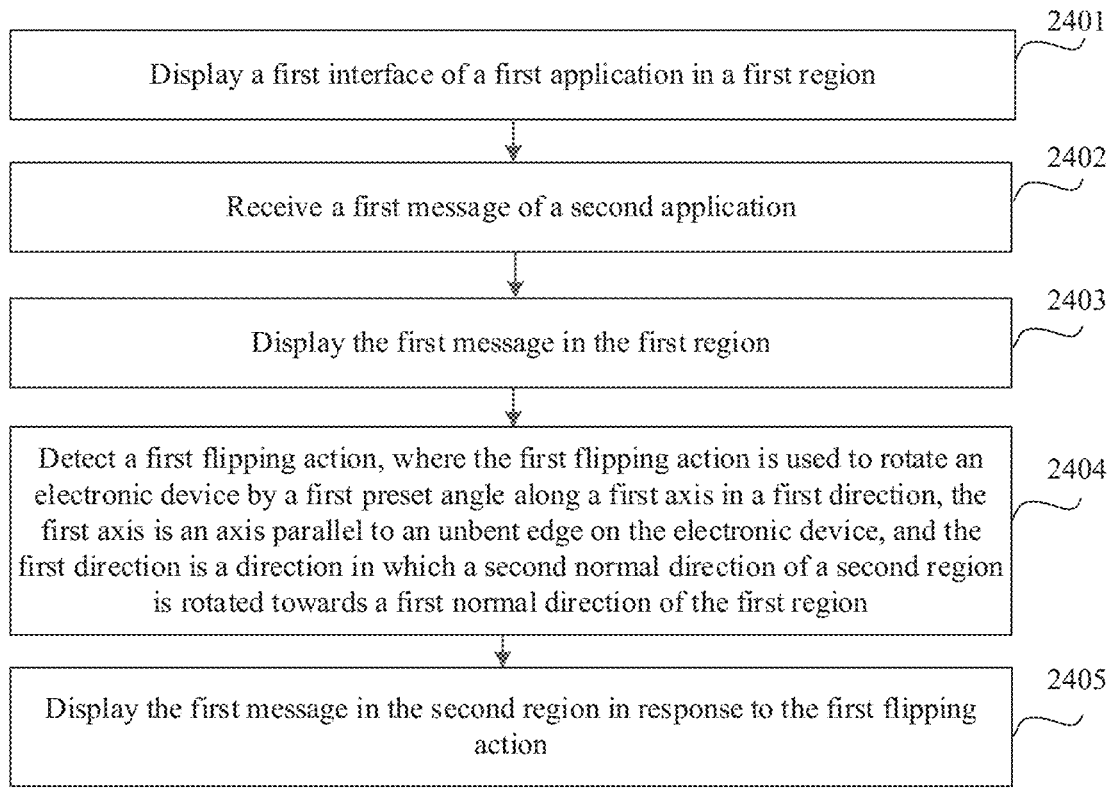
FIG. 24 is a schematic flowchart of a message display method according to an embodiment of this application.

With reference to foregoing embodiments and related accompany drawings, an embodiment of this application provides a message display method. The method may be implemented in an electronic device (such as a mobile phone or a tablet computer) having a foldable display. For example, a structure of the electronic device may be shown in FIG. 2, FIG. 4(a) to FIG. 4(d), and/or FIG. 6(a) to FIG. 6(d). Using FIG. 6(a) to FIG. 6(d) as an example, the foldable display includes a first region, a second region, and a third region. When the electronic device is in a folded form, the second region is bent. As shown in FIG. 24, the method may include the following steps.

2401. Display a first interface of a first application in the first region.

In an example of FIG. 9B(a), a primary screen (that is, the first region) of the electronic device displays a home screen (that is, the first interface), a secondary screen (that is, the third region) is turned off, and a side screen (that is, the second region) is turned off. In another example, the first application in 2401 may alternatively be an application such as WeChat, iQIYI, or a gallery. This is not limited in this embodiment of this application.

2402. Receive a first message of a second application.

In some embodiments, the first application and the second application may be a same application. For example, the first application is a WeChat application. The electronic device is in the folded form, and the first region, that is, the primary screen, displays a Moments interface of the WeChat application. When the electronic device receives a new message sent by a contact in the WeChat application, the Moments interface on the primary screen displays the new message. When detecting a first flipping action, the electronic device displays the new message by using the side screen.

In some other embodiments, the first application and the second application may be two different applications. For example, the first application is an iQIYI application, and the second application is a WeChat application. The electronic device is in the folded form, and the first region, that is, the primary screen, displays a movie playback interface of the iQIYI application. When the electronic device receives a new message sent by a contact in the WeChat application, the primary screen displays the new message. When detecting a first flipping action, the electronic device displays the new message by using the side screen.

2403. Display the first message in the first region.

In an example of FIG. 9B(a), the electronic device may display the first message in a status bar on the primary screen (that is, the first region). In some other examples of FIG. 10(a), the electronic device may display an identifier, for example, an identifier 1001, of the first message at any location on the primary screen (that is, the first region). The identifier is used to indicate that the electronic device receives a new message.

2404. Detect a first flipping action, where the first flipping action is used to rotate the electronic device by a first preset angle along a first axis in a first direction, the first axis is an axis parallel to an unbent edge on the electronic device, and the first direction is a direction in which a second normal direction of the second region is rotated towards a first normal direction of the first region.

In an example of FIG. 15B(a), a user operates the electronic device when lying down. In this case, the primary screen of the electronic device faces the user, and displays the first interface of the first application. The secondary screen and the side screen may be turned off. When receiving a new message of the second application, the electronic device displays the new message on the primary screen. When detecting the first flipping action (for example, an operation for rotating the second normal direction of the side screen towards the first normal direction of the primary screen), the electronic device displays the new message by using the side screen, as shown in FIG. 15B(b). The user may view the new message by using the side screen.

2405. Display the first message in the second region in response to the first flipping action.

In some other embodiments, when detecting a second flipping action, the electronic device may close the first message of the second region and/or turn off the second region. The second flipping action is used to rotate the electronic device by a second preset angle along the first axis in a second direction, and the second direction is opposite to the first direction.

In an example of FIG. 15B(b), the electronic device displays the new message by using the side screen. When detecting the second flipping operation having a direction opposite to that of the first flipping operation, the electronic device turns off the side screen and/or closes the new message on the side screen. Therefore, from a perspective of the user, the electronic device receives the new message in a process in which the user holds the electronic device (the primary screen faces the user). When the user flips the side screen to face the user, the side screen displays the new message. When the user flips the primary screen to face the user, the side screen is turned off, or the new message on the side screen is closed.

In some other embodiments, FIG. 15B(b) is still used as an example. The electronic device detects a third flipping action for, for example, rotating the second normal direction of the side screen towards the first normal direction of the primary screen. The electronic device displays an interface of the second application corresponding to the first message by using the secondary screen. The interface includes the first information.

Figure 25:
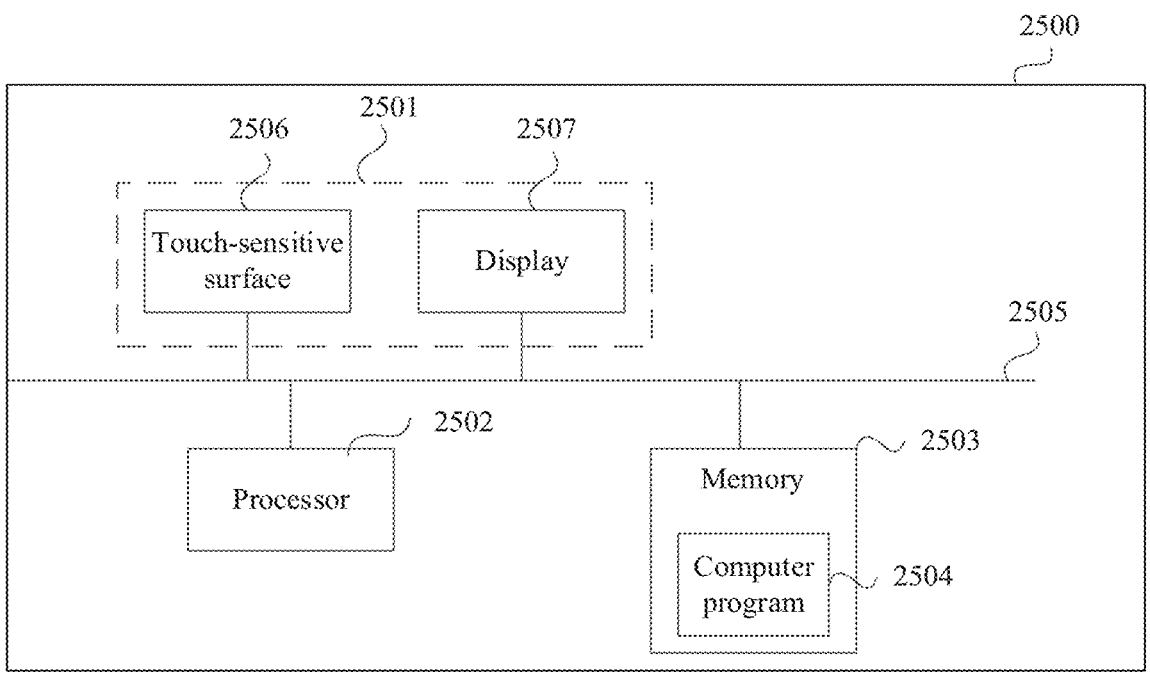
FIG. 25 is a schematic diagram of a structure of an electronic device according to an embodiment of this application.

As shown in FIG. 25, some other embodiments of this application disclose an electronic device 2500. The electronic device is, for example, a mobile phone or an iPad. The electronic device 2500 may include a touchscreen 2501, where the touchscreen 2501 includes a touch-sensitive surface 2506 and a display 2507; one or more processors 2502; one or more memories 2503, and one or more computer programs 2504. The foregoing components may be connected by using one or more communications buses 2505.

The touchscreen 2501 may be a foldable touchscreen. The touchscreen may be used as an input device of the electronic device to receive an input operation. For example, the touchscreen 2501 may include a first region, a second region, and a third region. The second region may be a bend region. For example, when the electronic device is in a folded form, the second region is bent.

The first region or the third region on the display 2507 may be configured to display a home screen, a display interface of an application program, or the like. The one or more computer programs 2504 are stored in the memory 2503 and are configured to be executed by the one or more processors 2502. The one or more computer programs 2504 include instructions, and the instructions may be used to perform the steps in FIG. 4(*a*) to FIG. 24 and the corresponding embodiment.

In some embodiments, the electronic device may further include a communications module, a sensor module, and the like. The communications module is configured to implement data sending and receiving, for example, may receive a message sent by another device. The sensor module is configured to detect sensor data, for example, a flipping direction and a flipping angle.

For example, if the electronic device 2500 is the mobile phone 100 shown in FIG. 2, the touchscreen 2501 is the display 194 in the mobile phone 100, and the communications module may be the mobile communications module 150 and/or the wireless communications module 160. The processor 2502 may be the processor 110 of the mobile phone 100, and the memory 2503 may be the internal memory 121 of the mobile phone 100. The sensor module may be one or more sensors in the sensor module 180 in the mobile phone 100, for example, the gyroscope sensor 180B or the acceleration sensor 180E.

In the foregoing embodiments provided in this application, the method provided in the embodiments of this application is described from a perspective that the electronic device (the mobile phone 100) serves as an execution body. To implement functions in the method provided in the embodiments of this application, the terminal device may include a hardware structure and/or a software module, and implement the functions in a form of the hardware structure, the software module, or both the hardware structure and the software module. Whether a function in the foregoing functions is performed in a form of a hardware structure, a software module, or a hardware structure and a software module depends on particular applications and design constraints of the technical solutions.

According to the context, the term "when" or "after" used in the foregoing embodiments may be interpreted as a meaning of "if", "after", "in response to determining", or "in response to detecting". Similarly, according to the context, the phrase "when it is determined that" or "if (a stated condition or event) is detected" may be interpreted as a meaning of "if it is determined that", "in response to determining", "when (a stated condition or event) is detected", or "in response to detecting (a stated condition or event)". In addition, in the foregoing embodiments, relational terms such as first and second are used to distinguish one entity from another, and any actual relationship and order between these entities are not limited.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on the computer, the procedures or functions according to the embodiments of the present invention are all or partially generated. The computer may be a general purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), or the like.

It should be noted that a part of this patent application document includes content protected by a copyright. The copyright owner reserves the copyright except for making a copy of the patent documents of the China National Intellectual Property Administration or the content of the recorded patent documents.

What is claimed is:

1. A message display method implemented by an electronic device comprising a foldable display, wherein the message display method comprises:

displaying a first interface of a first application in a first region of the foldable display;

receiving a first message of a second application;

displaying the first message in the first region;

detecting a first flipping action of rotating the electronic device by a first preset angle along a first axis in a first direction, wherein the first axis is parallel to an unbent edge on the electronic device, wherein the first direction is a direction in which a second normal direction of a second region of the foldable display is rotated towards a first normal direction of the first region, and wherein the second region is bent when the electronic device is in a folded form;

displaying, in response to the first flipping action, the first message in the second region;

detecting a second flipping action of rotating the electronic device by a second preset angle along the first axis in the first direction, wherein the second preset angle is greater than the first preset angle; and displaying, in response to the second flipping action, a second interface of the second application in a third region of the foldable display, wherein the second interface comprises the first message.

2. The message display method of claim 1, further comprising:

detecting a third flipping action of rotating the electronic device by a third preset angle along the first axis in a second direction, wherein the second direction is opposite to the first direction; and in response to the second flipping action, either:
closing the first message in the second region; or
turning off the second region.

3. The message display method of claim 2, further comprising:

receiving a second message;

displaying the second message in the first region;

detecting that the foldable display changes from the folded form to an unfolded form; and displaying the second message in the second region when detecting that the foldable display changes from the folded form to the unfolded form.

4. The message display method of claim 3, wherein when detecting that the foldable display changes from the unfolded form to the folded form, the message display method further comprises:

closing the second message in the second region; or
turning off the second region.

5. The message display method of claim 2, further comprising:

receiving a second message;

displaying the second message in the first region;

detecting that the foldable display changes from the folded form to an unfolded form;

entering a split-screen mode when detecting that the foldable display changes from the folded form to the unfolded form; and simultaneously displaying, in the foldable display and in the split-screen mode, the first interface and a third interface of a third application corresponding to the second message, wherein the third interface comprises the second message.

6. The message display method of claim 5, wherein when detecting that the foldable display changes from the unfolded form to the folded form, the message display method further comprises:

exiting the split-screen mode;
turning off a fourth region of the foldable display; and
displaying, in the first region, the first interface.

7. The message display method of claim 1, wherein after displaying the first message in the second region, the message display method further comprises:
  detecting a first operation targeted for the first message; and
  performing, in response to the first operation, closing, deleting, or reply processing on the first message.

8. The message display method of claim 1, wherein after displaying the first message in the second region, the message display method further comprises:
  detecting a first operation targeted for the first message; and
  performing, in response to the first operation, closing on the first message.

9. The message display method of claim 1, wherein after displaying the first message in the second region, the message display method further comprises:
  detecting a first operation targeted for the first message; and
  performing, in response to the first operation, deleting on the first message.

10. The message display method of claim 1, wherein after displaying the first message in the second region, the message display method further comprises:
  detecting a first operation targeted for the first message; and
  performing, in response to the first operation, reply processing on the first message.

11. An electronic device comprising:
  a sensor;
  a foldable display comprising:
    a first region configured to display a first interface of a first application;
    a second region configured to be bent when the electronic device is in a folded form; and
    a third region; and
  a processor coupled to the foldable display and the sensor and configured to:
    receive a first message of a second application;
    display, in the first region, the first message;
    detect, using the sensor, a first flipping action of rotating the electronic device by a first preset angle along a first axis in a first direction, wherein the first axis is parallel to an unbent edge on the electronic device, and wherein the first direction is a direction in which a second normal direction of the second region is rotated towards a first normal direction of the first region;
    display, in response to the first flipping action, the first message in the second region;
    detect, using the sensor, a second flipping action of rotating the electronic device by a second preset angle along the first axis in the first direction, wherein the second preset angle is greater than the first preset angle; and
    display, in the third region and in response to the second flipping action, a second interface of the second application, wherein the second interface comprises the first message.

12. The electronic device of claim 11, wherein the processor is further configured to:
  detect, using the sensor, a third flipping action of rotating the electronic device by a third preset angle along the first axis in a second direction, wherein the second direction is opposite to the first direction; and
  in response to the third flipping action, either:
    close the first message in the second region; or
    turn off the second region.

13. The electronic device of claim 12, wherein the processor is further configured to:
  receive a second message;
  display, in response to receiving the second message, the second message in the first region;
  make a determination that the foldable display changes from the folded form to an unfolded form; and
  display, in response to the determination, the second message in the second region.

14. The electronic device of claim 13, wherein the processor is further configured to:
  detect that the foldable display changes from the unfolded form to the folded form; and
  in response to detecting that the foldable display changes from the unfolded form to the folded form, either:
    close the second message in the second region; or
    turn off the second region.

15. The electronic device of claim 12, wherein the processor is further configured to:
  receive a second message;
  display, in response to receiving the second message, the second message in the first region;
  detect that the foldable display changes from the folded form to an unfolded form;
  control, in response to detecting that the foldable display changes from the folded form to the unfolded form, the foldable display to enter a split-screen mode; and
  simultaneously display, in the split-screen mode and in the foldable display, the first interface and a third interface of a third application corresponding to the second message, wherein the third interface comprises the second message.

16. The electronic device of claim 15, wherein the processor is further configured to:
  detect that the foldable display changes from the unfolded form to the folded form; and
  in response to detecting that the foldable display changes from the unfolded form to the folded form:
    control the foldable display to exit the split-screen mode;
    turn off a fourth region; and
    display the first interface in the first region.

17. The electronic device of claim 11, wherein after displaying the first message in the second region, the processor is further configured to:
  detect a first operation targeted for the first message displayed in the second region; and
  perform, in response to the first operation, closing, deleting, or reply processing on the first message.

18. A computer program product comprising computer-executable instructions that are stored on a non-transitory computer-readable medium and that, when executed by a processor, cause an electronic device to:
  display a first interface of a first application in a first region of a foldable display of the electronic device;
  receive a first message of a second application;
  display the first message in the first region;
  detect a first flipping action of rotating the electronic device by a first preset angle along a first axis in a first direction, wherein the first axis is parallel to an unbent edge on the electronic device, wherein the first direction is a direction in which a second normal direction of a second region of the foldable display is rotated towards a first normal direction of the first region, and wherein the second region is bent when the electronic device is in a folded form;

display, in response to the first flipping action, the first message in the second region;

detect a second flipping action of rotating the electronic device by a second preset angle along the first axis in the first direction, wherein the second preset angle is greater than the first preset angle; and display, in response to the second flipping action, a second interface of the second application in a third region of the foldable display, wherein the second interface comprises the first message.

19. The computer program product of claim 18, wherein the computer-executable instructions further cause the electronic device to:

detect a third flipping action of rotating the electronic device by a third preset angle along the first axis in a second direction, wherein the second direction is opposite to the first direction; and in response to the third flipping action, either:
close the first message in the second region; or
turn off the second region.

20. The computer program product of claim 19 wherein the computer-executable instructions further cause the electronic device to:

receive a second message;
display the second message in the first region;
detect that the foldable display changes from the folded form to an unfolded form; and
display the second message in the second region when detecting that the foldable display changes from the folded form to the unfolded form.

* * * * *